US012686556B1

(12) United States Patent
Dunlap et al.

(10) Patent No.: US 12,686,556 B1
(45) Date of Patent: Jul. 21, 2026

(54) STITCHLESS BULK BAG INCLUDING A BAFFLE INSERT AND METHOD OF PRODUCTION

(71) Applicant: AMERIGLOBE, LLC, Lafayette, LA (US)

(72) Inventors: Clifford Dunlap, Baton Rouge, LA (US); Daniel Schnaars, Sr., Lafayette, LA (US)

(73) Assignee: AMERIGLOBE, LLC, Lafayette, LA (US)

( * ) Notice: Subject to any disclaimer, the term of this patent is extended or adjusted under 35 U.S.C. 154(b) by 98 days.

(21) Appl. No.: 18/917,762

(22) Filed: Oct. 16, 2024

Related U.S. Application Data

(63) Continuation of application No. 17/991,478, filed on Nov. 21, 2022, now Pat. No. 12,151,878.

(Continued)

(51) Int. Cl.
*B65D 88/16* (2006.01)
*B31B 70/64* (2017.01)

(Continued)

(52) U.S. Cl.
CPC .......... *B65D 88/1618* (2013.01); *B31B 70/64* (2017.08); *B31B 2160/20* (2017.08); *B31B 2170/20* (2017.08)

(58) Field of Classification Search
CPC . B31B 2160/20; B31B 2170/20; B31B 70/64; B65D 88/1618

(Continued)

(56) References Cited

U.S. PATENT DOCUMENTS 5,165,802 A * 11/1992 Derby ................ B65D 88/1631 383/17
5,421,804 A * 6/1995 LaFleur ............. B65D 88/1631 112/475.08

(Continued)

FOREIGN PATENT DOCUMENTS

KR 102083771 B1 3/2020
KR 102083772 B1 3/2020

(Continued)

OTHER PUBLICATIONS

PE Lining Bulk Polyethylene Liner PE Liner Waterproof 1000kg/ Customized-China Gusseted Liner and Gambo Liner (https:// yunduplastic.en.made-in-china.com/product/IFcTeMCPbaYt/China-PE-Lining-Bulk-Polyethylene-Liner-PE-Liner-Waterproof-1000kg-Customized.html) (Visited Oct. 7, 2022).

(Continued)

*Primary Examiner* — Nathan J Newhouse
*Assistant Examiner* — Matthew T Theis
(74) *Attorney, Agent, or Firm* — Garvey, Smith & Nehrbass, Patent Attorneys, L.L.C.; Julia M. FitzPatrick; Vanessa M. D'Souza

(57) ABSTRACT

A stitchless baffle bulk bag including one or more baffle inserts that are heat sealed to a bag body using a hot melt film. A baffle insert includes a plurality of lateral straps spaced in between longitudinal panels. Tabs extend from the longitudinal panels into the space between lateral straps, above and below the lateral straps. The hot melt film is applied to at least a portion of the longitudinal panel and to the tabs, which is then heat sealed to the body under heat and pressure of heat seal bars. A hot melt sealed tab on both sides of the strap extending beyond the pivot point of the strap counters the forces of peel encountered by the strap and/or by a heat sealed joint of the tab or longitudinal panel.

20 Claims, 36 Drawing Sheets

Related U.S. Application Data

(60) Provisional application No. 63/281,694, filed on Nov. 21, 2021, provisional application No. 63/281,670, filed on Nov. 20, 2021.

(51) Int. Cl.
*B31B 160/20* (2017.01)
*B31B 170/20* (2017.01)

(58) Field of Classification Search
USPC .......................................................... 383/119
See application file for complete search history.

(56) References Cited

U.S. PATENT DOCUMENTS

| | | | |
|---|---|---|---|
| 5,468,528 | A | 11/1995 | Schnaars et al. |
| 5,618,255 | A | 4/1997 | Nickell et al. |
| 5,649,767 | A | 7/1997 | Nickell et al. |
| 5,685,644 | A | 11/1997 | Taylor |
| 6,220,755 | B1 | 4/2001 | Brown et al. |
| 6,402,378 | B1 | 6/2002 | Shackleton |
| 7,794,148 | B2 | 9/2010 | Derby et al. |
| 8,602,243 | B2 | 12/2013 | Hunter |
| 9,394,082 | B1 | 7/2016 | Nattrass |
| 9,624,048 | B2 | 4/2017 | Farrell et al. |
| 10,112,739 | B2 | 10/2018 | Dunlap et al. |
| 10,202,237 | B1 | 2/2019 | Farrell et al. |
| 10,479,599 | B2 | 11/2019 | Dunlap et al. |
| 10,618,225 | B2 | 4/2020 | Dunlap |
| 10,745,192 | B2 | 8/2020 | Dunlap et al. |
| 10,974,869 | B2 | 4/2021 | Dunlap et al. |
| 11,279,523 | B2 | 3/2022 | Dunlap et al. |
| 11,319,144 | B1 | 5/2022 | Dunlap et al. |
| 11,338,527 | B2 | 5/2022 | Dunlap |
| 12,151,878 | B1 | 11/2024 | Dunlap et al. |
| 2011/0044564 | A1* | 2/2011 | Lin .................... B65D 88/1618 383/119 |
| 2014/0198999 | A1 | 7/2014 | Brown et al. |
| 2018/0155118 | A1* | 6/2018 | Tucker ...................... B32B 3/08 |
| 2022/0274740 | A1 | 9/2022 | Dunlap et al. |
| 2022/0297388 | A1 | 9/2022 | Dunlap et al. |

FOREIGN PATENT DOCUMENTS

| | | | |
|---|---|---|---|
| KR | 102084348 | B1 | 3/2020 |
| KR | 102084380 | B1 | 3/2020 |
| KR | 20220150755 | A | 11/2022 |
| WO | WO2014197728 | | 12/2014 |
| WO | WO2015012777 | | 1/2015 |
| WO | WO2018085843 | | 5/2018 |
| WO | WO2018089504 | | 5/2018 |
| WO | WO2018118975 | | 6/2018 |
| WO | WO2021176478 | | 9/2021 |

OTHER PUBLICATIONS

Cesar Gambo Liner web page (available at https://www.cesur.com/en/product/gambo-liner-bigbag) (Visited Oct. 7, 2022).
Cesar PE Films web page (available at https://www.cesur.com/en/product/pe-films-bigbag) (Visited Oct. 7, 2022).

* cited by examiner

STITCHLESS BULK BAG INCLUDING A BAFFLE INSERT AND METHOD OF PRODUCTION

CROSS-REFERENCE TO RELATED APPLICATIONS

This is a continuation of U.S. patent application Ser. No. 17/991,478, filed on 21 Nov. 2022, which claims priority to and/or the benefit of U.S. Provisional Patent Application Ser. No. 63/281,670, filed on 20 Nov. 2021, and U.S. Provisional Patent Application Ser. No. 63/281,694, filed on 21 Nov. 2021, each of which are incorporated herein by reference.

Priority to and/or the benefit of U.S. Provisional Patent Application Ser. No. 63/281,670, filed on 20 Nov. 2021, and U.S. Provisional Patent Application Ser. No. 63/281,694, filed on 21 Nov. 2021, which are each hereby incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a bulk bag with heat sealed joints that includes a baffle insert that is also coupled within the body of the bulk bag using heat sealing. More particularly, the present invention relates to a stitchless bulk bag that includes a baffle insert that is coupled to the body of the bag with a hot melt coupler, e.g., preferably hot melt film, using a heat sealing process. The baffle insert includes tab portions that extend from longitudinal members of the baffle insert and in between lateral straps of the baffle insert.

2. General Background of the Invention

Many industries exist in which large quantities of materials or products must be contained and transported. Such materials or products can be free-flowing, making it necessary to fully support the entire volume of the materials or products. Industries that deal with storing and transporting such dry, flowable products, e.g., sand, fertilizer, granules of plastic, powdered chemicals, carbon black, grains and food products use what are known as flexible intermediate bulk containers (FIBC), also known as bulk bags, industrial bags, or big bags. The bags are generally made from flexible fabric, typically woven polypropylene or polyethylene fabric. For example, the bags can be made from 5 oz per square yard woven polypropylene fabric. Traditionally in the prior art, the bags have been assembled from multiple pieces of flexible fabric and sewn together with stitched seams.

The present inventors, however, previously have developed a heat sealing process to create bulk bags without any stitched seams or stitch holes at least in a containment area of the bags, e.g., at joints/connections of a body portion to a top portion, body portion to a bottom portion, top portion to a top spout, and bottom portion to a discharge tube or discharge tube assembly. Stitchless bulk bags are advantageous to use because there are no stitch holes in a containment area of the bag so material contained in the bag does not sift out of any stitch holes and contaminates do not enter through stitch holes. These bags therefore also eliminate the need for including expensive liners in the bag to avoid material sifting out through the stitch holes. The following patent applications of the same inventors and/or Assignee discuss various preferred embodiments of a bulk bag including heat sealed joints, and methods of manufacture therefor, each of which is hereby incorporated herein by reference:

i) U.S. patent application Ser. No. 14/297,441, filed on 5 Jun. 2014, titled "METHOD OF PRODUCTION OF FABRIC BAGS OR CONTAINERS USING HEAT FUSED SEAMS", published as No. US2014/0363106 on 11 Dec. 2014, and issued as U.S. Pat. No. 10,112,739, on 30 Oct. 2018;

ii) International PCT Patent Application No. PCT/US2014/041155, filed on 5 Jun. 2014, titled "METHOD OF PRODUCTION OF FABRIC BAGS OR CONTAINERS USING HEAT FUSED SEAMS", published as No. WO2014/197728A1 on 11 Dec. 2014;

iii) U.S. patent application Ser. No. 15/345,452, filed 7 Nov. 2016, titled "INDUSTRIAL BAG DISCHARGE SPOUT", published as No. US2018/0050863A1 on 22 Feb. 2018, and issued as U.S. Pat. No. 10,745,192, on 18 Aug. 2020;

iv) International PCT Patent Application No. PCT/US2017/060411, filed 7 Nov. 2017, titled "INDUSTRIAL BAG DISCHARGE SPOUT", published as No. WO2018/085843A1 on 11 May 2018;

v) U.S. patent application Ser. No. 15/383,841, filed 19 Dec. 2016, titled "INDUSTRIAL BAG LIFT LOOP ASSEMBLY", published as No. US2018/0118451A1 on 3 May 2018, and issued as U.S. Pat. No. 10,479,599 on 19 Nov. 2019;

vi) International PCT Patent Application No. PCT/US2017/067393, filed 19 Dec. 2017, titled "INDUSTRIAL BAG LIFT LOOP ASSEMBLY", published as No. WO2018/118975A1 on 28 Jun. 2018;

vii) U.S. patent application Ser. No. 15/807,272, filed 8 Nov. 2017, titled "CARRIER PLATE FOR USE IN MANUFACTURING STITCHLESS BULK BAGS WITH HEAT FUSED SEAMS", published as No. US2018/0126661A1 on 10 May 2018, and issued as U.S. Pat. No. 10,618,225 on 14 Apr. 2020;

viii) International PCT Patent Application No. PCT/US2017/060652, filed 8 Nov. 2017, titled "STITCHLESS BULK BAG WITH HEAT FUSED SEAMS AND METHOD OF PRODUCTION", published as No. WO2018/089504A1 on 17 May 2018;

ix) U.S. patent application Ser. No. 16/126,635, filed on 10 Sep. 2018, titled "METHOD OF PRODUCTION OF FABRIC BAGS OR CONTAINERS USING HEAT FUSED SEAMS", published as US 2019/0185212A1 on 20 Jun. 2019 and issued as U.S. Pat. No. 10,974,869 on 13 Apr. 2021;

x) U.S. patent application Ser. No. 17/007,509, filed on 31 Aug. 2020, titled "BULK BAG BOTTOM AND DISCHARGE ASSEMBLY INCLUDING A REINFORCER", issued as U.S. Pat. No. 11,319,144 on 3 May 2022;

xi) U.S. patent application Ser. No. 17/007,828, filed on 31 Aug. 2020, titled "LIFT LOOP ASSEMBLY TEST PROCESS AND APPARATUS";

xii) U.S. patent application Ser. No. 17/219,398, filed on 31 Mar. 2021, titled "METHOD OF PRODUCTION OF FABRIC BAGS OR CONTAINERS USING HEAT FUSED SEAMS", published as No. US2021/

0284392A1 on 16 Sep. 2021 and issued as U.S. Pat. No. 11,279,523 on 22 Mar. 2022;

xiii) U.S. patent application Ser. No. 17/330,668, filed on 26 May 2021, titled "HEAT SEAL BAR SENSORLESS TEMPERATURE SENSING AND CONTROL;

xiv) U.S. patent application Ser. No. 16/796,521, filed 20 Feb. 2020, titled "HEAT SEAL BAR ASSEMBLY", published as No. US2020/0254697A1 on 13 Aug. 2020, and issued as U.S. Pat. No. 11,338,527 on 24 May 2022;

xv) U.S. patent application Ser. No. 17/697,572, filed on 17 Mar. 2022, titled "METHOD OF PRODUCTION OF FABRIC BAGS OR CONTAINERS USING HEAT FUSED SEAMS", published as No. US2022/0274740A1 on 1 Sep. 2022;

xvi) U.S. patent application Ser. No. 17/715,406, filed 7 Apr. 2022, titled "STITCHLESS BULK BAG WITH HEAT FUSED SEAMS AND METHOD OF PRODUCTION", published as No. US2022/0297388A1 on 22 Sep. 2022; and xvii) U.S. patent application Ser. No. 17/731,727, filed on 28 Apr. 2022, titled "BULK BAG BOTTOM AND DISCHARGE ASSEMBLY INCLUDING A REINFORCER".

In the FIBC or bulk bag industry, it is generally preferred for bulk bags to be constructed in a square shape given that this shape allows for more efficiency and saved cost in manufacturing, and also given that these bags typically are transported on square pallets. When a square bulk bag, however, is filled with material, a rounding of the bag occurs and bulges form at the side walls. This prevents multiple bulk bags from being positioned as close together as they could be if they had straight side walls, which means storage space is not maximized. This also causes problems when the bags are stacked on top of one another as the bulges and imbalances in the bags can cause sagging, preventing a bag from having a level, or substantially level, top surface to stack another bag upon.

Bulk bags started to be constructed including longitudinal panels of fabric sewn across corners of the bag, from one sidewall to another, such that a triangular shape space is formed at the corners of the bag. In the industry, these longitudinal panels are sometimes called baffles, and the bags including this feature are referred to as baffle bags. Reference is made to U.S. Pat. No. 5,468,528, which is incorporated herein by reference, as an example of this type of baffle bag. The longitudinal baffle panels typically have cut-outs therein to allow the flow of material into the triangular shaped area at the bag corners. Including the longitudinal panels at the corners helped to reduce the rounding of the bag when it was filled with bulk material. The panels with the cut-out holes are sewn inside the bag, across each corner to prevent the bag from fully rounding out.

A sewn baffle bag currently on the market that is being sold by the Assignee, Ameriglobe, LLC, of the present application has baffles formed by lateral straps, with spaces in between the lateral straps, that simply cut across the four corners of the bag. The lateral straps can be spaced in between longitudinal panels. The straps pull across the corners to lessen the rounding effect of the bag when it is filled with product which essentially gives a corner rounded square shape to the bag. The spaces in between the straps allow the product to flow into the rounded corners. The longitudinal panels are sewn to the side walls.

Some other prior art bags include a net baffle which is formed in panels but only has small strings from side to side versus fabric with holes cut out.

U.S. Pat. Nos. 5,618,255 and 5,649,767 discuss use of heat sealing to join baffle strips of fabric to a bag liner, and the bag liner is then simply inserted into a bulk bag, or tape portions can be added to the liner and sewn into seams of a bag. The outer bag is made of woven polypropylene which is very strong. The inner baffled liner is made of film polyethylene which has a lot of stretch and is not nearly as strong. Sometimes during the stacking of these lined bags, the stretchiness of the liner will allow the bag to bulge out beyond the intended dimensions. It takes an amazing amount of labor to make the liner. This labor is in a completely separate construction area that is separate from the construction of the bag it will be attached to. Liners are often attached to the bag using a sewing method. The liner may have to be removed before the outer bag can be recycled. The liner is not considered to be re-useable where the costing of the bag is considered to be re-usable. To make the liner strong enough, the amount of polyethylene used is very thick, which is expensive. Next is the need to hand make each liner which leaves open the potential for mistakes. Another issue is the security of its attachment to the bag. As mentioned, the liner can be simply inserted into a bag without being coupled to the bag. Sometimes it can be attached in critical areas, but this is done by sewing small pieces of tape that have been adhered to the liner into the bag seams. These sewn connections can and have failed at times during use.

There is a need in the art for a baffle bulk bag that includes baffles that can be coupled to a bulk bag without stitching.

There is also a need in the art for a baffle bulk bag that includes baffles that can be coupled to a bulk bag interior surface without including a heat seal coating on a bulk bag interior surface. Under the method as described in U.S. Pat. No. 10,112,739, a heat sealing coating can be VERSIFY™ 3000 (Trademark of The Dow Chemical Company), or other suitable propylene elastomer or plastomer coating with a melting point lower than the melting point of the polypropylene fabrics. A heat sealing coating can also be a standard polypropylene fabric coating, e.g., of the type typically applied as a laminate coating to an exterior of polypropylene fabric used to make a bulk bag that can have a majority percentage of polypropylene and a small percentage of polyethylene. Under the method as described in U.S. Pat. No. 10,112,739, a propylene elastomer or plastomer coating on one bag portion can be joined to another propylene elastomer or plastomer coating on another bag portion or to a standard polypropylene fabric coating on another bag portion.

There is also a need in the art for a baffle bulk bag that includes baffles that are heat sealed to a bag and without including a separate bag liner.

BRIEF SUMMARY OF THE INVENTION

A preferred embodiment of the apparatus of the present invention is a bulk bag constructed with heat sealed joints that includes a baffle insert that is coupled to an interior surface of the bag with heat sealed joints. A heat sealed bulk bag of the present invention preferably includes a fill spout, top portion, body portion, bottom portion and discharge tube.

In one or more preferred embodiments, four individual baffle inserts can be inserted into a body portion of a bulk bag to make a baffle bulk bag. Each individual baffle insert can have a pair of longitudinal panels with a plurality of straps spaced in between the longitudinal panels. Preferably a tab portion extends from the longitudinal panels in the space in between the plurality of straps above and below the straps. Each baffle insert is preferably coupled to adjacent side walls of the bag body such that when the bag is in an expanded or filled configuration, the first longitudinal panel and set of tabs are coupled to one side wall, and the second longitudinal panel and set of tabs are attached to the adjacent side wall with the straps extending across a corner of the bag body along a diagonal, e.g., at or about at an angle of 30 to 45 degrees, forming a triangular shaped space behind the straps at the bag corner.

In other preferred embodiments a baffle insert can have an irregular tubular shape that preferably includes four longitudinal panels with a plurality of lateral straps spaced apart along a longitudinal length of the longitudinal panels and with spaces in between the straps. A plurality of tab portions extend from the longitudinal panel into the spaces in between the straps above and below the straps. The longitudinal panels can have a substantially rectangular shape with the lateral straps preferably extending in between two said longitudinal panels along a diagonal. For a tubular baffle insert, the baffle insert preferably is positioned within the body of a bulk bag so that when the bag is in an expanded configuration, or a filled configuration, each longitudinal panel is coupled to the body about centrally on a body side wall such that the lateral straps can cut across the corners of the body portion along a diagonal, e.g., at or about at an angle of 30 to 45 degrees, forming a triangular shaped space behind the straps at the bag corner.

With both the individual baffle insert portions and the tubular baffle insert portion, a portion of the longitudinal panel and the tabs of the baffle insert preferably include hot melt glue thereon, preferably in film form, which can be used to couple the baffle insert to the body interior surface using a heat sealing process where heat and pressure is applied to the body portion overlapped with the baffle insert, with the hot melt film in between body interior surfaces and baffle insert exterior surfaces to be joined.

A hot melt film used in the present invention preferably meets government "contact food grade" standards. A hot melt film of the present invention can be a Hot Melt Film Product no. HS 410 available from Cattie Adhesives out of Quakertown, PA, with the following product information/specification.

- Cattie Adhesives PRODUCT: HS 410 transfer from 42 #Silicon liner
- PRODUCT HS 410 transfer from 42 #Silicon liner is an EVA type heat seal adhesive self-wound on a 42 #silicon liner that is transferable from the silicon liner. Adhesive HS 410 has a wide range activation temperature with good adhesion to a variety of substrates including metals, coated films, papers and plastics.
- ADHESIVE:
  - Adhesive Coat Weight lbs. 14±2
  - Adhesive Softening Point® F. 175±5
  - Activation Temperature® F. 250-265
  - Application Temperature® F. 300-350
  - Dwell Time Sec 0.2 plus (Depending on temperature and pressure)
  - General Information-Adhesive specifically formulated for bonding onto metal, paper and film substrates. All ingredients used in the makeup of this adhesive meets the requirements for FDA Regulation 175.105 "Adhesives".
- LINER:
  - Type: 42 #Super Calendered Kraft
  - Caliper: 2.5 (+/−10%)
  - Basis Weight: 40 #(3000 Ft2)
  - Release: medium Although the Hot Melt Film Product no. HS 410 available from Cattie Adhesives was specifically formulated for use in metals, in experimentation it was found to work particularly well in heat sealing a baffle insert to a bag body under one or more preferred embodiments of the present invention.

In the sewn baffle bag that currently is being sold by Ameriglobe, LLC, the baffle straps, with spaces in between the baffle straps, cut across the four corners of the bag. The straps pull across the corners to lessen the rounding effect of the bag when it is filled with product which essentially gives a corner rounded square. The spaces in between the straps allow the product to flow into the rounded corners. In experimenting with how to make a similar baffle bag with heat sealed joints, the first challenge to overcome was that both tensile and peel forces are present at the intersection of the strap to the body. In heat sealed bulk bags produced according to one or more methods as described in U.S. Pat. No. 10,112,739B2, all the forces on bag joints in a containment area of a bag (e.g., joints joining the top to the body and the body to the bottom) are primarily in the tensile direction where a situation of needing to deal with both peel and tensile forces is not present. In developing the attachment of the lift loop assemblies as discussed in U.S. Pat. No. 10,479,599, which include a lift loop sewn to a patch, with the patch heat sealed to a bag body, the possibility that the lift loops would be mishandled by pulling the loop horizontally to the bag rather than vertically was a concern considered. Heat seals were included in areas of the patch beyond the attachment of the sewn lift loop to help overcome this concern. The peel concern with the lift loop was only if it was mishandled and there was not constant peel forces exerted on the connection. With the baffle straps, however, peel force is in existence at all times when a bag is full of bulk material.

A first attempt to counter the peel used adhesives for the tab. But adhesives stretch and deform when continual pull is present so this led to slow failures with the adhesives.

The second challenge was finding an attachment method to attach the baffle straps to the inside of the body portion tube. Preferred body portions for a bulk bag formed with heat sealed joints are spiral woven tubes with no seam. It is currently physically impossible to coat the inside of a body tube, e.g., with a propylene elastomer or plastomer coating or a standard polypropylene fabric coating, in any meaningful practical way. This meant that use of coatings in a heat sealing process as described in U.S. Pat. No. 10,112,739B2 was not practical if the body tube was used because an inside of the body tube would need to include a heat sealing coating.

Alternative means for forming a heat sealed joint were experimented with. It is noted that a heat-sealed joint can be formed by simply heating up plastic fabrics to at least their melting point and applying pressure to join them together. However, as discussed in more detail in U.S. Pat. No. 10,112,739, this is not preferred for bulk bags because it weakens the fabric, reduces needed flexibility and does not form a strong enough bond for what is desired and/or considered safe for use in a bulk bag that can carry 1 to 2 tons of bulk material, for example.

Hot melt glue that was dispensed in beads was experimented with, wherein the beads were applied to the baffle straps. The hot melt beads had to be heated and melted, and a way to dispense it evenly was experimented with. This type of hot melt glue was not preferred because there were variations in thickness which caused excess glue to extend out from under the fabric where it could become a contamination to the product area. These early bags failed with the straps peeling away under pressure of contents in the bags. It was thought that inconsistent dispensing of the beads possibly was a major contributor to the issue.

Hot melt glue that was available in film form was then experimented with and applied to baffle inserts. The tensile tests and peel tests were excellent and very consistent, but bags tested failed the 3-1 compression test as well as the 5-1 tests, with the baffle insert and/or straps peeling away.

It was then considered that peel forces on the strap may need to still be dealt with, and experiments were conducted where a novel tab was included in between the baffle straps. It was thought that a "tab" on both sides of the strap extending beyond the "pivot point" of the strap would counter the forces of peel. A pivot point referred to herein is the point where the straps make contact with the bag sidewalls. When a bag is flat and unfilled, the straps lie in the same direction as the side walls. As the bag is inflated or filled the straps then pivot towards the opposite corner. In a perfect square the straps and the side walls of the bag would essentially form a right triangle.

Experimentation established that including hot melt on tabs on both sides of a baffle strap increased the strength of the heat-sealed bond. For the first time a bag passed both a 3-1 compression test and 5-1 test.

In one or more preferred embodiments of the present invention, the various bag portions can be made from a flexible plastic fabric.

In one or more preferred embodiments of the present invention, the various bag portions can be made from a flexible polyester fabric.

In one or more preferred embodiments of the present invention, the various bag portions can be made from a flexible polypropylene fabric.

In one or more preferred embodiments of the present invention, the various bag portions can be made from a flexible polyethylene fabric.

In one or more preferred embodiments of the present invention, a heat sealing coating applied to a first bag portion fabric can be a typical laminate type coating for the type of fabric of the bag portion if a heat sealing coating applied to a second piece of fabric to which the first piece of fabric will be joined to is a propylene plastomer or elastomer coating.

In one or more preferred embodiments of the present invention, a heat sealing coating applied to a bag portion fabric can be a propylene plastomer or elastomer coating.

In one or more preferred embodiments of the present invention, a heat sealing coating applied to a baffle insert can be hot melt film.

In one or more preferred embodiments of the present invention, a heat sealing coating applied to a bag portion can be hot melt film.

A preferred embodiment of the apparatus of the present invention includes a bulk bag comprising:

a) a top portion;

b) a body portion having an interior surface, and having a first side, a second side, a third side and a fourth side, and a first corner, a second corner, a third corner and a fourth corner, in an expanded configuration;

c) a bottom portion;

d) a baffle insert portion including:

(i) at least a pair of longitudinal members with a plurality of lateral members spaced in between the longitudinal members;

(ii) a plurality of tab portions, each tab portion extending laterally away from one said longitudinal member and into a space in between two said lateral members or into a space above or below a said lateral member;

(iii) hot melt film applied to at least a portion of an exterior surface of the pair of longitudinal members along a length of the longitudinal members;

(iv) the hot melt film also applied to a tab exterior surface of each of the plurality of tabs;

e) a joint formed between the body interior surface and the portion of the longitudinal members that includes the hot melt film and said joint formed between the tabs that include the hot melt film, wherein the joint is formed by applying heat and pressure to fabric of the body interior, the hot melt film, the longitudinal members and the tabs; and f) wherein the baffle insert is positioned in the body portion so that it extends from the first body side to the second body side across a first body corner with the lateral members positioned along a diagonal across the first body corner when the body portion is in the expanded configuration.

In one or more preferred embodiments of the present invention, four baffle inserts can be included in the bulk bag at each of the first, second, third and fourth corners.

In one or more preferred embodiments of the present invention, the hot melt film extends along an entire exterior surface of each of the longitudinal members of the baffle insert.

In one or more preferred embodiments of the present invention, the baffle insert comprises four longitudinal members and comprises a tubular shape and each of the four longitudinal members are coupled to the body interior surface so that respective lateral members extend across each of the first, second, third or fourth corners of the bag along a diagonal.

In one or more preferred embodiments of the present invention, the hot melt film does not extend along an entire exterior surface of each of the longitudinal members of the baffle insert.

In one or more preferred embodiments of the present invention, during heat sealing to form the joint, the body can be in a folded gusseted configuration including a pair of body gussets and the baffle insert can be folded and overlapped with at least one of the body gussets when the heat and pressure is applied.

In one or more preferred embodiments of the present invention, during heat sealing, the body can be in a folded gusseted configuration including a pair of body gussets and two of the baffle inserts can be folded and overlapped with one of the body gussets and the other two of the baffle inserts can be folded and overlapped with the other body gusset.

In one or more preferred embodiments of the present invention, during heat sealing, the body can be in a folded gusseted configuration including a pair of body gussets and the baffle insert can be gusseted in a folded gusseted configuration including two baffle gussets and the baffle gussets can be overlapped with the body gussets.

In one or more preferred embodiments of the present invention, the tabs counter peel forces exerted on the joint when the bulk bag is filled with bulk material and/or lifted.

In one or more preferred embodiments of the present invention, the baffle insert counters both peel and tensile forces exerted on the joint when the bulk bag is filled with bulk material and/or lifted.

In one or more preferred embodiments of the present invention, said tabs that are on both sides of one said lateral member extend beyond a pivot point of said lateral member at a junction of said lateral member and the longitudinal member and counters the forces of peel encountered by the lateral member and the longitudinal member.

In one or more preferred embodiments of the present invention, each tab extends at least 2 inches laterally away from the longitudinal member and into the space above or below a said lateral member.

In one or more preferred embodiments of the present invention, said lateral members can be free and are not connected to the body portion.

In one or more preferred embodiments of the present invention, the plurality of tabs protect the joint at a pivot point located where one said lateral member that is free extends away from one said longitudinal member that is coupled to the body portion at the joint.

In one or more preferred embodiments of the present invention, the body portion is connected to the top portion and to the bottom portion with heat sealed joints.

In one or more preferred embodiments of the present invention, the body portion is connected to the top portion and to the bottom portion with stitched seams.

A preferred embodiment of the method of the present invention includes a method of forming a heat-sealed baffle body portion that is stitchless, comprising the following steps:

(a) obtaining a body portion that is tubular piece of flexible plastic fabric or polyester fabric and that has an interior surface, a first side, a second side, a third side and a fourth side, and a first corner, a second corner, a third corner and a fourth corner, and which has an expanded configuration;
(b) obtaining one or more baffle inserts that each include:
(i) at least a pair of longitudinal members with a plurality of lateral members spaced in between the longitudinal members;
(ii) a plurality of tab portions, each tab portion extending laterally away from one said longitudinal member and into a space in between two said lateral members or into a space above or below a said lateral member;
(iii) hot melt film applied to at least a portion of an exterior surface of the pair of longitudinal members along a length of said longitudinal members;
(iv) the hot melt film also applied to a tab exterior surface of each of the plurality of tabs;
(c) folding the body portion into a body folded or gusseted configuration;
(d) folding the one or more baffle inserts into an insert folded or gusseted configuration;
(e) overlapping the body portion while in the body folded or gusseted configuration with the baffle insert while in the insert folded or gusseted configuration so that the hot melt film on the one or more baffle inserts is in contact with an interior surface of the body portion;
(f) applying heat and pressure to overlapped layers formed in step (e) of the one or more baffle inserts and the body portion to melt the hot melt film and form a joint between the body portion and the one or more baffle inserts.

In one or more preferred embodiments of the present invention, during heat sealing in step (f) an upper heat seal bar of a heat seal machine rocks in an end to end or lengthwise direction and a mating lower seal bar rocks in a side to side or widthwise direction to facilitate even heating through overlapped layers, even in areas where fabric thicknesses differ.

A preferred embodiment of the apparatus of the present invention includes a stitchless baffle body portion comprising:

(a) a body portion that is a tubular piece of flexible plastic fabric or polyester fabric and that has an interior surface, a first side, a second side, a third side and a fourth side, a first corner, a second corner, a third corner and a fourth corner, and which has an expanded configuration;
(b) one or more baffle inserts made from a flexible plastic fabric or a polyester fabric that each include:
(i) at least a pair of longitudinal members with a plurality of lateral members spaced in between the longitudinal members;
(ii) a plurality of tab portions, each tab portion extending laterally away from one said longitudinal member and into a space in between two said lateral members or into a space above or below a said lateral member;
(iii) hot melt film applied to at least a portion of an exterior surface of the pair of longitudinal members along a length of said longitudinal members;
(iv) the hot melt film also applied to a tab exterior surface of each of the plurality of tabs;
(c) one or more heat sealed joints coupling the one or more baffle inserts to the interior surface of the body portion, wherein a said heat sealed joint comprises the following layers:
(i) body fabric, hot melt, tab portion fabric; or
(ii) body fabric, hot melt, longitudinal portion fabric; and
(d) wherein at least a portion of the plurality of lateral members are free and not coupled to the body portion.

A preferred embodiment of the apparatus of the present invention includes a heat sealing method of manufacturing a baffle bulk bag comprising the following steps:

(a) overlapping an upper portion of the baffle body portion while in a baffle folded or gusseted configuration with a top portion while the top portion is in a top folded or gusseted configuration so that a baffle body heat seal coating on an exterior surface of the baffle body portion is in contact with a top heat seal coating on an interior surface of the top portion;
(b) overlapping a lower portion of the baffle body portion of claim 18 while in the baffle folded or gusseted configuration with a bottom portion while the bottom portion is a bottom folded or gusseted configuration so that the baffle body heat seal coating on the exterior surface of the baffle body portion is in contact with a bottom heat seal coating on an interior surface of the bottom portion; and
(c) applying heat and pressure to overlapped layers formed in steps (a) and (b) to melt at least one of the said baffle heat seal coating or top heat sealing coating in the overlapped area of step (a) and to melt at least one of the said baffle heat seal coating or bottom heat sealing coating in the overlapped area of step (b) to form a top heat sealed joint between the baffle body portion and the top portion and a bottom heat sealed joint between the baffle body portion and the bottom portion.

In one or more preferred embodiments of the present invention, the top portion, body portion, baffle insert and bottom portion are made from flexible plastic fabric or polyester fabric.

In one or more preferred embodiments of the present invention, the top portion, body portion, baffle insert and bottom portion are made from flexible polypropylene fabric.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 6:
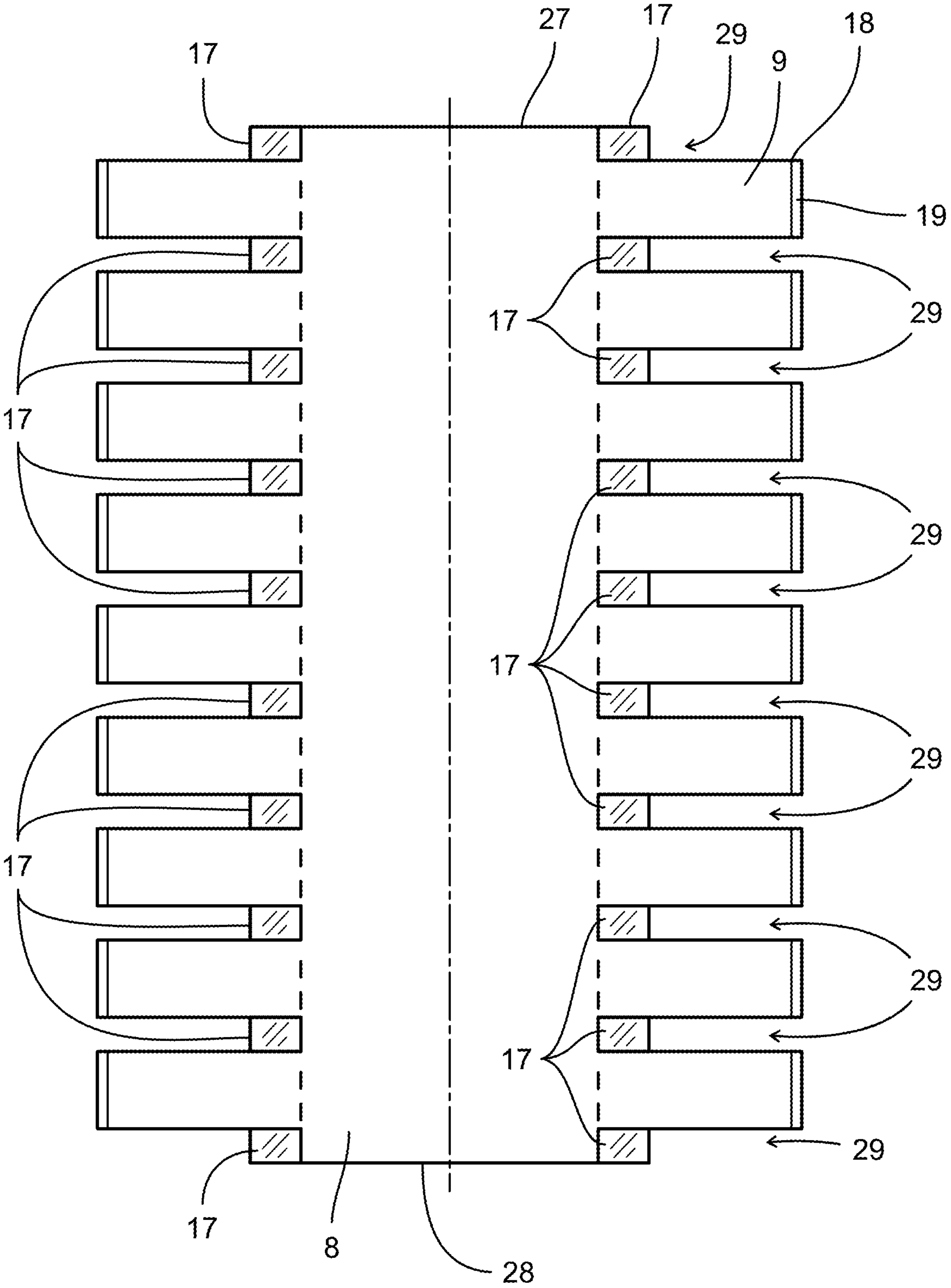
FIG. 6 is a top view of a second preferred embodiment of a baffle insert that can be included in one or more preferred embodiments of the apparatus of the present invention that is tubular, in folded, gusseted configuration.
Figure 7:
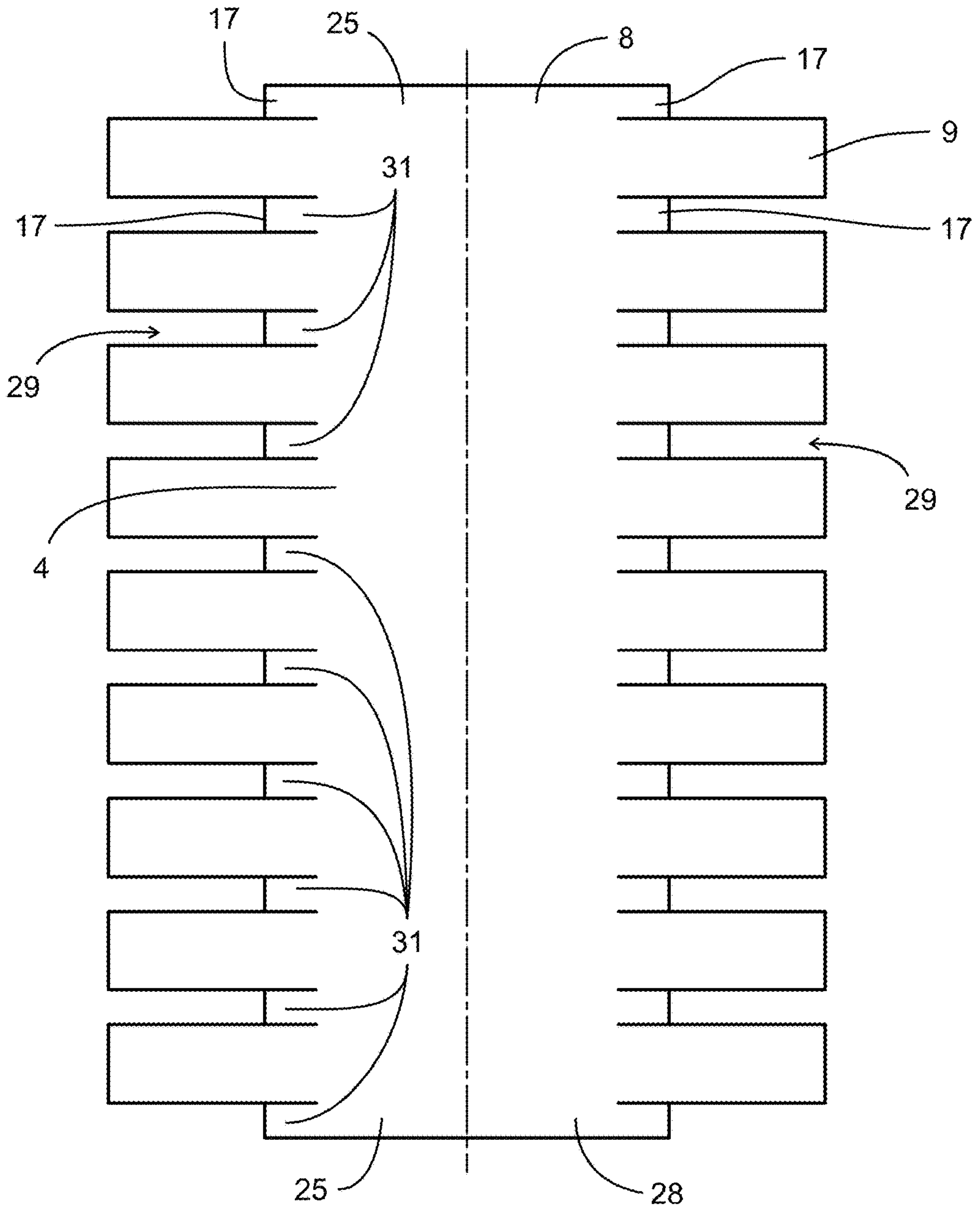
FIG. 7 is another top view of the baffle insert of FIG. 6 in folded, gusseted form.
Figure 8:
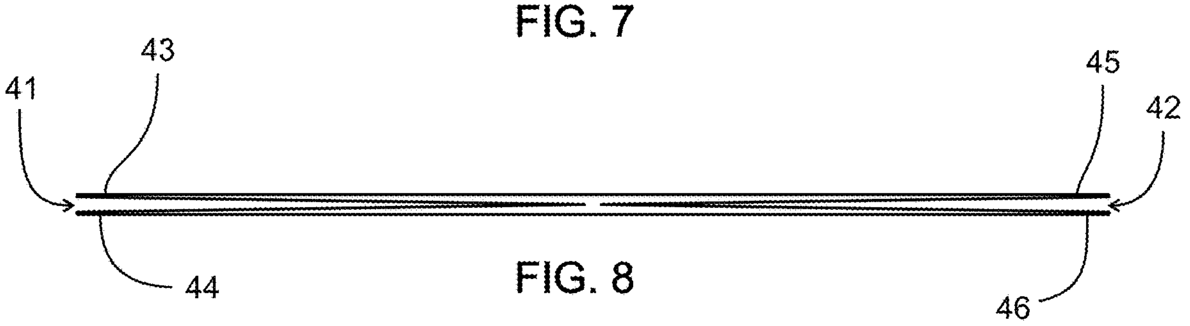
FIG. 8 is an end view of the baffle insert of FIG. 6 in folded, gusseted form.
Figure 10:
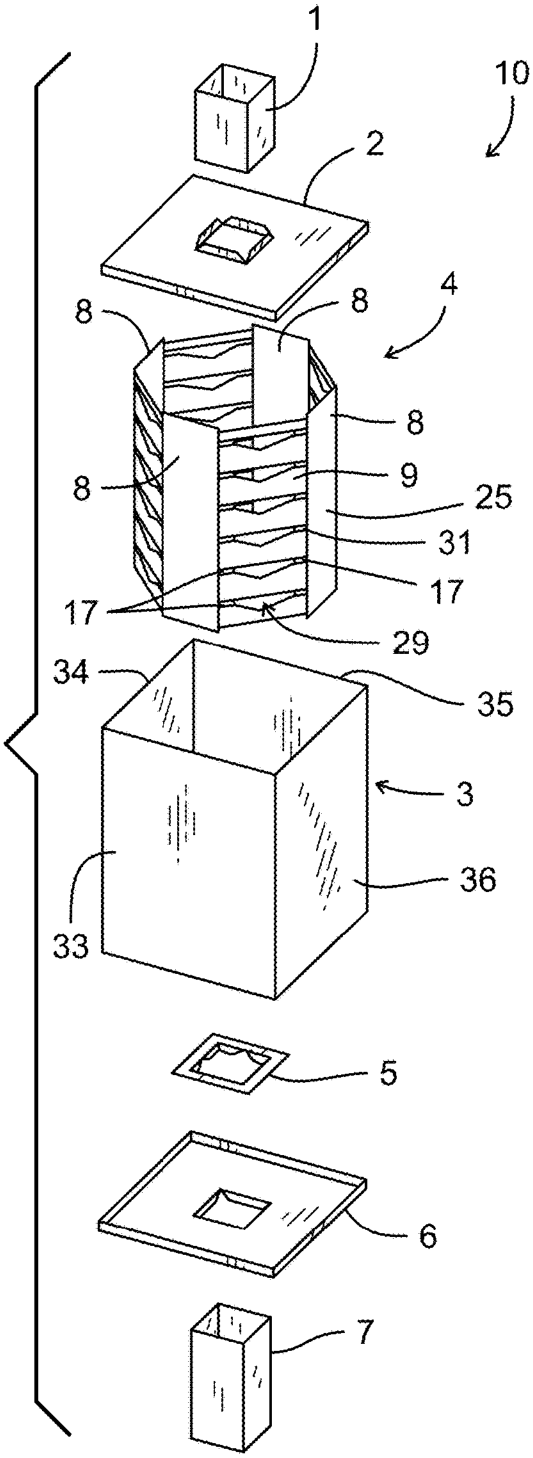
FIG. 10 is another exploded view of the first preferred embodiment of the apparatus of the present invention.

FIGS. 1 to 13 illustrate a first preferred embodiment of the apparatus of the present invention designated generally herein by the numeral 10. The first preferred embodiment 10 of the apparatus of the present invention is sometimes referred to herein as a baffle bulk bag. The first preferred embodiment of the apparatus of the present invention as shown in the figures includes a baffle insert of the present invention that is tubular and is generally designated herein by the numeral 4. A first preferred embodiment of a baffle insert 4 is shown in FIGS. 1, 4, 10-13. A second preferred embodiment of a baffle insert 4 is shown in FIGS. 6-8. Either the first or second preferred embodiments of a baffle insert 4 can be included in a baffle bulk bag 10 as desired. In the different embodiments of a baffle insert 4, the shape of straps or lateral members 9 are different, but otherwise the features of the preferred embodiments of a baffle insert 4 that is tubular as shown in the drawings are at least substantially the same or similar.

Figure 14:
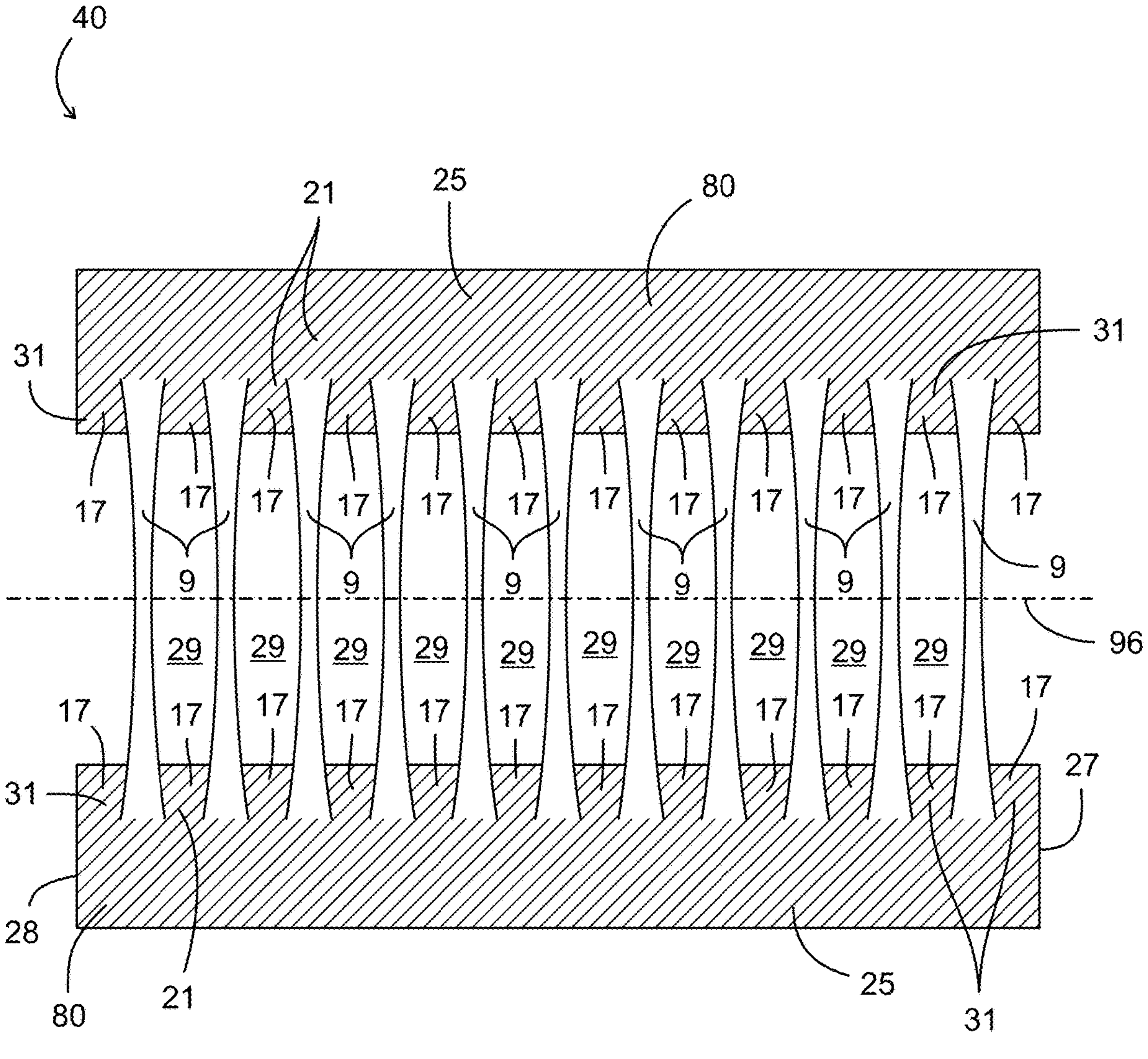
FIG. 14 is top view of a third preferred embodiment of a baffle insert that can be included in one or more preferred embodiments of the apparatus of the present invention.
Figure 15:
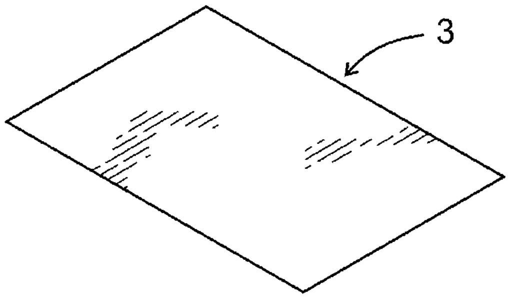
FIG. 15 is a perspective view of a body portion that can be used in one or more preferred embodiments of the apparatus of the present invention.
Figure 16:
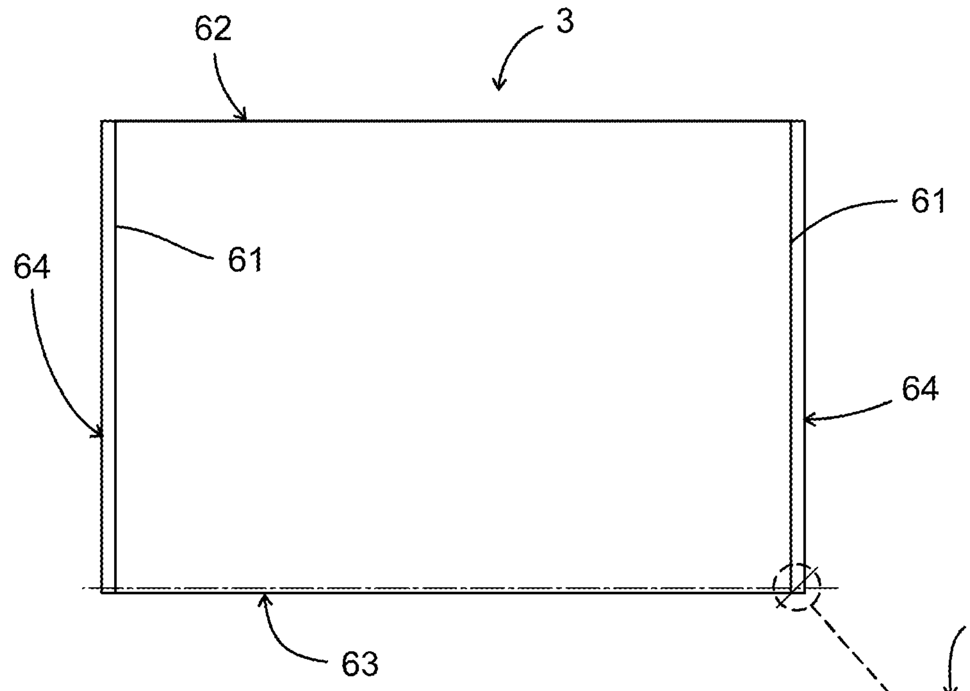
FIG. 16 is a front view of a body portion shown in FIG. 15.
Figure 17:
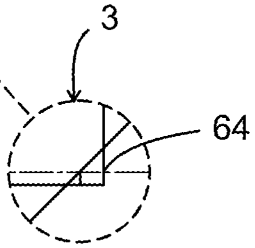
FIG. 17 is a detail view of a body portion shown in FIG. 16.

A second preferred embodiment of the apparatus of the present invention, designated generally herein by the numeral 50, is shown in FIGS. 14-29, 48-55. The second preferred embodiment 50 of the apparatus of the present invention is sometimes referred to herein as a baffle bulk bag. The second preferred embodiment of the apparatus of the present invention as shown in the figures includes third or fourth preferred embodiments of a baffle insert of the present invention, which is designated herein generally by the numeral 40. The third preferred embodiment of a baffle insert 40 is shown in FIG. 14. The fourth preferred embodiment of a baffle insert 40 is shown in FIGS. 20-29. Either the third or fourth preferred embodiments of a baffle insert 40 can be included in a baffle bulk bag 50 as desired. In the different embodiments of a baffle insert 40, the shape of straps or lateral members 9 are different, but otherwise the features of the preferred embodiments of a baffle insert 40 as shown in the figures are at least substantially the same or similar.

Referring to FIGS. 1-5, 9-13, 15-29, a baffle bulk bag 10 or 50 of the present invention preferably includes a fill spout/fill tube 1, a top/top portion 2, a body/body portion 3, a baffle insert 4 or 40, a bottom/bottom portion 6, and discharge tube/discharge spout 7. In some embodiments, a discharge tube cover 54 (see, e.g., FIG. 29), sometimes referred to as a diaper, can also be included in a baffle bulk bag 10, 50, and reference is made to U.S. Pat. No. 10,745,192 for more details on a discharge tube cover 54. A body 3 can have side walls 33, 34, 35, 36. If desired, a bottom insert or reinforcer 5 can also be included in a baffle bulk bag 10, 50 and reference is made to U.S. Pat. No. 11,319,144, which is incorporated herein by reference, for more detail on including a bottom insert or reinforcer 5.

A fill spout 1 can have opening 55. A top portion 2 can have opening 11. A baffle insert 4 can having opening 12. A body 3 can have opening 13. A bottom insert or reinforcer 5 can have opening 14. A bottom 6 can having opening 15. A discharge tube 7 can have opening 16.

Preferably a baffle bulk bag 10, 50 is manufactured so that joints between fill spout 1 and top 2, between top 2 and body 3, between body 3 and bottom 6 and between bottom 6 and discharge tube 7 are formed via a heat sealing method. If a bottom insert 5 is included, preferably the joint coupling an insert 5 to bottom 6 and discharge tube 7 is also formed via a heat sealing method. Preferably the said joints are all formed via heat sealing so that a containment area of the baffle bulk bag 10, 50 does not include any stitch or sewing holes. A baffle bulk bag 10, 50 can also include one or more lift loop assemblies, wherein preferably a patch 52 of a lift loop assembly is joined to an exterior of a bag body 3 with a heat sealed joint. A lift loop assembly can include a patch 52 with a lift loop 51 stitched to patch 52 or heat sealed to patch 52 (see, e.g., FIGS. 20, 22, 29). Reference is made to the following patents and/or patent applications, which are incorporated herein by reference, for more details on some preferred methods on how to form a bulk bag as described above with joints formed via heat sealing:

i) U.S. patent application Ser. No. 14/297,441, filed on 5 Jun. 2014, titled "METHOD OF PRODUCTION OF FABRIC BAGS OR CONTAINERS USING HEAT FUSED SEAMS", published as No. US2014/0363106 on 11 Dec. 2014, and issued as U.S. Pat. No. 10,112,739, on 30 Oct. 2018;

ii) International PCT Patent Application No. PCT/US2014/041155, filed on 5 Jun. 2014, titled "METHOD OF PRODUCTION OF FABRIC BAGS OR CONTAINERS USING HEAT FUSED SEAMS", published as No. WO2014/197728A1 on 11 Dec. 2014;

iii) U.S. patent application Ser. No. 15/345,452, filed 7 Nov. 2016, titled "INDUSTRIAL BAG DISCHARGE SPOUT", published as No. US2018/0050863A1 on 22 Feb. 2018, and issued as U.S. Pat. No. 10,745,192, on 18 Aug. 2020;

iv) International PCT Patent Application No. PCT/US2017/060411, filed 7 Nov. 2017, titled "INDUSTRIAL BAG DISCHARGE SPOUT", published as No. WO2018/085843A1 on 11 May 2018;

v) U.S. patent application Ser. No. 15/383,841, filed 19 Dec. 2016, titled "INDUSTRIAL BAG LIFT LOOP ASSEMBLY", published as No. US2018/0118451A1 on 3 May 2018, and issued as U.S. Pat. No. 10,479,599 on 19 Nov. 2019;

vi) International PCT Patent Application No. PCT/US2017/067393, filed 19 Dec. 2017, titled "INDUSTRIAL BAG LIFT LOOP ASSEMBLY", published as No. WO2018/118975A1 on 28 Jun. 2018;

vii) U.S. patent application Ser. No. 15/807,272, filed 8 Nov. 2017, titled "CARRIER PLATE FOR USE IN MANUFACTURING STITCHLESS BULK BAGS WITH HEAT FUSED SEAMS", published as No. US2018/0126661A1 on 10 May 2018, and issued as U.S. Pat. No. 10,618,225 on 14 Apr. 2020;

viii) International PCT Patent Application No. PCT/US2017/060652, filed 8 Nov. 2017, titled "STITCHLESS BULK BAG WITH HEAT FUSED SEAMS AND METHOD OF PRODUCTION", published as No. WO2018/089504A1 on 17 May 2018;

ix) U.S. patent application Ser. No. 16/126,635, filed on 10 Sep. 2018, titled "METHOD OF PRODUCTION OF FABRIC BAGS OR CONTAINERS USING HEAT FUSED SEAMS", published as US 2019/0185212A1 on 20 Jun. 2019 and issued as U.S. Pat. No. 10,974,869 on 13 Apr. 2021;

x) U.S. patent application Ser. No. 17/007,509, filed on 31 Aug. 2020, titled "BULK BAG BOTTOM AND DISCHARGE ASSEMBLY INCLUDING A REINFORCER", issued as U.S. Pat. No. 11,319,144 on 3 May 2022;

xi) U.S. patent application Ser. No. 17/007,828, filed on 31 Aug. 2020, titled "LIFT LOOP ASSEMBLY TEST PROCESS AND APPARATUS";

xii) U.S. patent application Ser. No. 17/219,398, filed on 31 Mar. 2021, titled "METHOD OF PRODUCTION OF FABRIC BAGS OR CONTAINERS USING HEAT FUSED SEAMS", published as No. US 2021/0284392A1 on 16 Sep. 2021 and issued as U.S. Pat. No. 11,279,523 on 22 Mar. 2022;

xiii) U.S. patent application Ser. No. 17/330,668, filed on 26 May 2021, titled "HEAT SEAL BAR SENSORLESS TEMPERATURE SENSING AND CONTROL;

xiv) U.S. patent application Ser. No. 16/796,521, filed 20 Feb. 2020, titled "HEAT SEAL BAR ASSEMBLY", published as No. US2020/0254697A1 on 13 Aug. 2020, and issued as U.S. Pat. No. 11,338,527 on 24 May 2022;

xv) U.S. patent application Ser. No. 17/697,572, filed on 17 Mar. 2022, titled "METHOD OF PRODUCTION OF FABRIC BAGS OR CONTAINERS USING HEAT FUSED SEAMS", published as No. US2022/0274740A1 on 1 Sep. 2022;

xvi) U.S. patent application Ser. No. 17/715,406, filed 7 Apr. 2022, titled "STITCHLESS BULK BAG WITH HEAT FUSED SEAMS AND METHOD OF PRODUCTION", published as No. US2022/0297388A1 on 22 Sep. 2022; and xvii) U.S. patent application Ser. No. 17/731,727, filed on 28 Apr. 2022, titled "BULK BAG BOTTOM AND DISCHARGE ASSEMBLY INCLUDING A REINFORCER".

A baffle insert 4 of either the first or second preferred embodiments of a baffle insert of the present invention as shown in FIGS. 1-13 preferably has an irregular tubular shape with four longitudinal panels or longitudinal members 8. Longitudinal panels 8 can have a rectangular or at least a substantially rectangular shape. A plurality of straps or lateral members 9 extend in between longitudinal panels 8 along a diagonal, e.g., preferably at an angle of, or between about, 30 to 45 degrees. The plurality of straps are preferably spaced apart along a longitudinal length of longitudinal panels 8, preferably with spaces 29 left in between two different straps 9.

A preferred width ratio of tab 17 to strap 9 width is 1.3 inch. For example, under a current most preferred embodiment, there is a 1.5 inch tab 17 width at base of a tab 17 to 2 inch strap 9 width at a base of strap 9, and this is the currently most preferred strap 9 width and ratio of tab 17 (and space 29) width to strap 9 width. This ratio can change due to increased adhesion ability of a hot melt film 21. If the adhesion ability of hot melt film 21 increases, then tab 17 width can decrease in relationship to strap 9 width. On the other hand, if the adhesion ability of hot melt film 21 decreases, then tab 17 width would need to increase. With the current preferred formulation of hot melt film 21 using a hot melt film from Cattic Adhesives, this ratio can vary up to 10%. As long as this ratio is maintained, the number of straps 9 can increase or decrease per linear foot without materially affecting the overall strength of a bag 10, 50. For example, if straps 9 are spaced too far apart a bag 10, 50 will try to round out more between the straps 9 than if straps 9 are closer together.

A plurality of tabs 17 extend from each longitudinal panel 8 in a lateral direction into a space 29 that is in between two straps 9. Preferably a tab 17 is located above and below each strap 9 at both ends of each strap 9. Thus, as shown in the figures, some tabs 17 are also located above the topmost straps 9 and some tabs 17 are also located below the bottommost straps 9. A topmost tab 17 can extend to top 27 of a longitudinal panel 8. A bottommost tab 17 can extend to bottom 28 of a longitudinal panel 8. Referring to FIG. 6, tabs 17 are shown in shading.

Referring now to a second preferred embodiment of a baffle bulk bag, designated by the numeral 50, a plurality of baffle inserts designated by the numeral 40 (instead of a single tubular baffle insert 4) are included in a baffle bulk bag 50. A third preferred embodiment of a baffle insert, designated by the numeral 40 is shown in FIG. 14. Baffle insert 40 has a pair of longitudinal panels or members 80. Longitudinal panels or members 80 can have a rectangular or an at least substantially rectangular shape. A plurality of straps or lateral members 9 extend in between longitudinal panels 80 along a diagonal, e.g., preferably at an angle of or between about 30 to 45 degrees. The plurality of straps 9 are spaced apart along a longitudinal length of longitudinal panels 80, preferably with spaces 29 left in between two different straps 9. A plurality of tabs 17 extend from each longitudinal panel 80 in a lateral direction into a space 29 that is in between two straps 9. Preferably a tab 17 is located above and below each strap 9 on both ends of each strap 9. Thus, as shown in the figures, some tabs 17 are also located above the topmost straps 9 and some tabs 17 are also located below the bottommost straps 9. A topmost tab 17 can extend to top 27 of a longitudinal panel 80. A bottommost tab 17 can extend to bottom 28 of a longitudinal panel 80.

A fourth preferred embodiment of a baffle insert is designated generally by the numeral 40 in FIGS. 20-24. This embodiment of baffle insert 40 is substantially the same as the third preferred embodiment shown in FIG. 14 except the straps 9 have a rectangular or at least substantially rectangular shape, whereas the straps 9 in FIG. 14 have a curvature or curved shape. The shape of straps 9 in FIGS. 20-24 are currently the most preferred configuration.

A baffle insert 4 or 40 can be made of the same flexible plastic fabric as body 3, e.g., preferably uncoated (e.g., without a laminate type coating or other heat scaling coating, e.g., a propylene plastomer or elastomer coating, thereon), woven polypropylene fabric. Preferably, instead of using a heat sealing coating as described in the applications incorporated herein by reference, hot melt 21 film is applied to desired portions of an insert 4, 40.

The shape of straps 9 can be changed if desired, e.g., straps 9 can have a shape of the first or second preferred embodiments of baffle insert 4, or of the third or fourth preferred embodiment of a baffle insert 40, or another desired shape. A shape of a strap 9 included in a baffle insert 40 can also be included in a baffle insert 4 and vice versa. But, in all embodiments of a baffle insert 4 or 40, preferably at least some space 29 is left in between straps 9 to enable bulk material contained in a baffle bulk bag 10 or 50 to flow through the spaces 29 and fill corners 20 of a baffle bulk bag 10 or 40.

Figure 48:
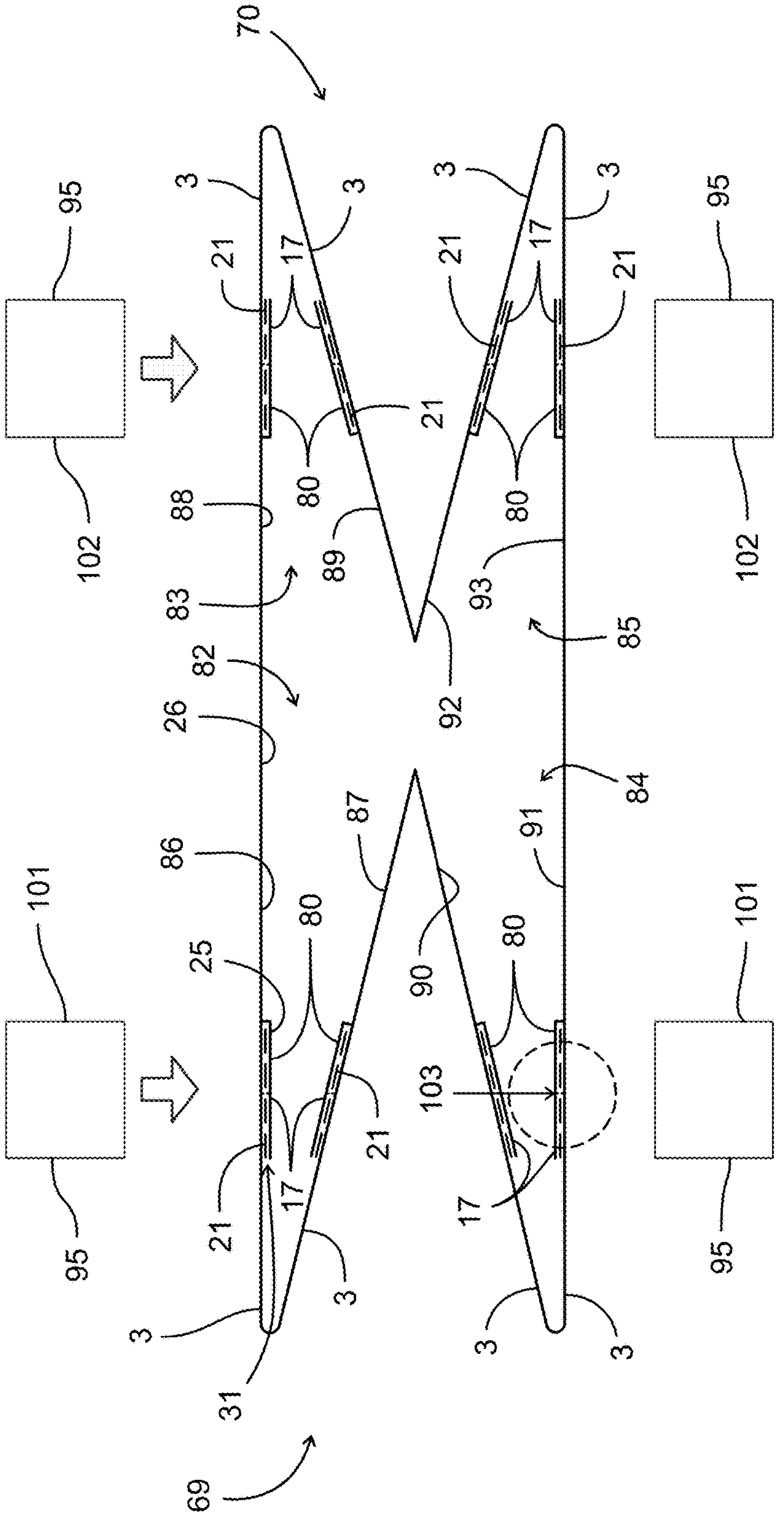
FIG. 48 illustrates heat-sealing 4 baffle inserts to a bag body portion in a preferred embodiment of the method of the present invention, with the overlapped portion taken along lines 48-48 of FIG. 27.
Figure 49:
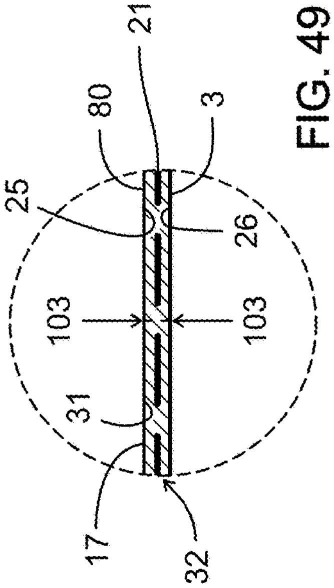
FIG. 49 is a close up detail view of FIG. 48.

Portions of exterior surface 25 of a longitudinal panel 8 or 80 and exterior surfaces 31 of tabs 17 of baffle insert 4 or 40 are preferably coupled to an interior surface 26 of body 3 via a heat sealing method as shown in FIGS. 48-49. Body 3 interior surface 26 can be uncoated flexible plastic fabric, e.g., uncoated, woven polypropylene fabric. Hot melt 21 in a film form preferably is applied to the exterior surfaces 31 of tabs 17 and portions of exterior surface 25 of longitudinal panels 8 or 80 that will be joined to interior surface 26 of body 3.

Figure 12:
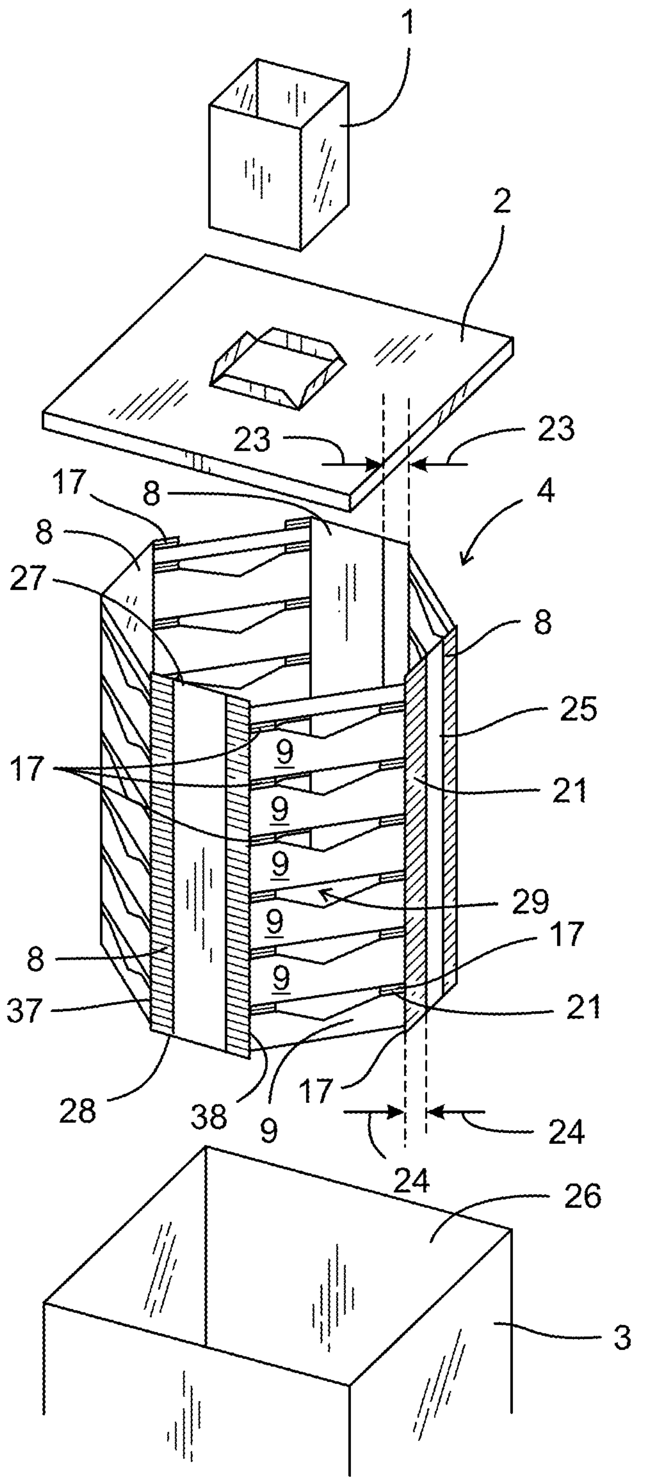
FIG. 12 is a partial exploded view of the first preferred embodiment of the apparatus of the present invention.

In FIG. 12, a detail view of a first preferred embodiment of insert 4 is shown while in an expanded configuration, e.g., illustrating the shape of insert 4 when it is in baffle bulk bag 10 when filled with bulk material. The shaded portions of tabs 17 and longitudinal panel 8 represent the preferred area where hot melt 21 is applied. The shaded area represents a location where a heat seal joint 32 will be formed between baffle insert 4 and body 3.

Figure 13:
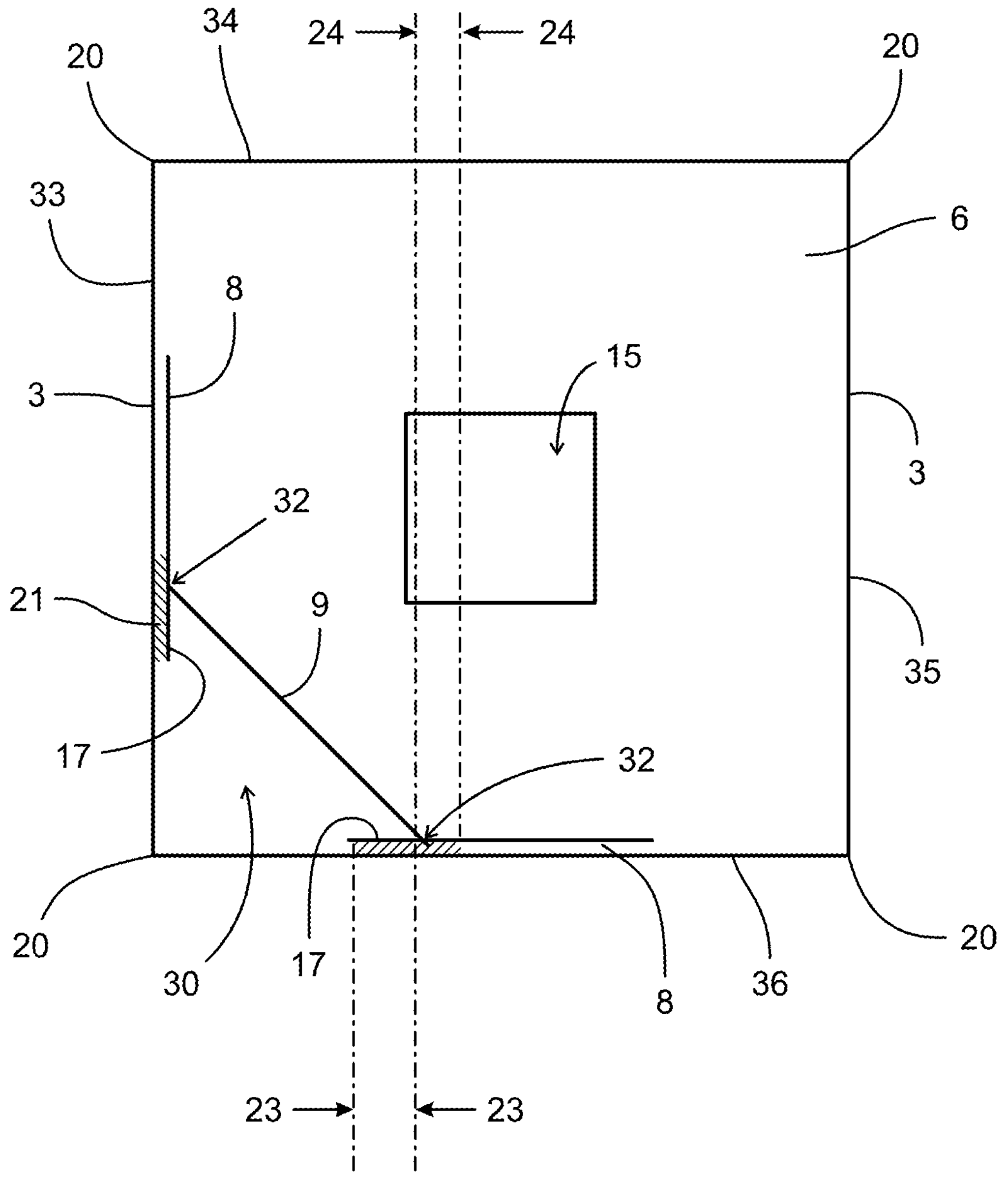
FIG. 13 is another detail cutaway top view of the first preferred embodiment of the apparatus of the present invention.

FIG. 13 is a cutaway top detail view of a baffle bulk bag 10 that does not include a top 2 or fill spout 1 thereon. The figure illustrates joints 32 formed via a heat sealing method that are coupling body 3 and two tabs 17 together and coupling body 3 and portions of a longitudinal panel 8 together, with the hot melt 21, preferably in film form, in between body 3 and tabs 17, and in between body 3 and portions of a longitudinal panel 8, as shown in a detail view in the joint 32 formed connecting baffle insert 4 to sidewall 33 of body 3.

Figure 11:
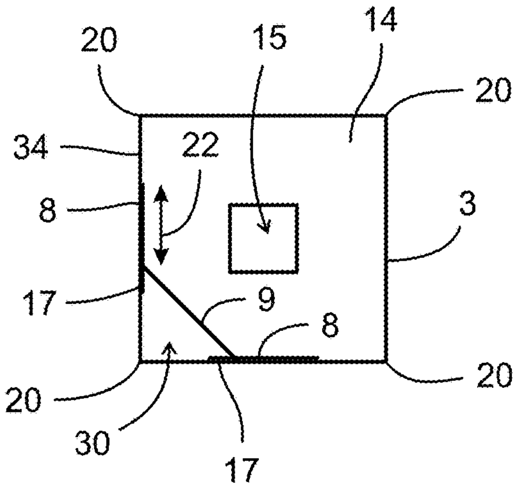
FIG. 11 is a detail cutaway top view of the first preferred embodiment of the apparatus of the present invention.
Figure 9:
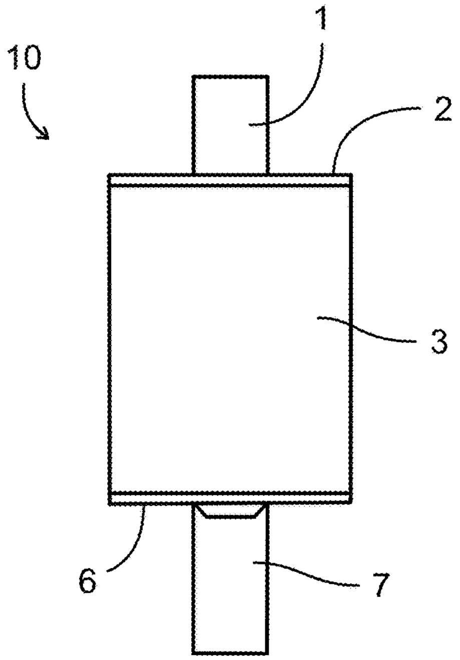
FIG. 9 is another front view of the first preferred embodiment of the apparatus of the present invention.

When baffle insert 4 is coupled to body 3, preferably each longitudinal panel 8 is positioned about centrally on a body 3 sidewall 33, 34, 35, or 36 and the straps 9 extend across corners 20 at a diagonal, e.g., preferably at an angle of, or between, about 30 to 45 degrees from one side wall, e.g., side wall 36, to another side wall, e.g., side wall 33 (see FIGS. 11, 13). In FIG. 11, arrow 22 represents a width of longitudinal panel 8 of baffle insert 4 positioned about centrally along a body 3 side 34.

Along right and left sides of longitudinal panel 8, hot melt 21 film can be applied longitudinally, e.g., preferably at about a two-inch width (designated by arrows 24 in FIG. 12) of hot melt 21 film applied continuously along an exterior surface 25 of a longitudinal length of a right side of longitudinal panel 8 from top 27 to bottom 28 to a right edge 38, and preferably about a two-inch width of hot melt 21 film applied continuously along a longitudinal length of a left side of longitudinal panel 8 from top 27 to bottom 28 to a left edge 37. The width (designated by arrows 24 in FIG. 12) of hot melt 21 film applied along right and left sides of longitudinal panel 8 can also be about 1.5 to 4 inches. All of a panel 8 also potentially could include hot melt 21 film thereon, but testing has showed this is not necessary to achieve desired strength of the joint.

Preferably, hot melt 21 in film form is applied continuously to an entire exterior surface 31 of a tab 17 along a length of tab 17 (designated by arrows 23 in FIG. 12). A tab 17 can extend preferably about 2 inches into space 29 between straps 9, or about 2 inches into a space above or below a strap 9. A tab 17 can also extend about 1.5 to 4 inches into space 29 between straps 9, or into space above or below a strap 9. Preferably a tab 17 is located on both sides of a strap 9 a distance extending beyond pivot point 94 of a strap 9, so that tab 17 can counter or overcome peel forces on strap 9 at the intersection 53 of strap 9 with the bag body 3 and/or longitudinal member 8, 80. A pivot point 94 is a point or location where straps 9 make contact with the bag sidewalls, at a transition area or intersection 53 where straps 9 (which are free and not coupled to a bag body) start to extend away from longitudinal portion 8 or 80 that is coupled with a heat sealed joint to a bag body 3.

Preferred heat sealing methods of heat sealing the first, second, third and fourth preferred embodiments of a baffle insert 4, 40 to bag body 3 will now be discussed.

Figure 18:
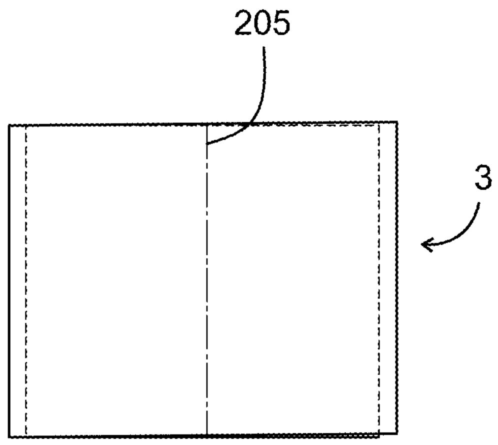
FIG. 18 is a top view of a body portion shown in FIG. 15 in folded/gusseted configuration.
Figure 19:
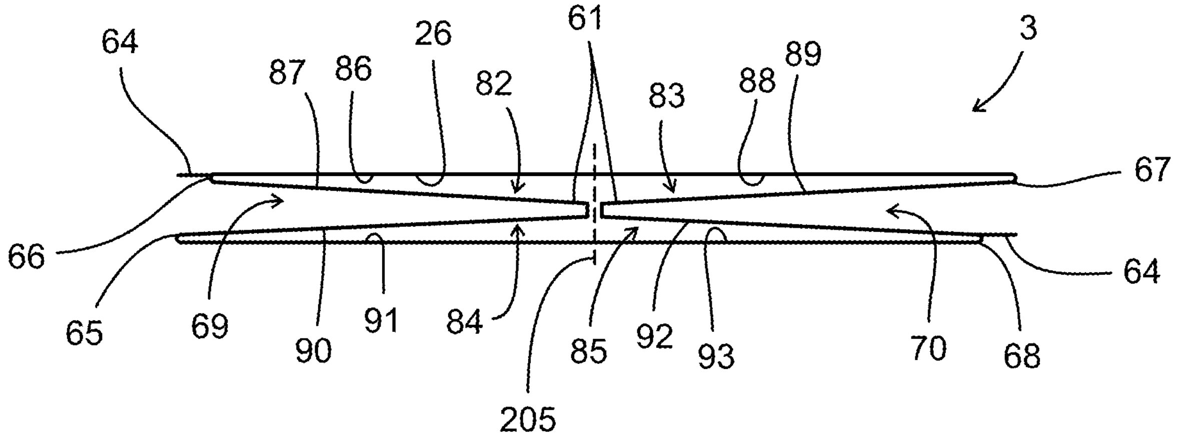
FIG. 19 is an end view of a body portion shown in FIG. 18.
Figure 46:
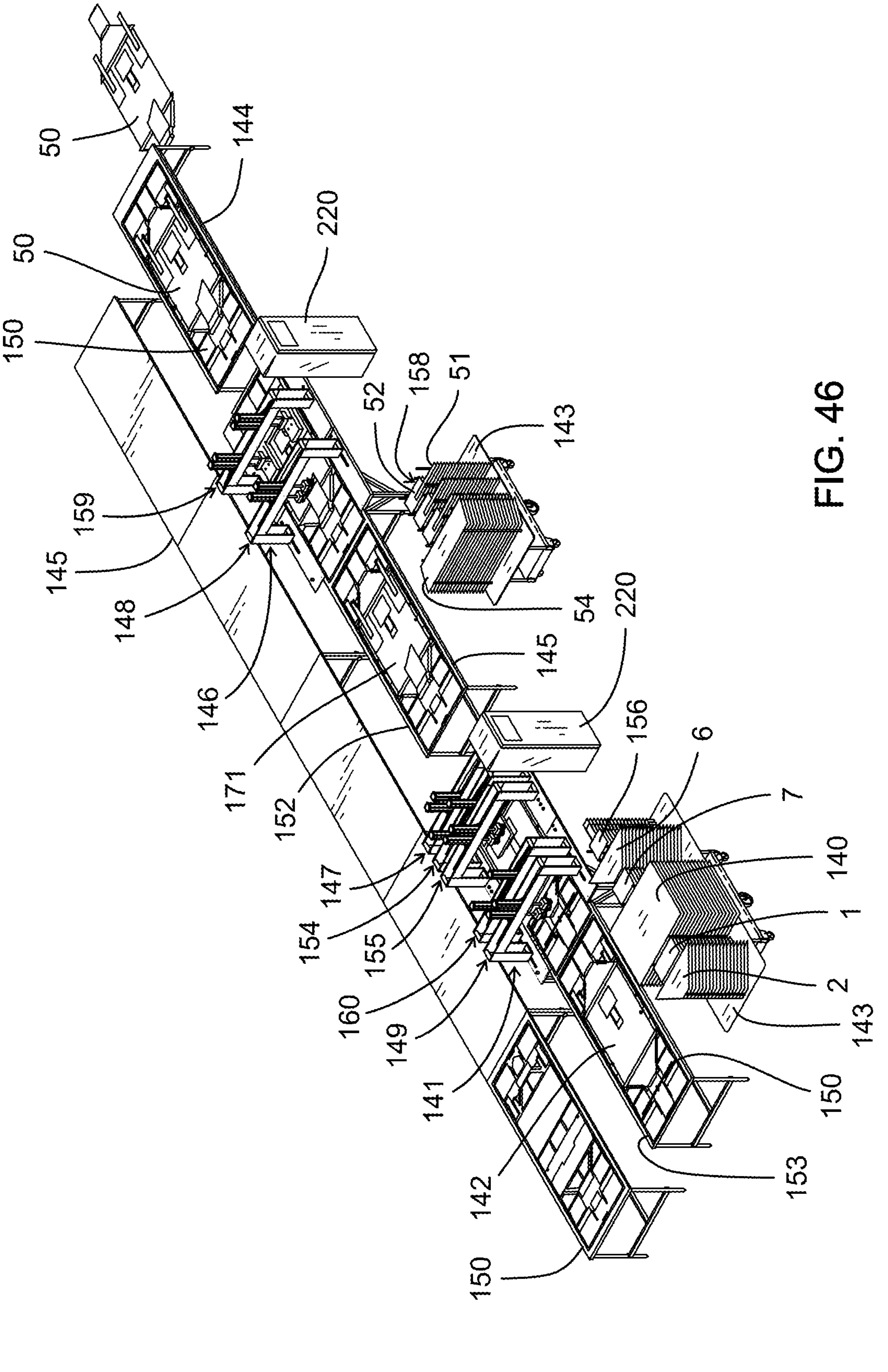
FIG. 46 is a perspective view of a heat seal assembly line production area in a preferred embodiment of the method of the present invention.
Figure 47:
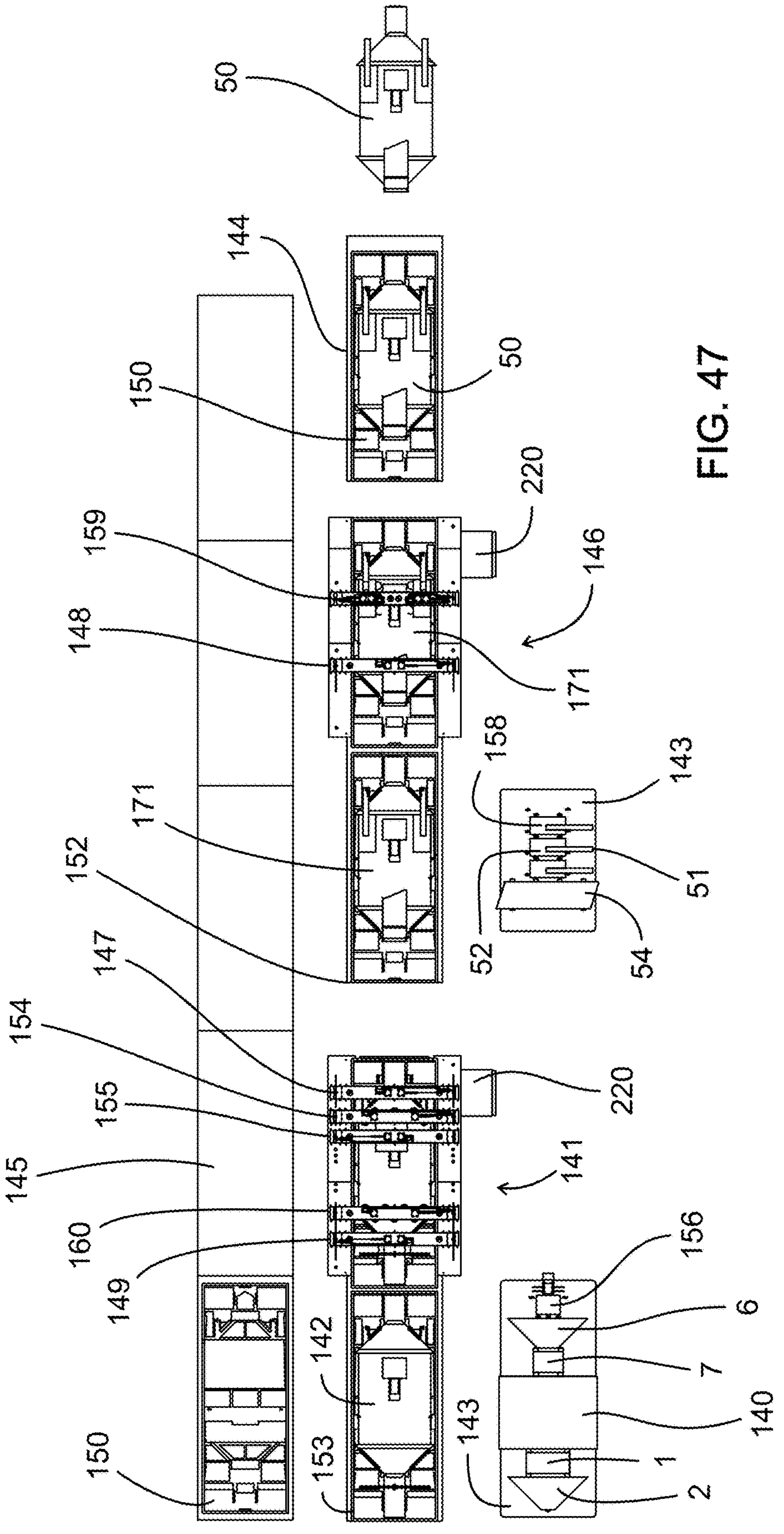
FIG. 47 is a top view a heat seal assembly line production area in a preferred embodiment of the method of the present invention.

FIGS. 15-19 illustrate a baffle body 140 of baffle bulk bag 10, that preferably includes a body 3 with a baffle insert 4 therein. Body 3 is preferably a tubular piece of flexible plastic fabric, e.g., polypropylene fabric, that can be folded/gusseted as shown in FIGS. 18 (which is a top view) and 19 (which is an end view). Body 3 is folded as shown in FIGS. 18-19 in a folded/gusseted heat sealing configuration when on a carrier plate 150 and ready to be heat sealed to a top 2 and bottom 6 in a heat sealing machine/baffle heat seal machine 110, e.g., as shown in FIGS. 46-47. Body 3 preferably has a heat sealing coating on an exterior surface that is used in a heat scaling process of forming heat sealed joints with top 2 and bottom 6. An over edge coating 64 portion is preferably included as shown in the FIGS. 16, 17, 19. Body 3 has two open end portions 62, 63 and two fabric edge portions 61 that are not open. Reference is made to U.S. Pat. Nos. 10,618,225 and 10,112,739 for further details on this process.

In FIGS. 6-8 a second preferred embodiment of a baffle insert 4 is shown. In FIGS. 7 and 8, baffle insert 4 is folded/gusseted in a heat-scaling configuration. FIG. 7 illustrates a top view of a folded/gusseted baffle insert 4 that is ready to be inserted into a bag body 3, that is also in a folded/gusseted configuration (see FIGS. 18-19), and to be heat sealed thereto. FIG. 8 illustrates an end view of baffle insert 4 in folded, gusseted configuration. A first preferred embodiment of a baffle insert 4 as shown in FIGS. 1-4, for example, can also be folded/gusseted to form a similar folded/gusseted heat sealing configuration and coupled to a bag body 3 in the same manner as described herein with regard to the second preferred embodiment of a baffle insert 4 as shown in FIGS. 6-8.

Baffle insert 4, in a folded/gusseted heat sealing configuration as shown in FIGS. 7 and 8 can be inserted into body 3 while body 3 is in a folded/gusseted heat sealing configuration as shown in FIGS. 18 and 19. Baffle insert 4 when folded/gusseted has two opposing longitudinal 8 portions drawn inward at sides of the baffle insert 4 to form gussets 41 and 42. Gusset 41 has two gusset edges 43, 44 and gusset 42 has two gusset edges 45 and 46. Portions of straps 9 are also pulled inward at the gussets 41, 42. Preferably gussets 41 and 42 are drawn inward but do not touch one another as shown in the figures.

Body 3 in gusseted configuration as seen in FIGS. 15-19 also has two gussets 69 and 70 formed by drawing opposing fabric edges 61 of body 3 inward. Gusset 69 has two edges 65, 66, and gusset 70 has two edges 67 and 68. Preferably the fabric of gussets 69 and 70 are drawn inward but do not touch one another as shown in the figures.

When heat sealing baffle insert 4 to body 3, the baffle insert 4 is inserted into body 3 with gusset 41 of baffle insert 4 overlapped with gusset 69 of body 3, and with gusset 42 of baffle insert 4 overlapped with gusset 70 of body 3. Preferably the overlapping occurs so that hot melt 21 film on tabs 17 and longitudinal panel 8 is in contact with interior surface 26 of body 3 and aligned about centrally on a side wall of body 3 whether the sidewall is on a top layer of fabric, bottom layer of fabric, or part of a gusset in the folded configuration.

Figure 1:
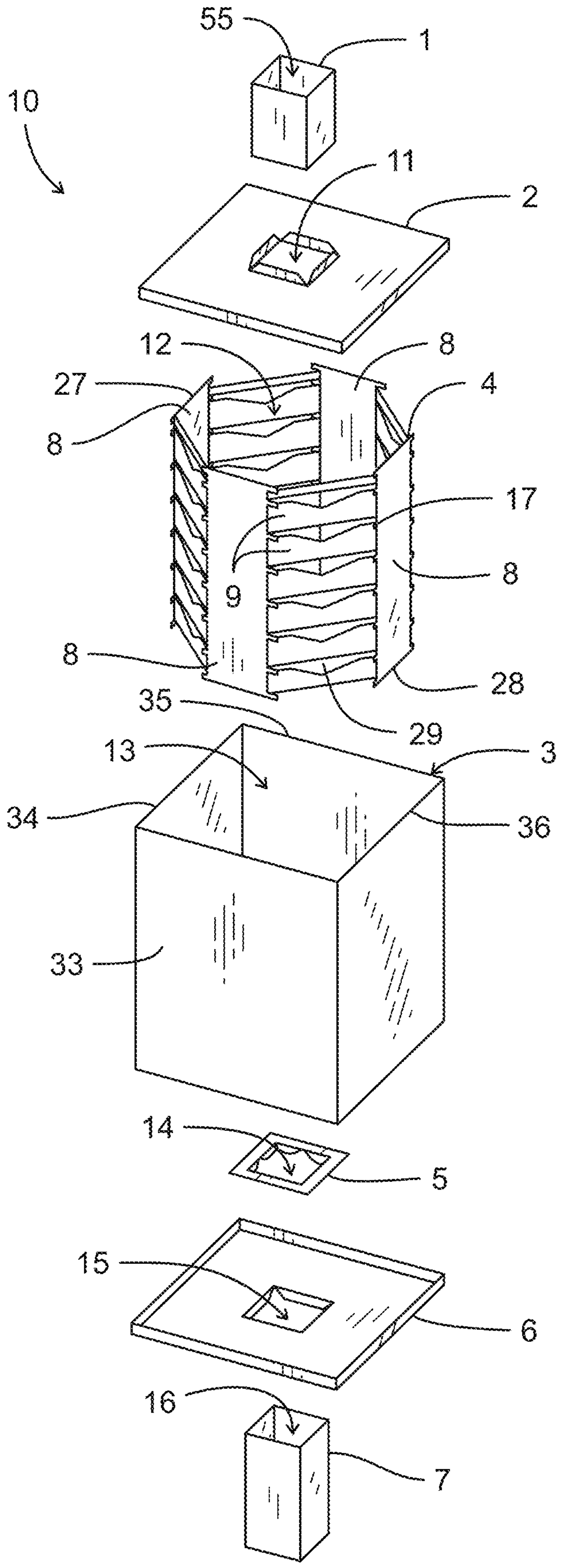
FIG. 1 is an exploded view of a first preferred embodiment of the apparatus of the present invention including a first preferred embodiment of a baffle insert of the present invention that is tubular.
Figure 2:
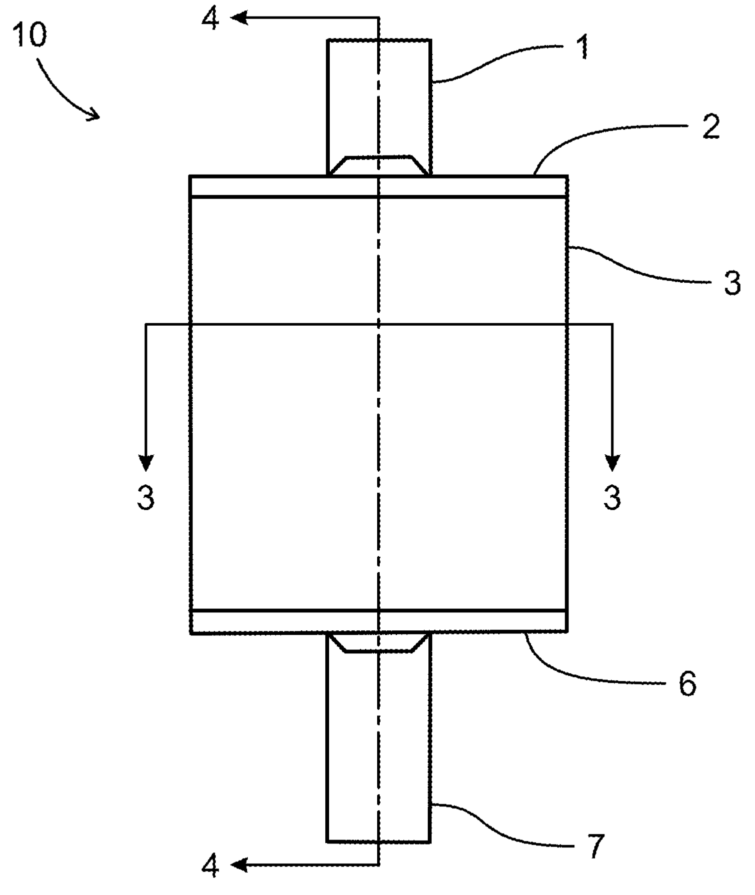
FIG. 2 is a front view of the first preferred embodiment of the apparatus of the present invention.
Figure 3:
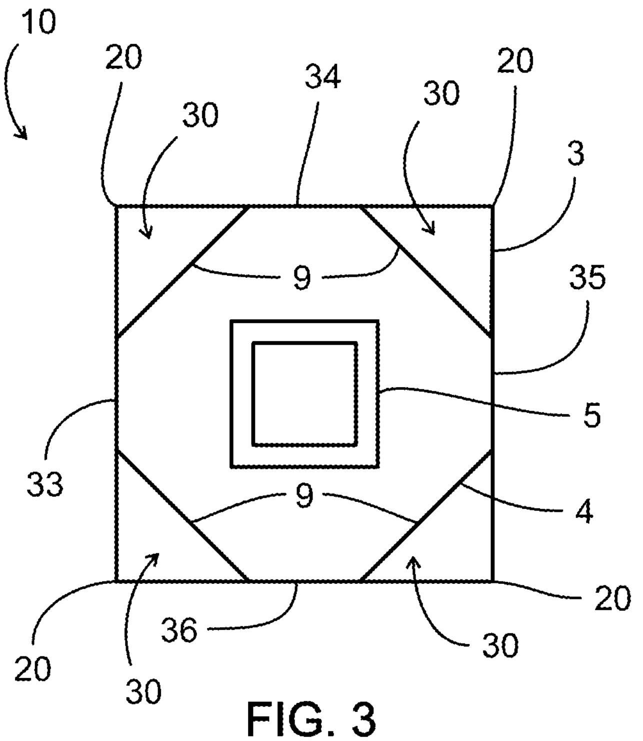
FIG. 3 is a sectional view of the first preferred embodiment of the apparatus of the present invention taken along lines 3-3 of FIG. 2.
Figure 4:
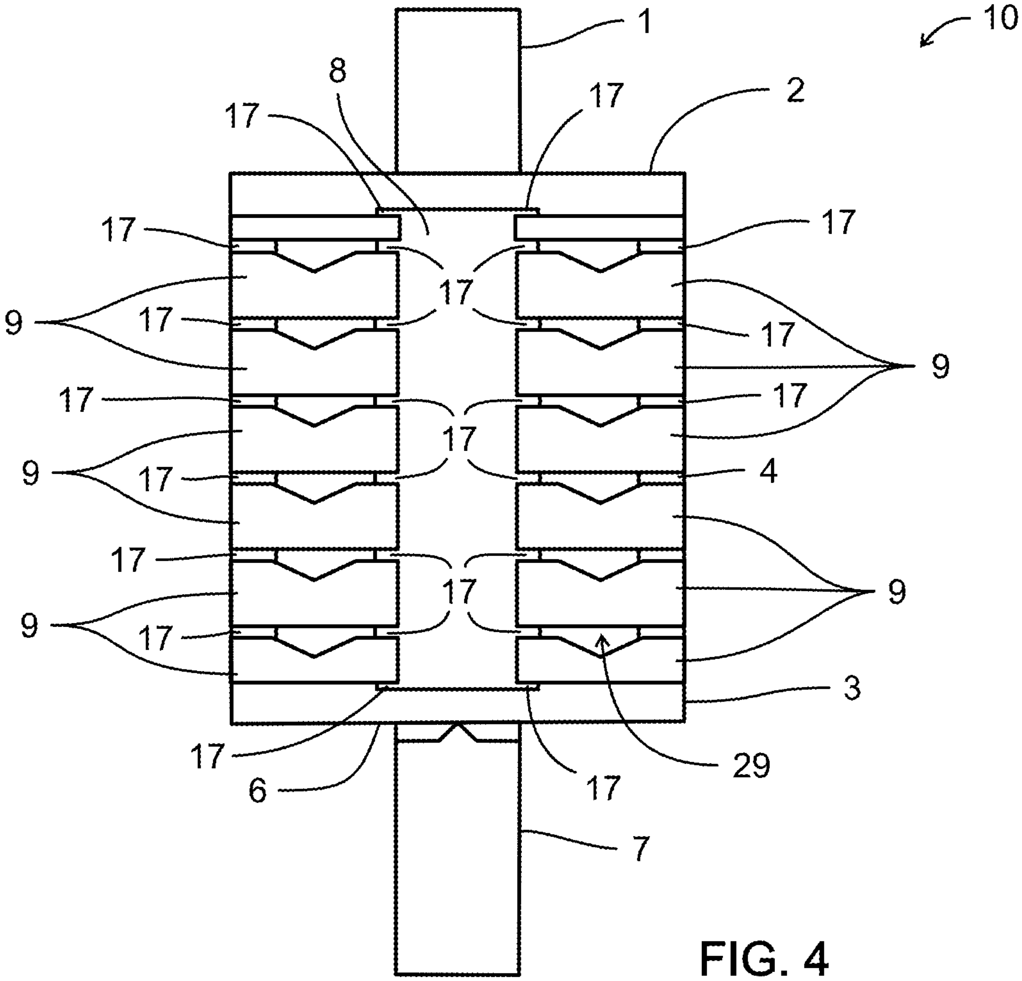
FIG. 4 is a sectional view of the first preferred embodiment of the apparatus of the present invention taken along lines 4-4 of FIG. 2.
Figure 5:
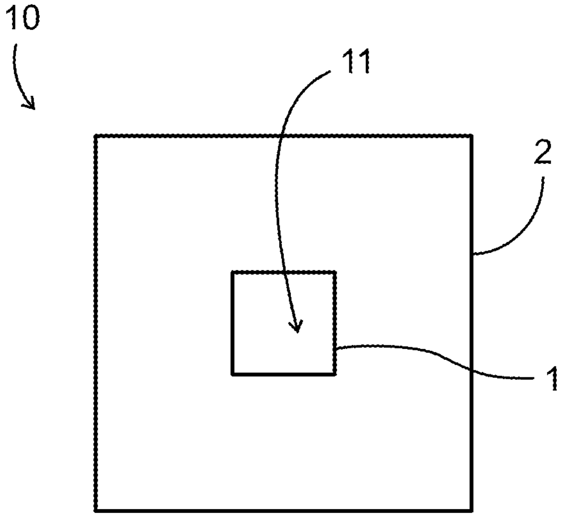
FIG. 5 is a top view of the apparatus shown in FIG. 2.

The overlapped baffle insert 4 and body 3 can be moved into a heat sealing machine 110 wherein heat seal bars, e.g., upper and lower heat seal bars, can move into contact with top and bottom surfaces of the gusseted and overlapped body 3 and apply heat and pressure to melt the hot melt 21 film that will then join body 3 to tabs 17 and longitudinal panel 8. Preferably a temperature of about 275 degrees Fahrenheit and about 90 second dwell time is used during heat sealing. Since the body 3 is fully gusseted, a single pair of seal bar assemblies 101, 102 can be used to heat seal a baffle insert 4 to body 3 at all four corners. After heat sealing to form joints 32 coupling body 3 to baffle insert 4 a baffle body 140 is formed and baffle body 140 can open up or expand to a configuration as shown in FIG. 3 with straps 9 extending across body 3 corners 20 along a diagonal, and with a triangular space 30 formed at corners 20 behind straps 9.

Figure 24:
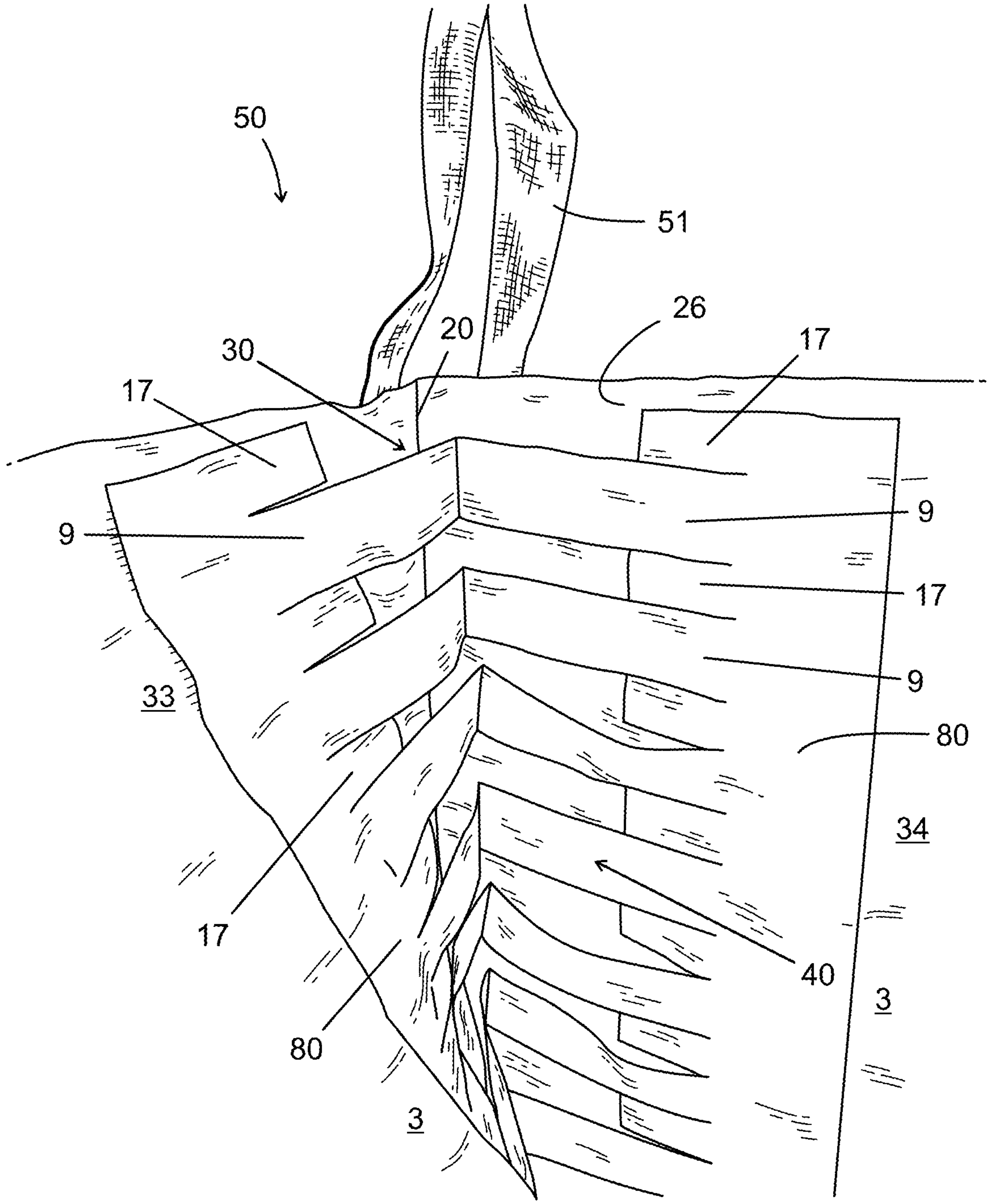
FIG. 24 is another partially expanded view of a second preferred embodiment of the apparatus of the apparatus of the present invention including a fourth preferred embodiment of a baffle insert.
Figure 25:
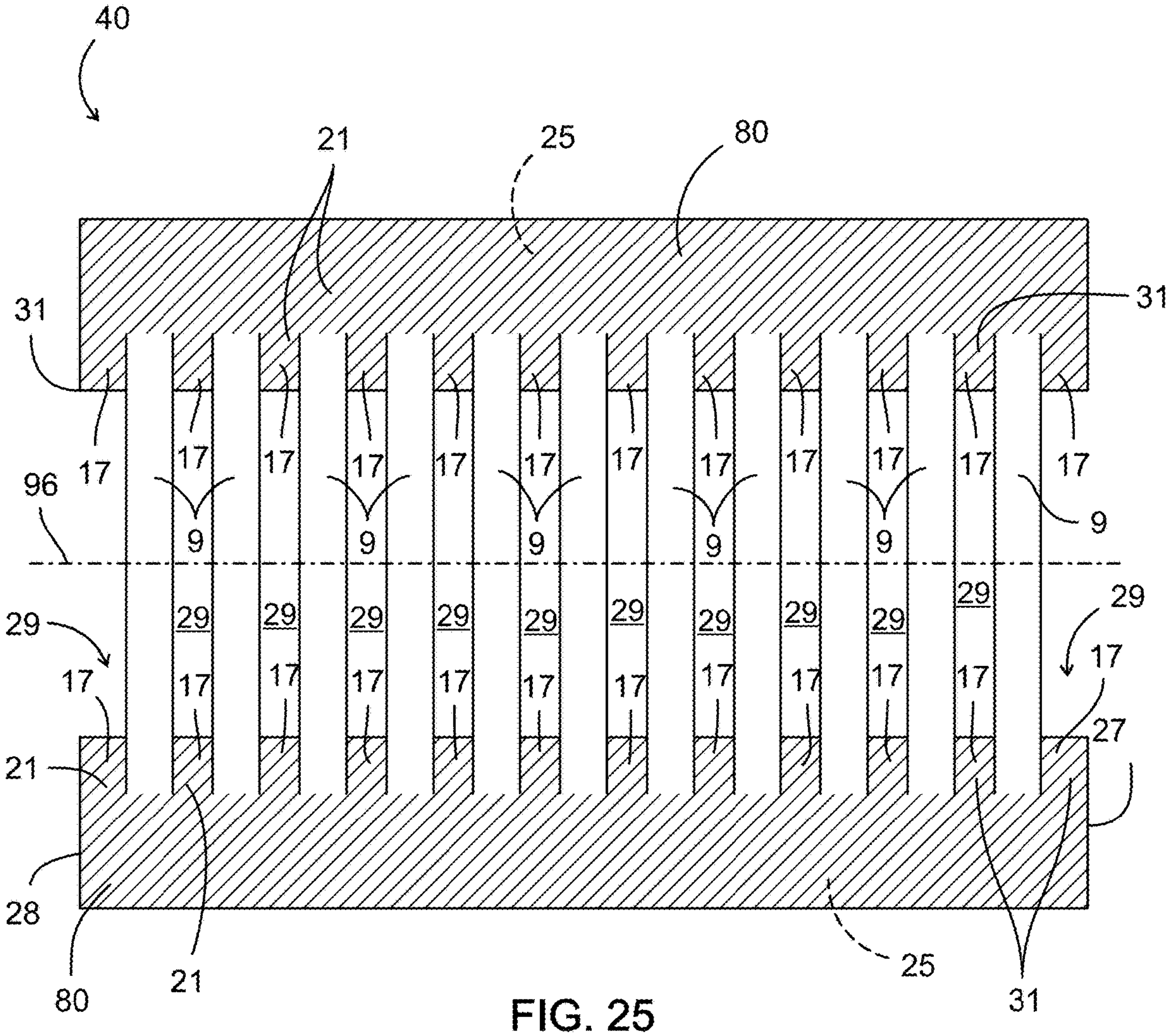
FIG. 25 is top view of a fourth preferred embodiment of a baffle insert that can be included in one or more preferred embodiments of the apparatus of the present invention.
Figure 26:
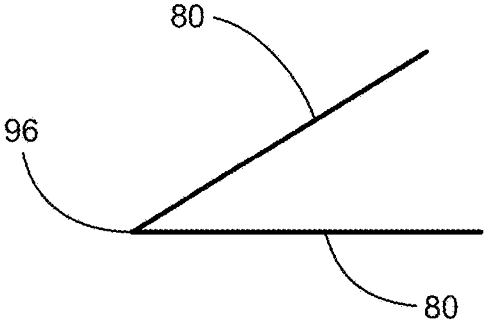
FIG. 26 is an end view of a fourth preferred embodiment of a baffle insert in a folded configuration.

Four baffle inserts 40, either of the third preferred embodiment as shown in FIG. 14 or of the fourth preferred embodiment as shown in FIG. 25, can be coupled to a bag body 3 (e.g., as shown in FIGS. 15-19, 20-29) of a baffle bulk bag 50, instead of using a singular tubular baffle insert 4. The shaded portions of FIG. 14 and FIG. 25 illustrate portions of longitudinal panel 80 and tabs 17 having hot melt 21 applied in film form to exterior surfaces 25 and 31. For a baffle insert 40, preferably all of a longitudinal portion 80 has hot melt film 21 thereon and preferably all of each tab portion 17 has hot melt film 21 thereon. This shading also represents where a heat seal joint will be formed between baffle insert 40 longitudinal panels 80 and an interior surface 26 of body 3 and between baffle insert 40 tabs 17 and an interior surface 26 of body 3. Fold line 96 in FIGS. 14, 25, 26 represents where a baffle insert 40 is preferably folded in half to form a folded heat scaling configuration of a baffle insert 40 as shown in an end view in FIG. 26.

When using baffle inserts 40 to form a baffle bulk bag 50, four baffle inserts 40 can be coupled to body 3 across corners 20 of body 3. Hot melt 21 in film form is preferably applied onto exterior surface 31 of tabs 17 and an exterior surface 25 of longitudinal panels 80 for four baffle inserts (one to extend across each corner 20 of body 3) in the shaded area as shown in FIGS. 14, 25, 26. The four folded baffle inserts 40 (one for each corner) are then folded in half (see FIG. 26), e.g., at fold line 96 and inserted into a fully gusseted body 3 (see FIGS. 18-19).

Figure 50:
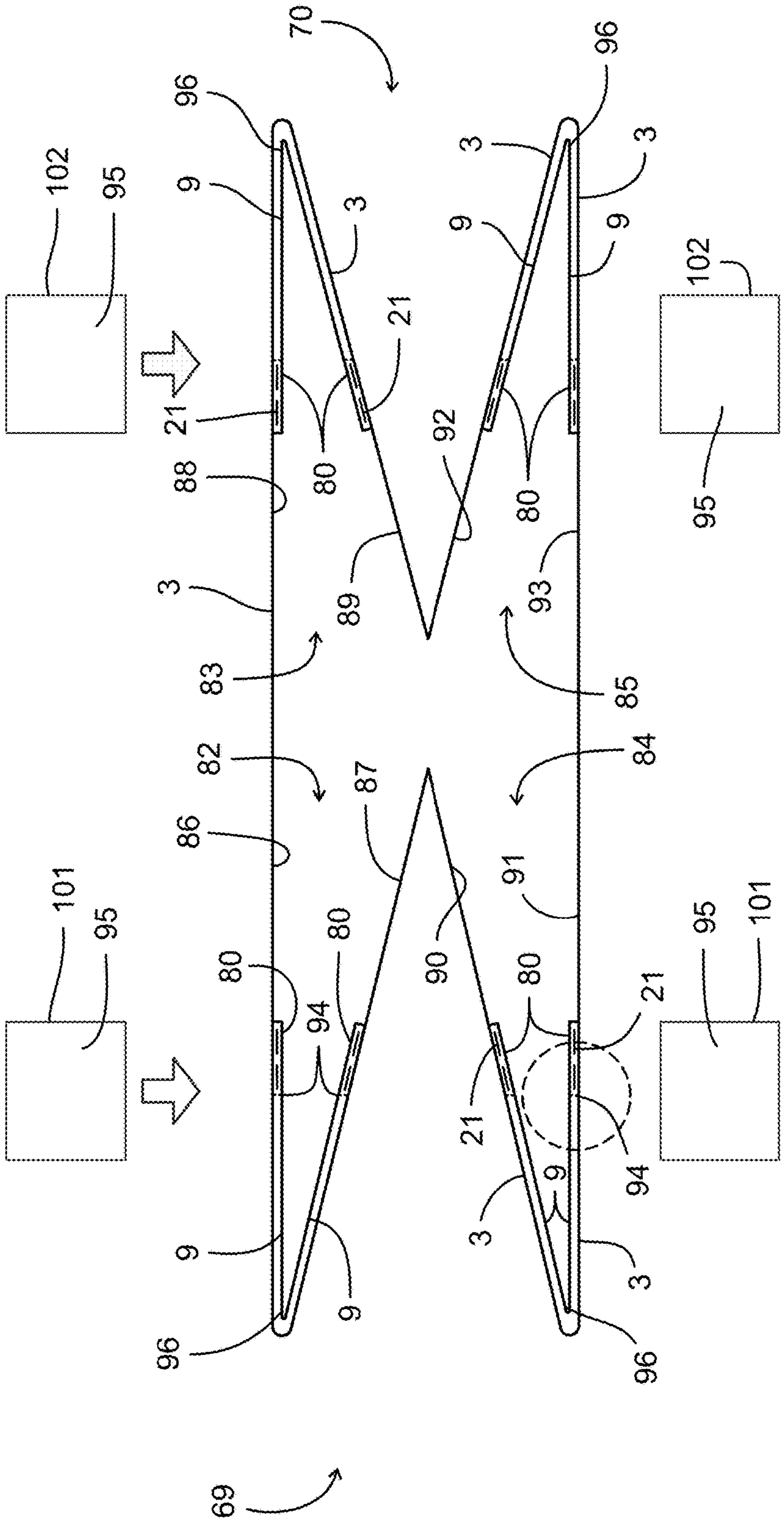
FIG. 50 illustrates heat-sealing 4 baffle inserts to a bag body portion in a preferred embodiment of the method of the present invention, with the overlapped portion taken along lines 50-50 of FIG. 27.

A baffle insert 40 as shown in FIGS. 14, 25 can be folded in half, e.g., about centrally at fold line 96. Baffle inserts 40 can then be inserted into an interior of body 3 gussets 69 and 70 (see FIGS. 48, 50). As shown in FIGS. 19, 48, 50, interior surface 26 of body 3 can have eight interior portions 86, 87, 88, 89, 90, 91, 92, 93 within gussets 69, 70 to which respective baffle inserts 40 will be heat sealed to. One folded baffle insert 40 will be inserted so that the hot melt 21 is in contact with interior surfaces 86 and 87 of folded area 82. One folded baffle insert 40 will be inserted so that the hot melt 21 is in contact with interior surfaces 88 and 89 of folded area 83. One folded baffle insert 40 will be inserted so that the hot melt 21 is in contact with interior surfaces 90 and 91 of folded area 84. One folded baffle insert 40 will be inserted so that the hot melt 21 is in contact with interior surfaces 92 and 93 of folded area 85. A body 3 with four baffle inserts 40 overlapped therein is then placed under heat seal bar assemblies 101, 102 in a machine 110. Since body 3 is fully gusseted, a single pair of heat seal bar assemblies 101, 102, preferably including upper and lower heat seal bars 95 can be used to heat seal all four baffle inserts 40 to body 3 at one time. After heat sealing, joints 32 are formed coupling body 3 to four baffle inserts 40 to form a baffle body 140. Baffle body 3 can open up or expand to a configuration similar to what is shown in FIG. 3 with straps 9 extending across body 3 corners 20 along a diagonal.

A carrier plate 150, described further below herein, can be adapted to also receive the overlapped body 3 and baffle insert 4, 40 if desired and to be moved into heat seal machine 110 during heat sealing. Stops and/or guides can be added to heat seal machine 110 to receive a carrier plate 110 and facilitate proper alignment of an overlapped body 3 and baffle insert 4 or 40 in a machine 110.

Figure 20:
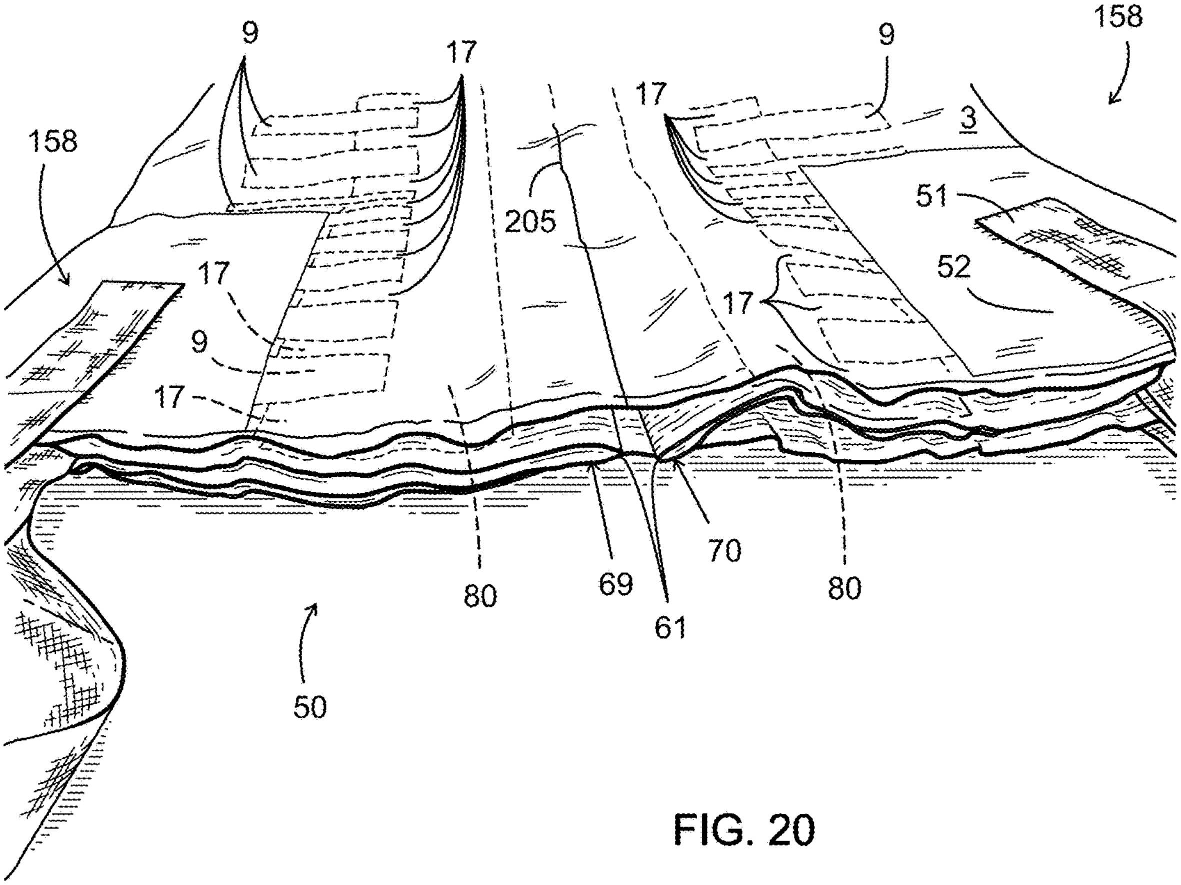
FIG. 20 is a detail view of a second preferred embodiment of the apparatus of the apparatus of the present invention in folded, gusseted configuration and including a fourth preferred embodiment of a baffle insert.
Figure 21:
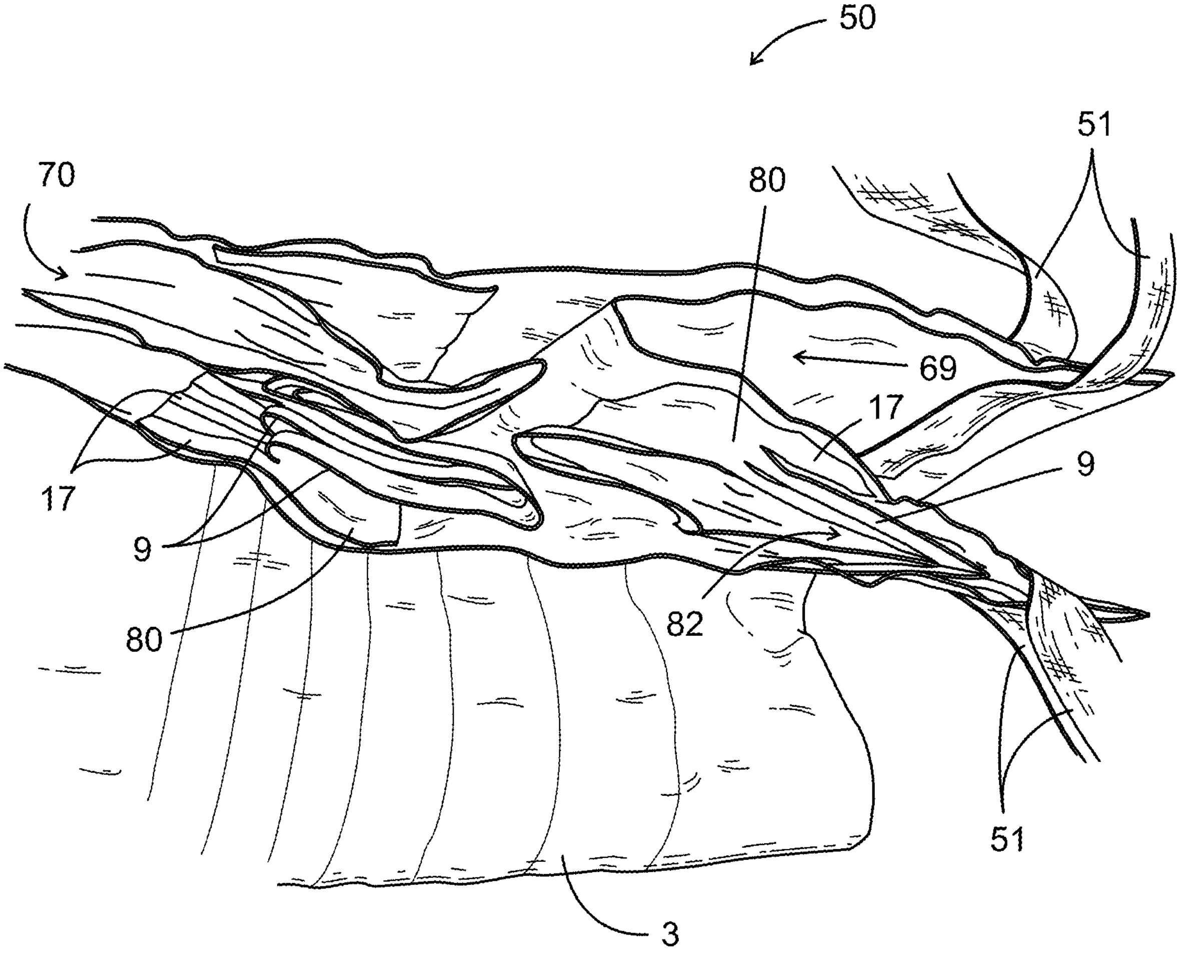
FIG. 21 is another detail view of a second preferred embodiment of the apparatus of the apparatus of the present invention in folded, gusseted configuration and including a fourth preferred embodiment of a baffle insert.
Figure 22:
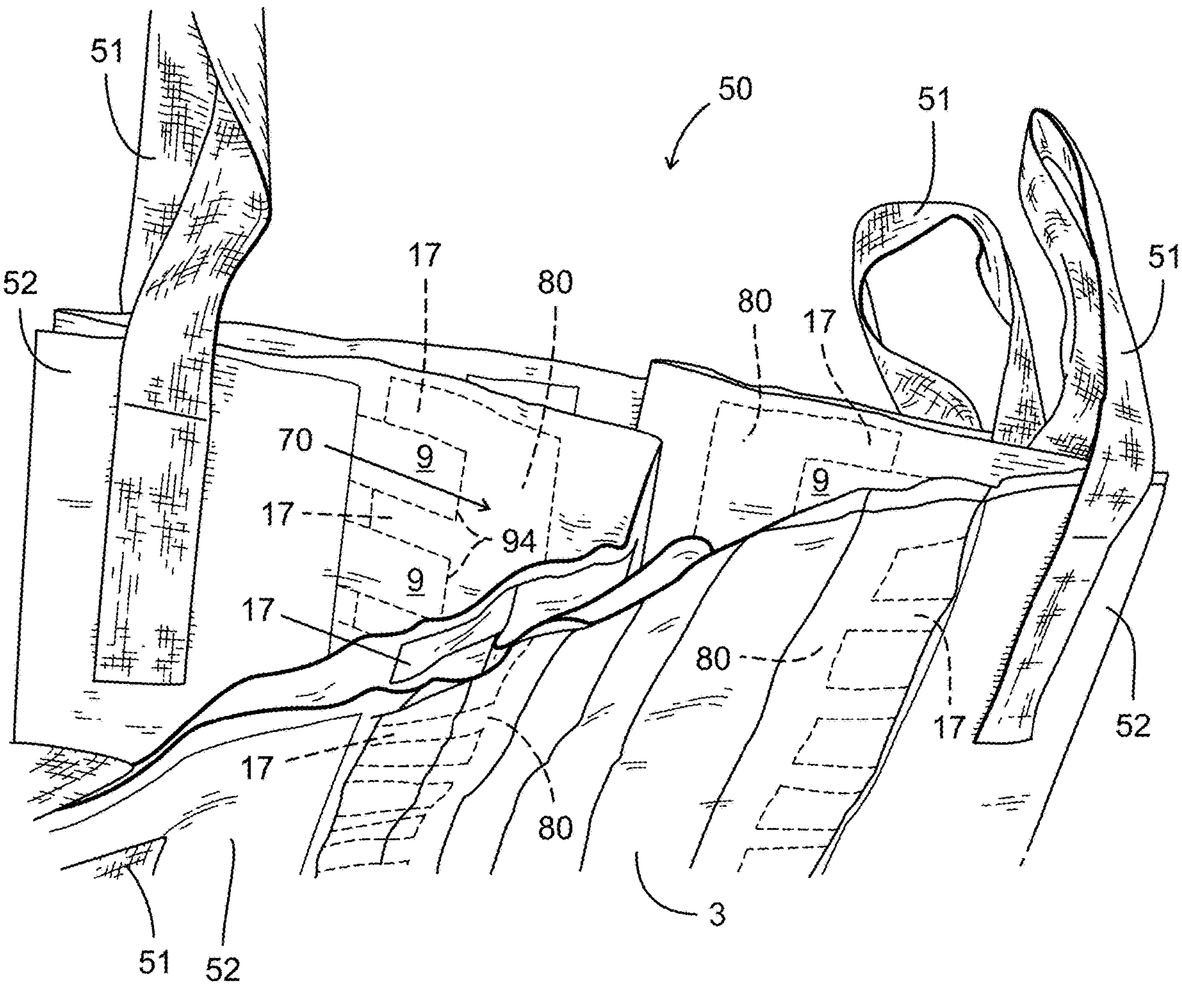
FIG. 22 is another detail view of a second preferred embodiment of the apparatus of the apparatus of the present invention in folded, gusseted configuration and including a fourth preferred embodiment of a baffle insert.

FIGS. 20-22 are close up detail views of a body 3 of a bag 50 with four baffle inserts 40 that have been coupled to an interior surface 26 of body 3 using hot melt 21 and a heat sealing process of the present invention. In FIGS. 20-22, body 3 is in a folded, gusseted configuration with baffle inserts 40 folded and overlapped in the gussets 69, 70. In FIG. 20, a top view of the folded, gusseted body is shown with the location of baffle inserts 40 coupled to the interior of body 3 shown in phantom view. The joints 32 are in the location of tabs 17 and longitudinal portion 80.

In FIG. 21, an interior surface view of gussets 69, 70 of the folded/gusseted baffle bag 50 as shown in FIG. 20 is illustrated partially opened at one end with baffle straps 9 folded backward to illustrate that baffle straps 9 are free and not coupled to body 3, whereas tabs 17 and panels 80 are coupled to body 3. In FIG. 22, an exterior surface of gussets 69, 70 of the folded/gusseted baffle bag 50 as shown in FIG. 20 is shown partially opened and illustrates how two baffle inserts 40 overlap one another in the different folded areas of gussets 70, 69.

Figure 23:
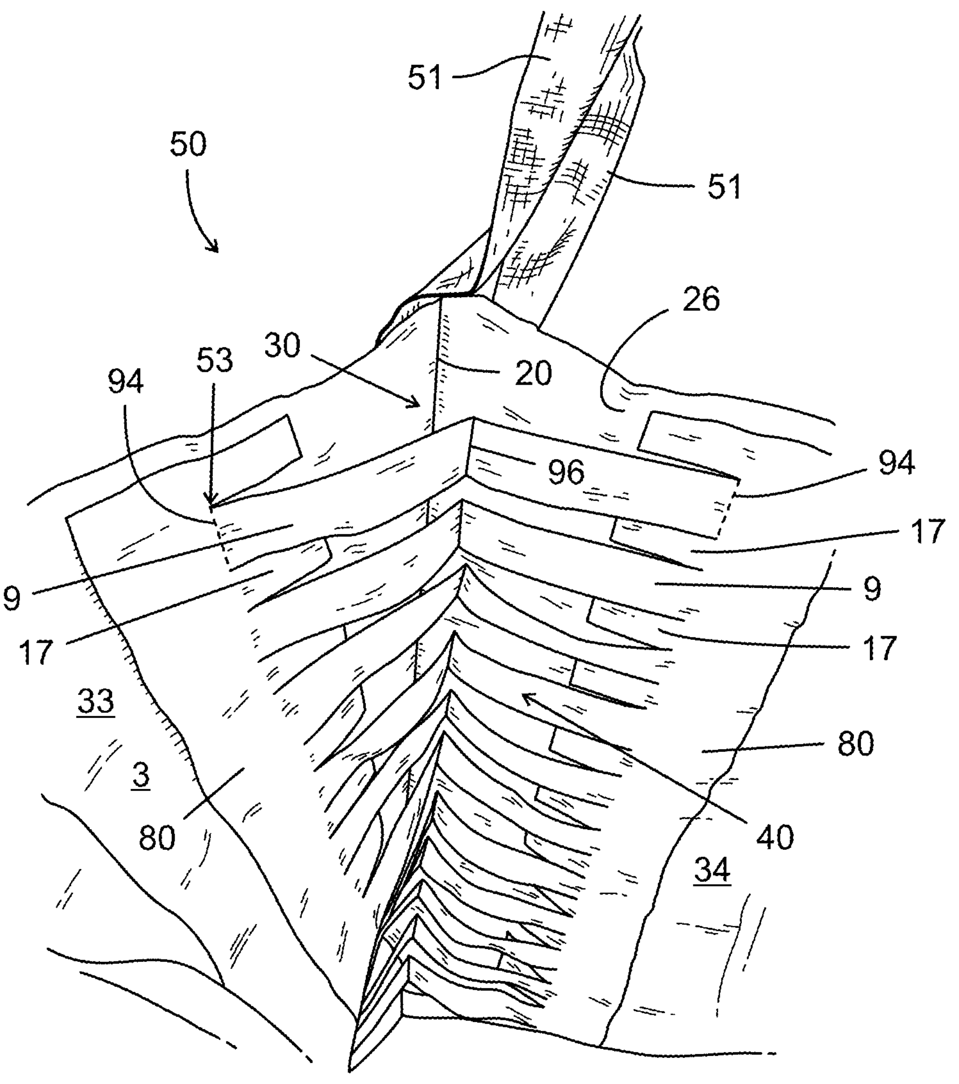
FIG. 23 is a partially expanded view of a second preferred embodiment of the apparatus of the apparatus of the present invention including a fourth preferred embodiment of a baffle insert.

FIGS. 23-24 are partial interior detail views of a body 3 as shown in FIGS. 20-22 when expanded or unfolded and opened. The figures illustrate the location of a baffle insert 40 at a corner 20 of body 3 when body 3 is open/expanded. These views also illustrate how straps 9 are free and not coupled to body 3.

Figure 27:
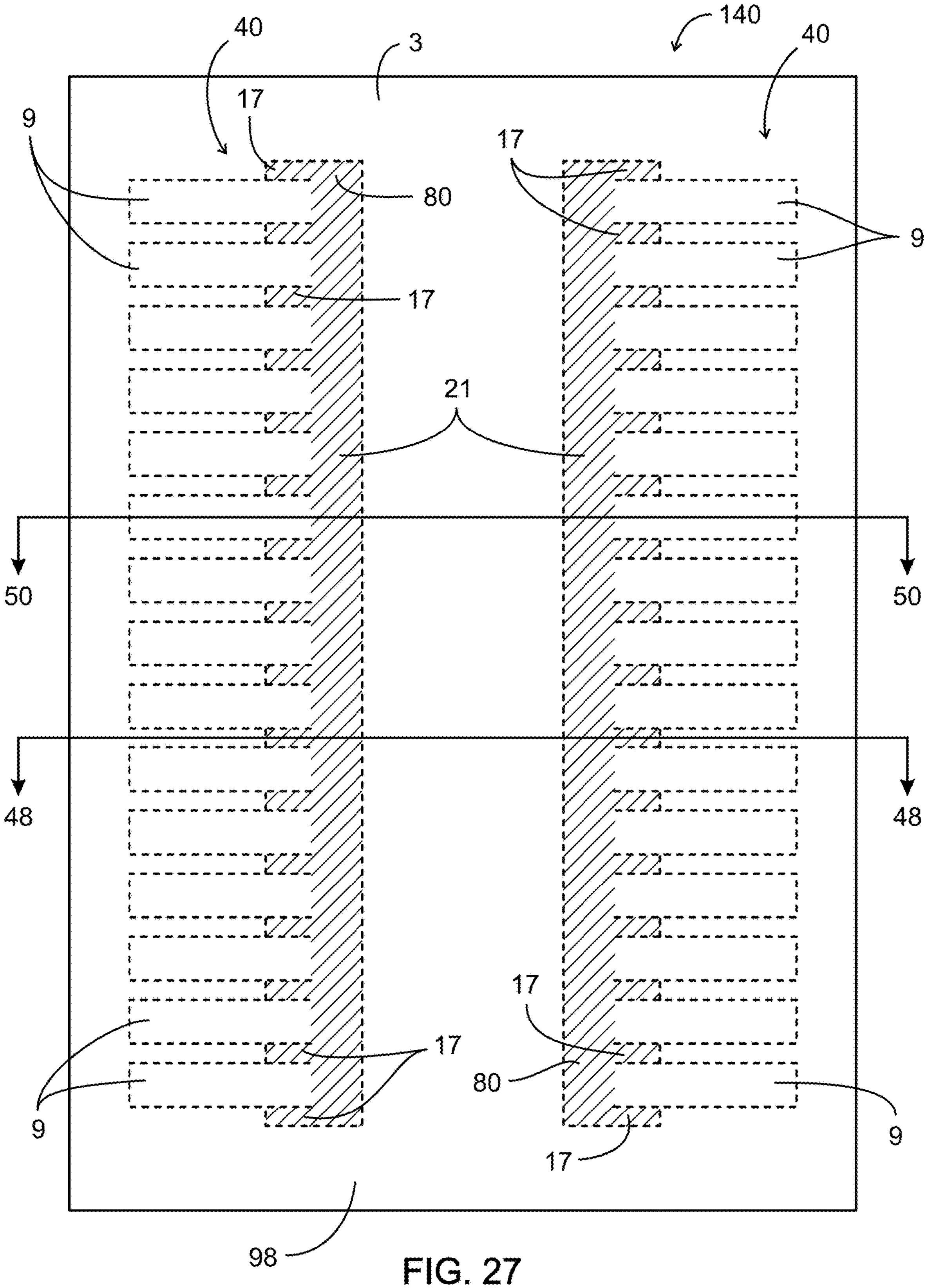
FIG. 27 is a top view of a bag body portion and the fourth preferred embodiment of a baffle insert in an overlapped, gusseted configuration.

FIG. 27 is a top of view of baffle body 140 in a folded/gusseted configuration with four folded baffle inserts heat sealed therein. The top two folded baffle inserts 40 are shown in phantom view. The shading on tabs 17 and 80 represent a heat sealed joint 32 where hot melt film 21 that is on tabs 17 and panel 80 melted under heat and pressure from seal bars 95 of heat seal bar assemblies 101, 102 to form a heat sealed joint 32 in the shaded areas as shown in FIG. 27.

Figure 28:
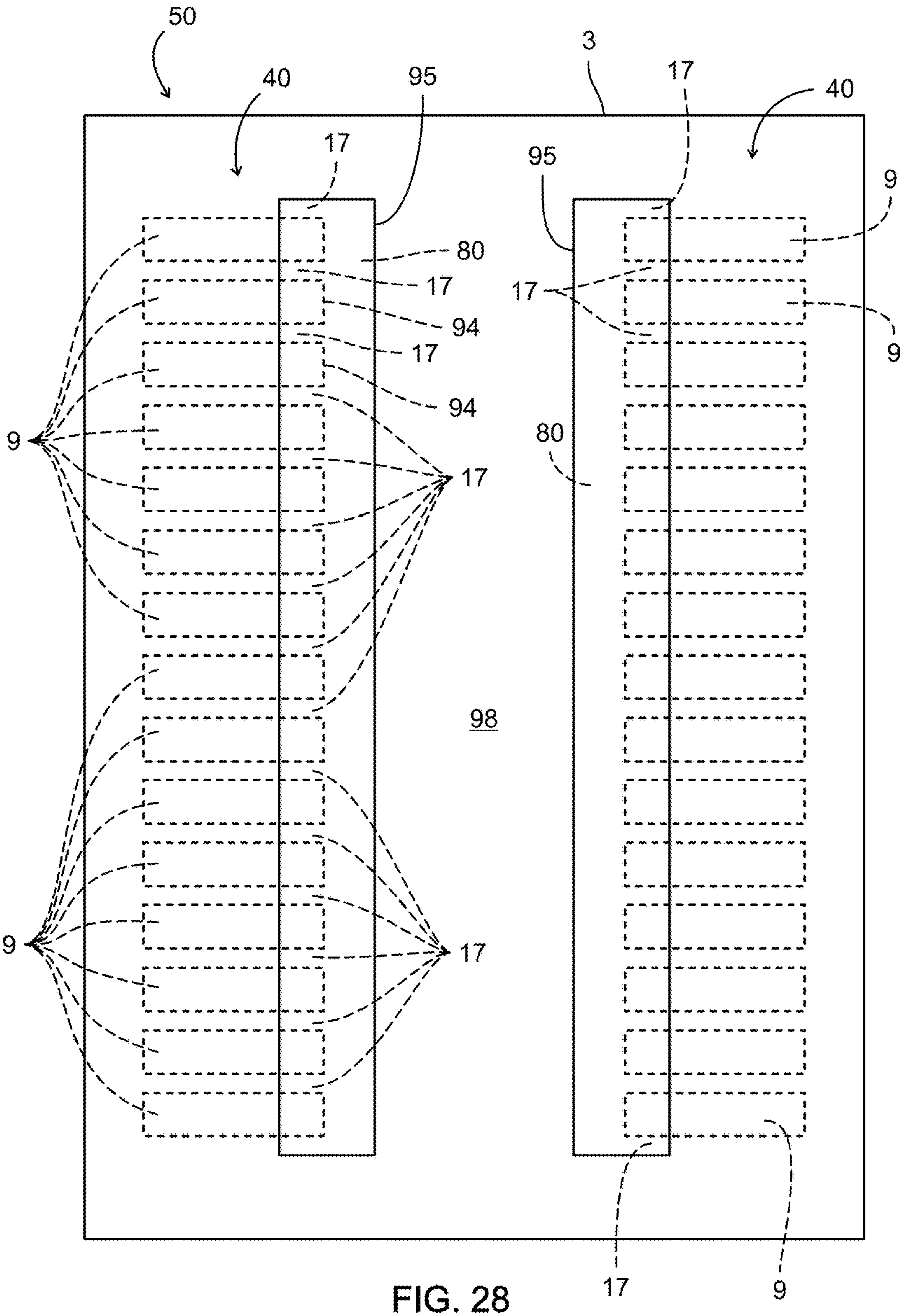
FIG. 28 is a top view of a bag body portion and the fourth preferred embodiment of a baffle insert in an overlapped, gusseted configuration after heat sealing.

In FIG. 28, the rectangular portions designated by the numeral 95 indicate schematically the location on a body 3 (that is in folded/gusseted configuration) where a top or upper heat seal bar 95 of a heat seal bar assembly 101, 102 will make contact with an exterior surface 98 of body 3.

FIG. 48 is a sectional view of a body 3 overlapped with four baffle inserts 40 taken along lines 48-48 of FIG. 27 placed between heat seal bars 95 of heat seal bar assemblies 101, 102. FIG. 50 is a sectional view of body 3 overlapped with four baffle inserts 40 taken along lines 50-50 of FIG. 27 placed between upper and lower heat seal bars 95 of heat seal bar assemblies 101, 102.

Heat and pressure applied to exterior surface 98 of body 3 from heat seal bar assemblies 101, 102 will travel below exterior surface of body 3 through all the layers of fabric of body 3 and baffle insert 40 and holt melt 21 while in folded/gusseted configuration and overlapped together as shown in FIGS. 48-51. As shown, heat and pressure from heat seal bar assemblies 101, 102 melts hot melt 21 on tabs 17 and longitudinal panels 80 to form a heat sealed joint 32 between tabs 17 and an interior surface 26 of body 3 and between longitudinal panels 80 and an interior surface 26 of body 3. A portion of straps 9 are also under heat and pressure from heat seal bar assemblies 101, 102, but a heat sealed joint is not formed between a strap 9 and interior portion 26 of body 3 so that strap 9 remains free to expand across a corner 20 when body 3 is unfolded and expanded to an open configuration.

FIG. 49 is a detail view of FIG. 48 showing layers in a heat sealed joint 32 formed between a tab portion 17 and body 3 and between longitudinal panel 80 and body 3. Arrows 103 represent a junction between tab portion 17 and a longitudinal panel 80 when tab 17 moves into a space 29 between straps 9.

A baffle insert 4, 40 preferably is sealed within a body 3 without overlapping with other bag portions. A baffle body 140 having a body 3 with a baffle insert 4, 40 coupled thereto can then be put into a heat seal assembly line production method as described further below to complete a baffle bulk bag 50.

Figure 51:
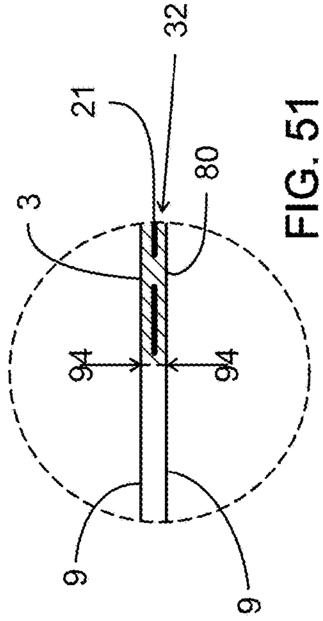
FIG. 51 is a close up detail view of FIG. 50.

FIG. 51 is a detail view of FIG. 50 showing layers in a heat sealed joint formed between a body 3 and between longitudinal panel 80. A strap 9 is shown free in this view without a joint coupling strap 9 to body 3. Arrows 94 represent a pivot point and/or junction at the location where longitudinal panel 80 transitions to a strap 9 that is free and not coupled to body 3.

FIGS. 30-34 illustrate a baffle heat seal machine 110 having a pair of heat seal bar assemblies 101, 102, which preferably include upper and lower heat seal bars 95. A baffle heat seal machine 110 can be the same or similar mechanically and electrically to a body scaling machine and loop assembly sealing machine as disclosed in U.S. Pat. Nos. 10,618,225 and 11,338,527, which are incorporated herein by reference, except that the heat seal bar assemblies 101, 102 are adapted to heat seal a baffle insert 4 or 40 of the present invention to a body 3. Heat seal bars 95 of a heat seal bar assembly 101, 102, for example, are preferably 4 inches wide, whereas a heat seal bar used to heat seal a top 2 to a body 3 for example are preferably 2 inches wide. Also, a machine 110 is adapted to support the pair of heat seal bar assemblies 101, 102 in a longitudinal direction, whereas heat seal bars used to seal a body 3 to a top 2 and bottom 5, for example, are positioned in a lateral direction in a body heat sealing machine.

A baffle heat seal machine 110 as shown in the figures includes a table 111 having legs 112. A top 105 of table 111 is adapted to accommodate the pair of lengthwise heat seal bar assemblies 101, 102, each having upper and lower seal bars 95 and includes openings 120. A pair of frames or bridge assemblies 113 can support pneumatic cylinders 114 adapted to raise and lower upper heat seal bars 95. Air tubing or lines 115 can connect a pneumatic cylinder 114 to a heat seal bar 95. Water lines or tubing 116 can be included as part of a heat seal bar 95 to enable cooling of heat seal bars 95 during a cool down time of the process, after applying heat and pressure to a body 3.

A bar code reader 117 can be included if desired. Guide edges 106 and end stop 107 can also be included on the machine to help position and assure proper alignment of a gusseted body 3 with baffle insert 4, 40 overlapped therewith in the machine, e.g., to ensure a body 3 with a baffle insert 4 or 40 overlapped therewith is in proper position in a baffle heat seal machine 110 wherein heat seal bar assemblies 101, 102 are properly aligned above and under the area to be heat sealed. As described, a body 3 and overlapped insert 4, 40 can be manually placed in a machine 110 and guide edges 106 and end stop 107 can be used to ensure proper alignment of the overlapped body 3 and insert 4, 40 with the seal bar assemblies 101, 102. The heat seal bar assemblies 101, 102 can be positioned at about sixteen (16) inches from center to center in a heat sealing machine 110. If desired, a baffle carrier plate that is similar to a carrier plate 150 can also be used to properly place a body 3 and overlapped insert 4, 40 in a machine 110 and guide edges 106 and end stop 107 can be adapted and moved if necessary to ensure proper alignment of a baffle carrier plate with the body 3 and overlapped insert 4, 40 thereon with heat seal bar assemblies 101, 102. To make a baffle carrier plate or carrier, openings 151 can be adjusted and changed to accommodate baffle heat seal bar assemblies 101, 102, for example.

Figure 34:
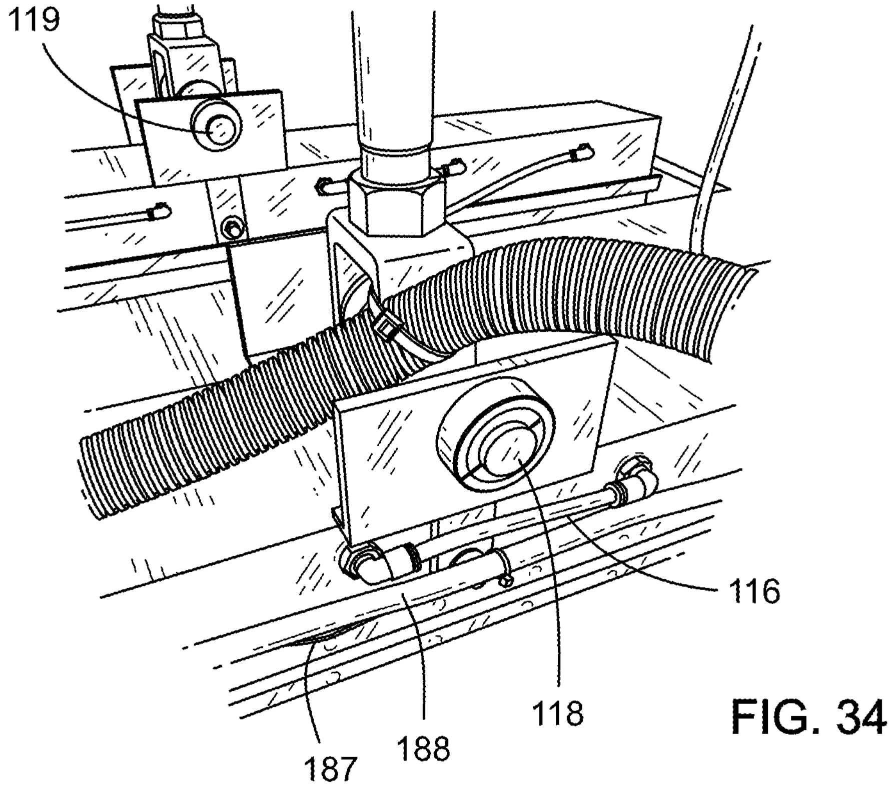
FIG. 34 is detail view of heat seal bars of the heat sealing machine of FIG. 30.
Figure 35:
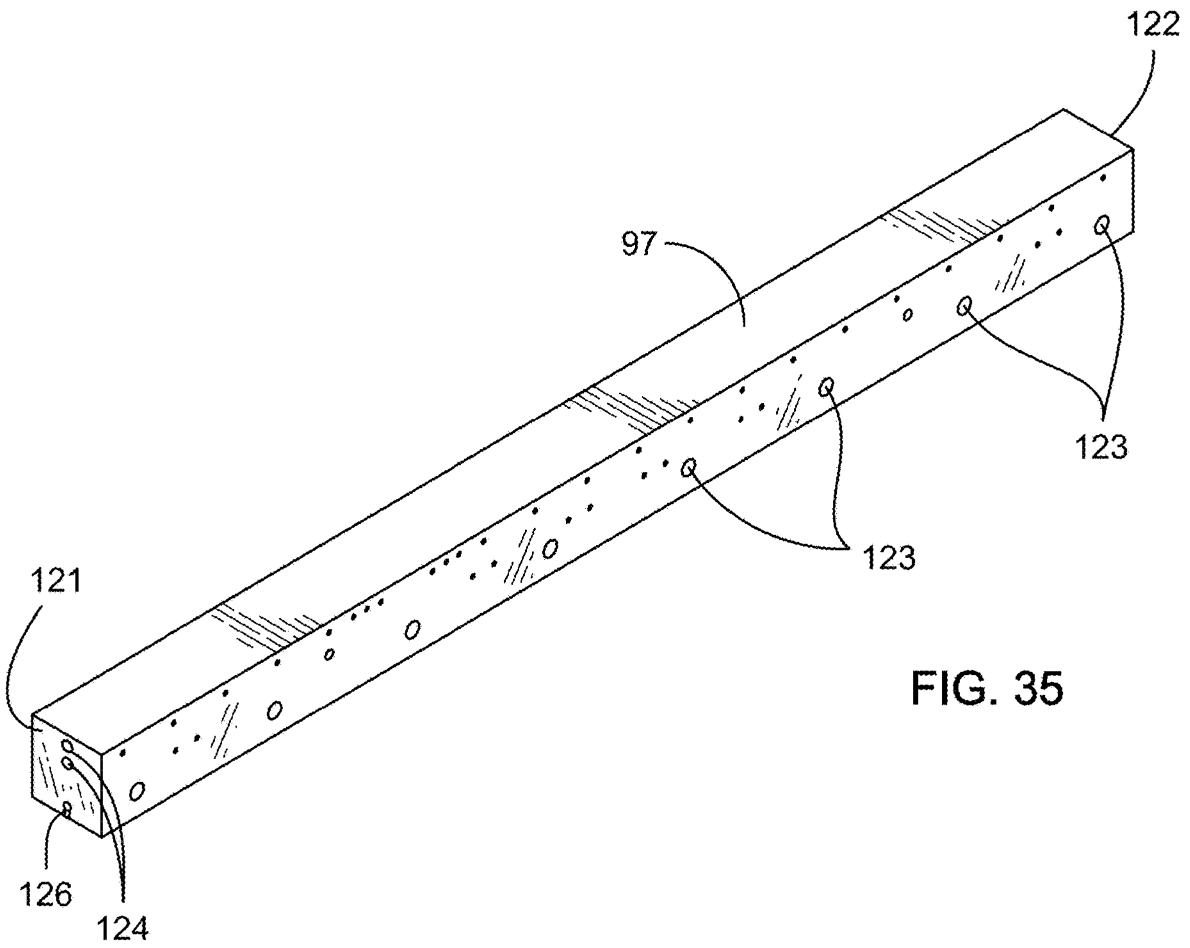
FIG. 35 is a perspective view of a main body of a heat seal bar as shown in FIGS. 33-34.
Figure 36:
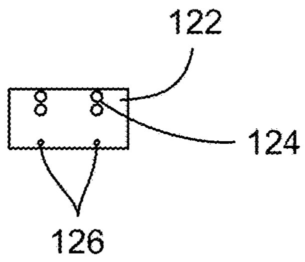
FIG. 36 is an end view of the main body of a heat seal bar as shown in FIG. 35.
Figure 37:
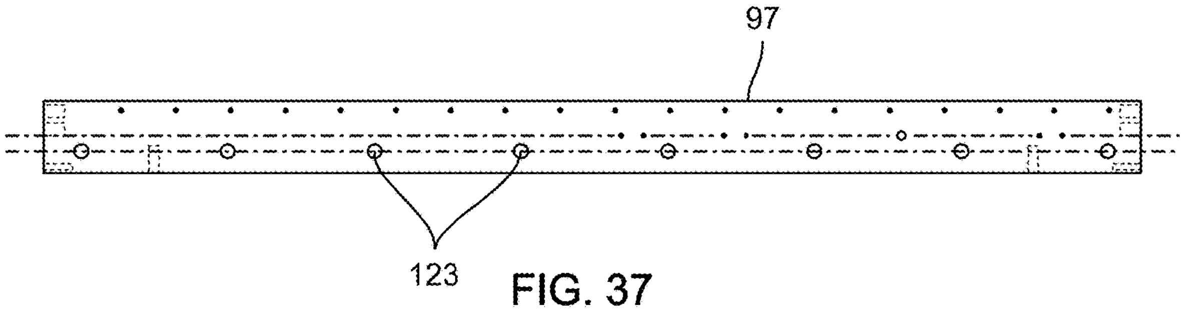
FIG. 37 is a front view of the main body of a heat seal bar as shown in FIG. 35.
Figure 38:
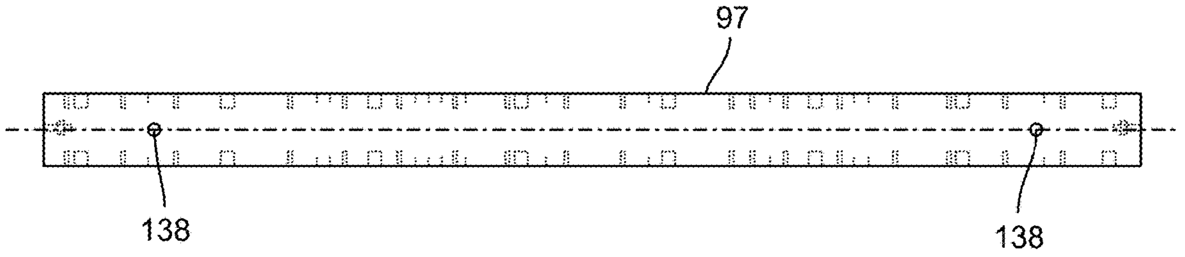
FIG. 38 is a bottom view of the main body of a heat seal bar as shown in FIG. 35.
Figure 39:
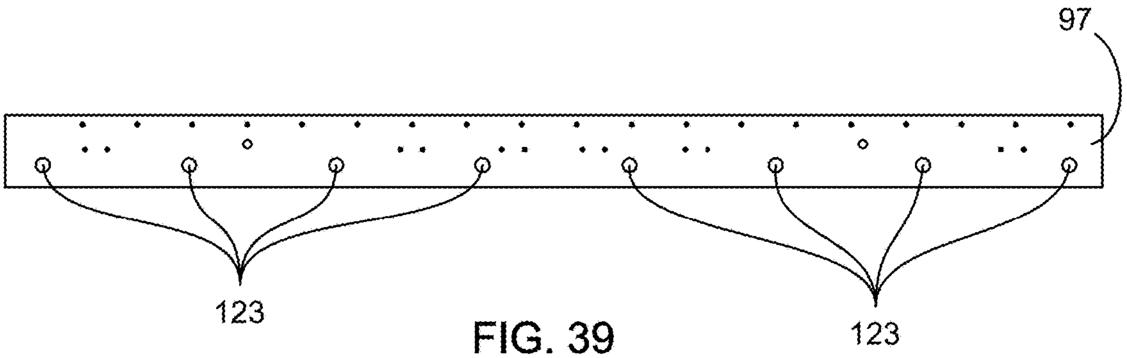
FIG. 39 is a front view of the main body of a heat seal bar as shown in FIG. 35.
Figure 40:
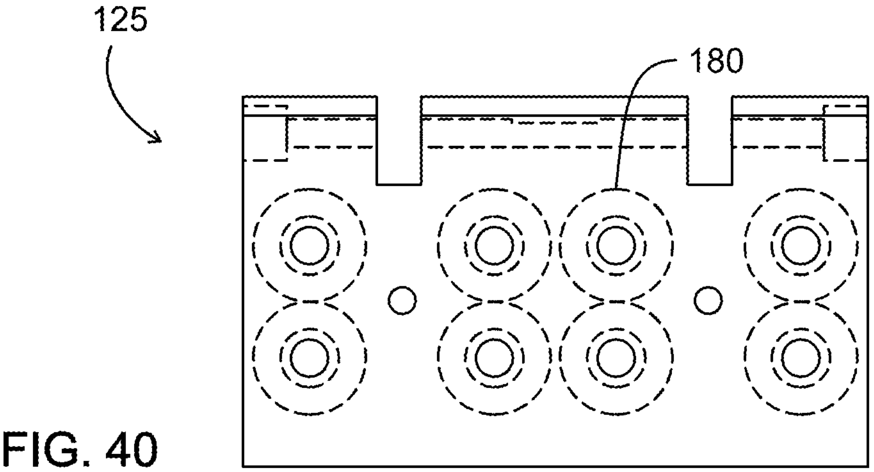
FIG. 40 is a front view of a tension end cap of a heat seal bar as shown in FIGS. 33-34.
Figure 41:
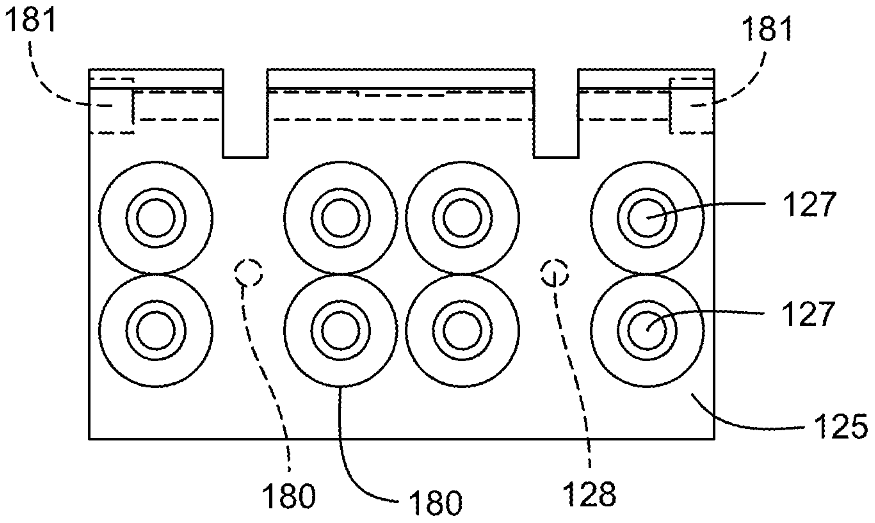
FIG. 41 is a rear view of a tension end cap of a heat seal bar as shown in FIGS. 33-34.
Figure 42:
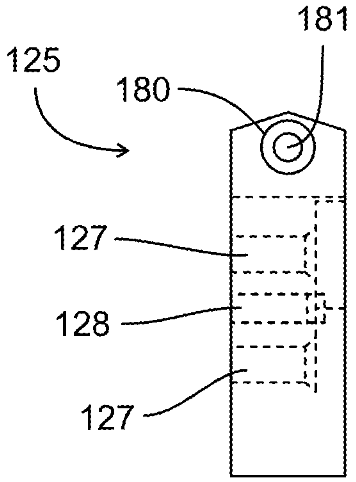
FIG. 42 is a side view of a tension end cap of FIG. 41.
Figure 43:
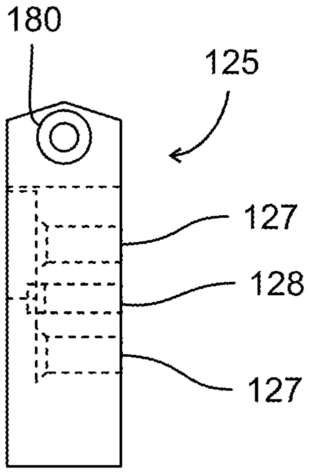
FIG. 43 is another side view of a tension end cap of FIG. 41.

FIGS. 35 to 43 illustrate a heat seal bar 95 body 97 that is part of heat seal bar assemblies 101, 102. Upper heat seal bars 95 can be coupled to pneumatic cylinders 114 with brackets 118, 119. FIG. 34 illustrates a rear yoke assembly 118 with slots for rocking an upper heat seal bar 95 into lengthwise alignment with a lower heat seal bar 95. Bracket 118 can be the same as disclosed in U.S. Pat. No. 11,338,527. A rocking motion during heat sealing enables more even application of heat and pressure, wherein a bolt or pin of a bracket connection 118 can move side to side in the slotted opening 120. Preferably a front attachment bracket 119 has a circular opening, or at least a substantially circular opening that enables rotation or pivoting of a bolt or pin therein while the bolt or pin in the slotted opening of bracket 118 is moving side to side. Reference is made to U.S. Pat. No. 11,338,527 for more details on enabling a rocking motion in heat seal bar assemblies, and in particular to FIGS. 106-108, 180-183 and related discussion in U.S. Pat. No. 11,338,527. The rocking and pivoting motions of upper heat seal bars 95 of heat seal bar assemblies 101, 102 can be the same or similar as described with regard to a body heat sealing machine in U.S. Pat. No. 11,338,527.

Figure 56:
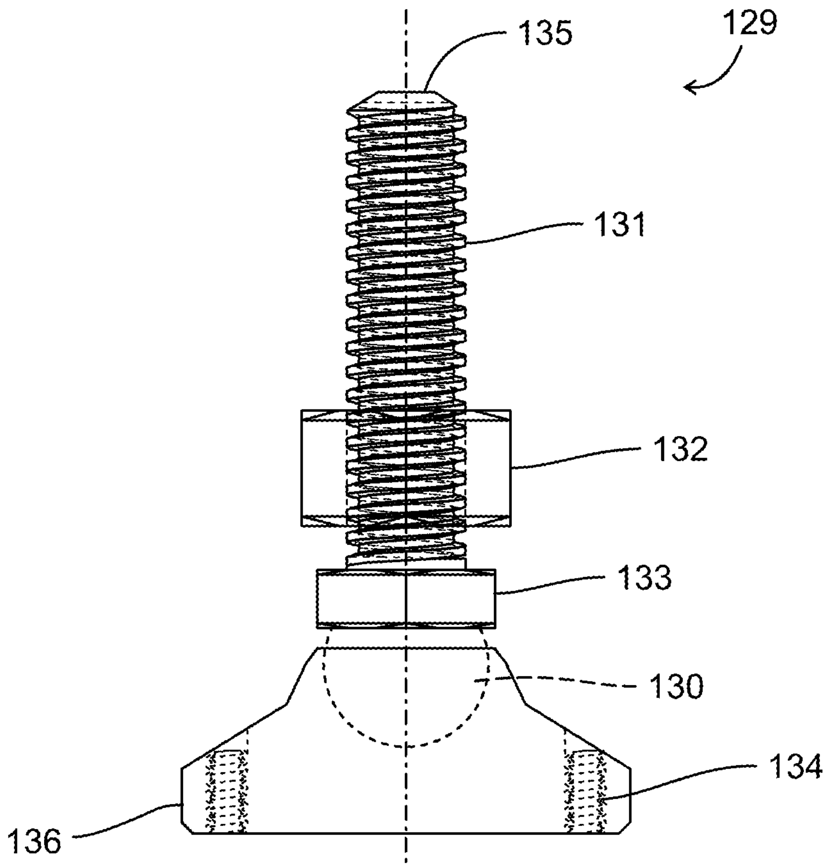
FIG. 56 illustrates an image of a swivel mount bracket of preferred embodiment of the present invention.
Figure 57:
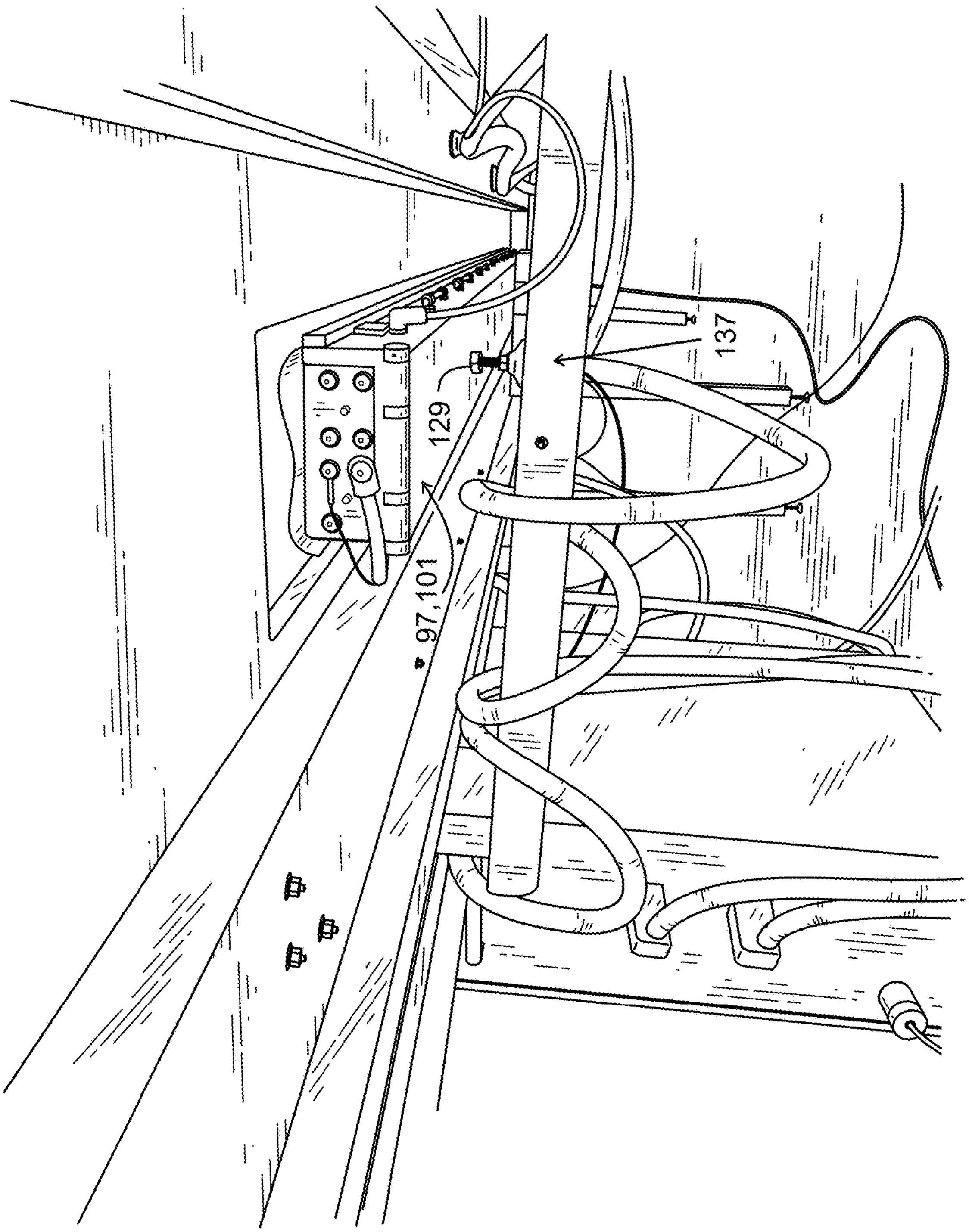
FIG. 57 illustrates a lower heat seal bar coupled in a heat seal machine using a swivel mount as shown in FIG. 56.

Referring to FIGS. 56-57, FIG. 56 is a view of a swivel leveling mount or bracket 129 that can be used in the present invention to enable a widthwise, or left to right, or side to side, rocking motion of a lower heat seal bar 95. Swivel leveling mount or bracket 129 can have an end 136 with openings 134, e.g., threaded openings that can enable attachment to a machine 110, for example, to part of a frame 137 of a machine 110 table 111. Swivel leveling mount or bracket 129 can also have a hex head or nut portion 133 and body 132 including a threaded section 131 at end 135. Threaded section 131 can be screwed into an opening 138 on a bottom of seal bar body 97. A ball 130 can enable the side to side rocking described herein. Preferably a swivel leveling mount or bracket 129 is a high capacity acme threaded leveling swivel mount. Preferably a swivel leveling mount or bracket 129 is a made from zinc plated steel.

FIG. 57 illustrates a lower heat seal bar 95 mounted on two swivel mounts with a swivel bracket 129 at a front and a rear position on lower heat seal bar 95. The swivel mounts allow a slight rocking motion of a lower seal bar 95 during heat-scaling in a left to right direction, or widthwise, or side to side direction, to be in parallel to its mating upper seal bar 95 in order to accommodate slight fabric thickness variations across the width of the heat seal bars 95 (e.g., four inches). Preferably a lower seal bar 95 is not raised or lowered but remains in position with only the side to side rocking.

Figure 31:
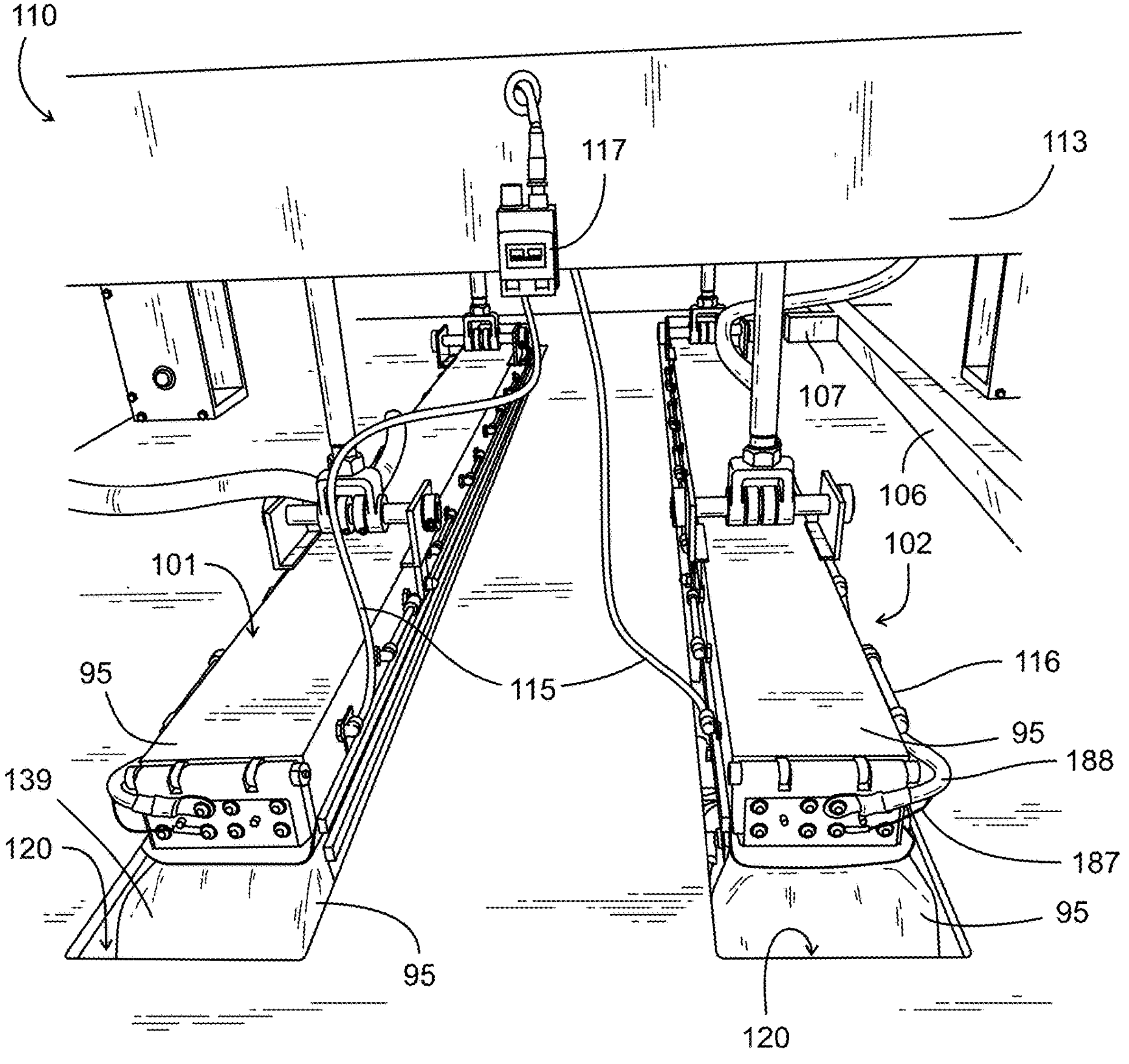
FIG. 31 is a partial end view of a heat sealing machine of the present invention for heat sealing a baffle insert to a bag body portion.
Figure 32:
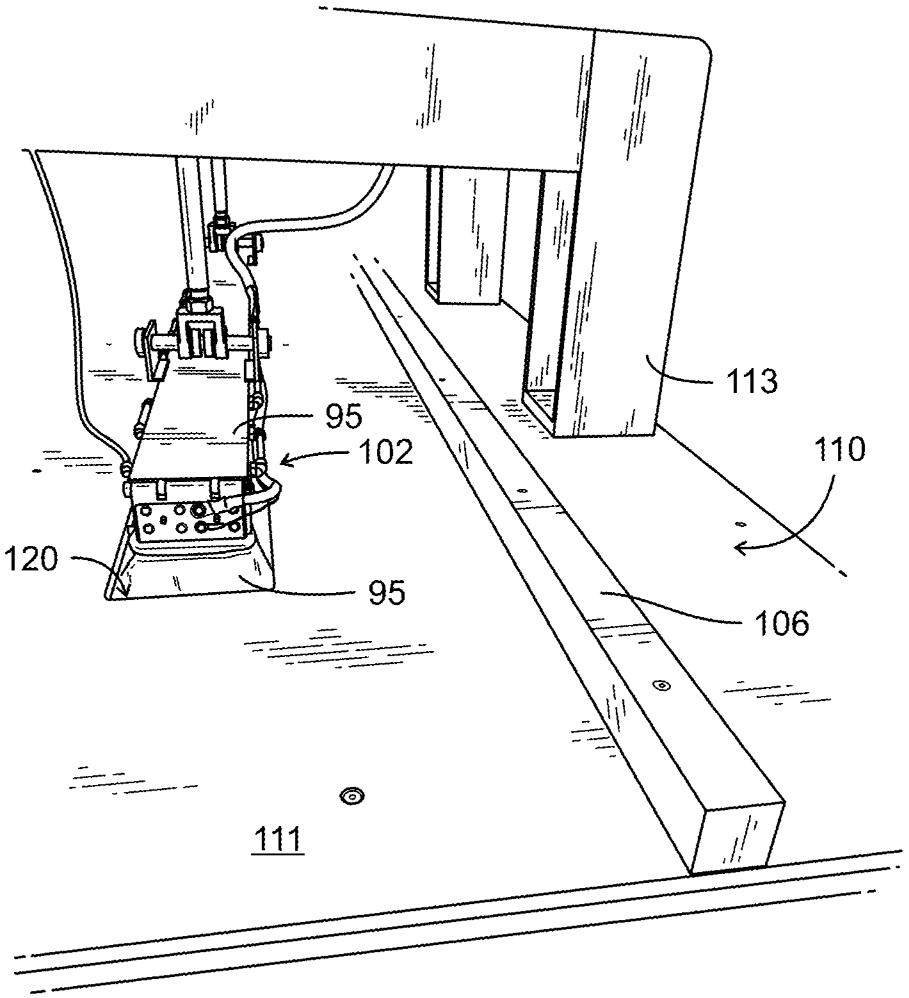
FIG. 32 is a partial end view of a heat sealing machine of the present invention for heat sealing a baffle insert to a bag body portion.
Figure 33:
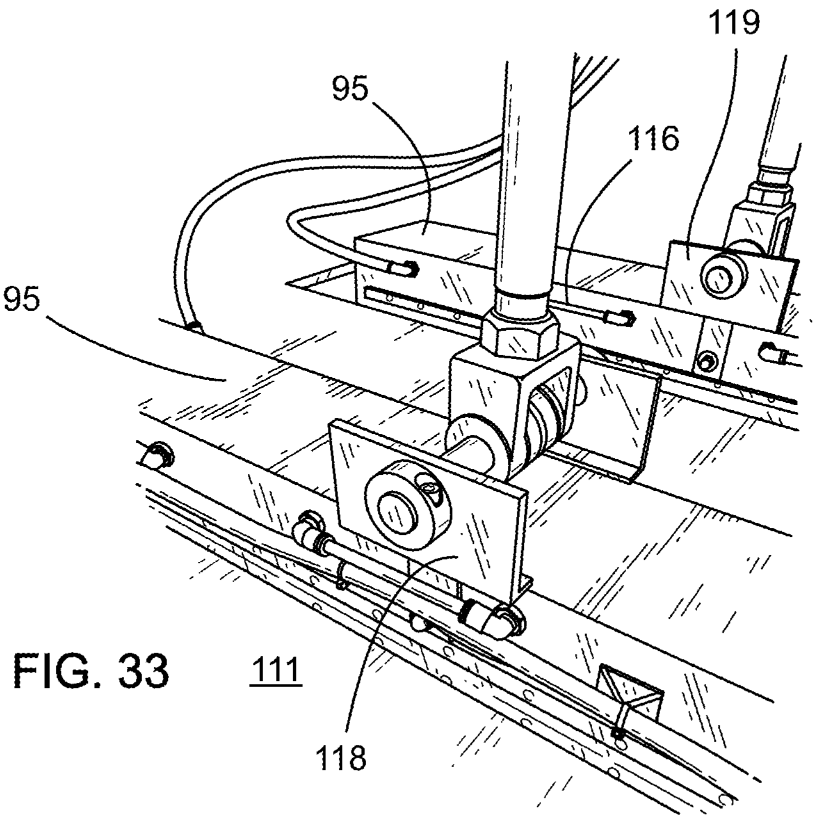
FIG. 33 is detail view of heat seal bars of the heat sealing machine of FIG. 30.

In the heat sealing machines of U.S. Pat. No. 11,338,527, for example, it was preferred, and only necessary to have an upper heat seal bar have a rocking motion when using heat seal bars that were two inches wide to facilitate even heat sealing over different thickness areas of a piece of fabric. During experimentation when using a wider heat seal bar 95 that is four inches wide for example, it was found that the increased width increased a chance of mis-alignment of upper and lower heat seal bars 95 due to fabric thickness variations. In general, an impact of the fabric thickness variations is a direct function of width. For heat sealing baffle inserts 4 or 40 to a body 3, it is preferred to have a lower seal bar 95 rock in a widthwise or side to side direction while an upper seal bar 95 is rocking in a lengthwise or end to end direction into alignment with the lower seal bar 95 using a slotted yoke bracket and pivot yoke bracket as described in U.S. Pat. No. 11,338,527, for example. Upper seal bars 95 also preferably can be raised to an open position, e.g., when not performing a heat sealing function, e.g., in a manner as described in U.S. Pat. No. 11,338,527. The view as shown in FIG. 31 is a closed position, whereas FIGS. 48, 50 illustrate the seal bar assemblies 101, 102 open where an upper heat seal bar 95 is raised and can be lowered to a closed position.

A heat seal bar 95 can be the same or similar to a seal bar as disclosed in U.S. Pat. No. 11,338,527 (e.g., see in particular FIGS. 104-106, 183 and related discussion in U.S. Pat. No. 11,338,527) or the same or similar to a seal bar as disclosed in U.S. patent application Ser. No. 17/330,668, filed on May 26, 2021 if it is desired to use a sensorless temperature sensing and control system and method (see e.g., FIGS. 2, and 69-70 and related discussion). The dimensions of seal bar 95 can be changed and adapted to enable heat-scaling the desired area of a baffle insert 4 or 40 to body 3. The length and width of a seal bar 95 can be changed based on the dimension of a bulk bag 10, 50 and the dimensions of a baffle insert 4 or 40 to be heat sealed thereto. For example, generally in the industry baffle bulk bags heights range from 30" to 80" (30 to 80 inches) tall with baffles typically ranging from 39" to 71" (39 to 79 inches) in length. A baffle heat seal machine 110 preferably can include heat seal bars 95 adapted to include heating elements that are at or about 39" to 71" (39 to 79 inches) in length to accommodate currently preferred baffle bulk bag dimensions.

Preferably a width of a heating element on a heat seal bar body 97 can be about 4 inches to enable heat sealing about a 2-inch width portion of a longitudinal panel 8 or 80 to a body 3 as well as tabs 17 to body 3 having about a 2-inch length. The width of a heating element can also be about 1 to 6 inches, for example if desired, depending on the width of the area of a baffle insert 4 or 40 to be heat sealed. A length of a heating element can preferably be about 76.6 inches long, or 50 to 100 inches long for example, depending on the length of a baffle insert 4 or 40. A height of a seal bar 97 can be about 2 to 3 inches.

A heat seal bar 95 can have a heat seal bar body 97 having seal bar ends 121, 122. A plurality of openings 123 can be included on each side of a heat seal bar body 97 for receiving a plurality of water lines or tubes 116. A plurality of openings 124, 126 can be included on ends 121, 122 of heat seal bar 97 for receiving a desired fastener 127, 128, 181, e.g., springs, nuts, pins, and washers, screws bolts for coupling end caps 125 to each heat seal bar end 121, 122. An end cap 125 can have a plurality of openings 180 for also receiving a fastener 127, 128, 184. A heating element (not shown) is also included in a heat seal bar 95 with an insulator (not shown) in between the heating element and heat seal bar body 97. Reference is made to U.S. Pat. No. 11,338,527 and U.S. patent application Ser. No. 17/330,668 for more information on heat seal bar components. If using a heat seal bar apparatus as disclosed in U.S. patent application Ser. No. 17/330,668, then heat seal bar 95 can include a body portion 97 that is shaped according to a desired bag joint shape. An insulating pad (not shown) and a protective sheet 139 can be in between a body portion 97 and heating element. A cover can be on top of heating element. A heating element is also preferably shaped according to a desired bag joint shape. End plates or end caps 125 can be included. End plates or end caps 125 and a heating element can be coupled to the heat seal bar body 97 with a desired fastener assembly, e.g., springs, nuts, pins, and washers. A cover can be coupled to a heat seal bar body 97 with screws, or other desired fasteners. Bumpers and clips can also be coupled to a heat seal bar body with screws. Bumpers are preferably in position to provide a bumper, e.g., for a carrier plate 150 or a baffle carrier plate if used. Cooling lines 116 can also be included on a heat seal bar body 97, which can be coupled to a heat seal bar body 97 with a desired fastener, e.g., with an elbow, screws, and tie holder, or with another desired fastener. A calibration sensor, electrical lines and power wires for connecting transformers, etc. as part of a sensorless heat sealing process can be used with such a heat seal bar 95 if desired in the manner as described U.S. patent application Ser. No. 17/330,668. For example, electrical line/voltage measuring wire from voltage transducer 187, and electrical line/power wires from transformers 188 can be coupled to a heat seal bar 95.

Referring to FIGS. 46-47, an assembly line production area for heat sealing bulk bags 10 or 50 is shown. A baffle heat seal machine 110 in one preferred embodiment is used as a materials prep machine to form a baffle body 140. Although not shown, a baffle heat seal machine can be off to the side of heat seal machines 141, 146. Once a desired number of baffle bodies 140 are formed on baffle heat seal machine 110, they can then be loaded on a bag parts or pieces carrier/carrier 143 in preparation for feeding into a manufacturing assembly line production area as shown in the figures. A baffle body 140 can be used to create a baffle bag 10, 50 in a same or similar way as non-baffled bulk bags using standard tops, bodies, bottoms and spouts as disclosed in the applications of the same inventor incorporated herein by reference.

The carrier plate 150 as shown in the figures, is designed to accommodate heat seal bars for sealing top spout 1 to top 2, top 2 to body 3, body 3 to bottom 6 and bottom 6 to discharge tube 7 with laterally spaced openings and guides to help alignment of these parts. This particular carrier plate is not designed to also accommodate the longitudinal baffle heat seal bar assemblies 101, 102. A carrier plate is not needed to heat seal a baffle insert 4 or 40 to a body 3, but a baffle carrier plate can be used that is similar to a carrier plate 150 and adapted to accommodate the longitudinal heat seal bar assemblies 101, 102 and act as quality check for parts alignment of the overlapped baffle insert 4, 40 and body 3 if desired.

Figure 44:
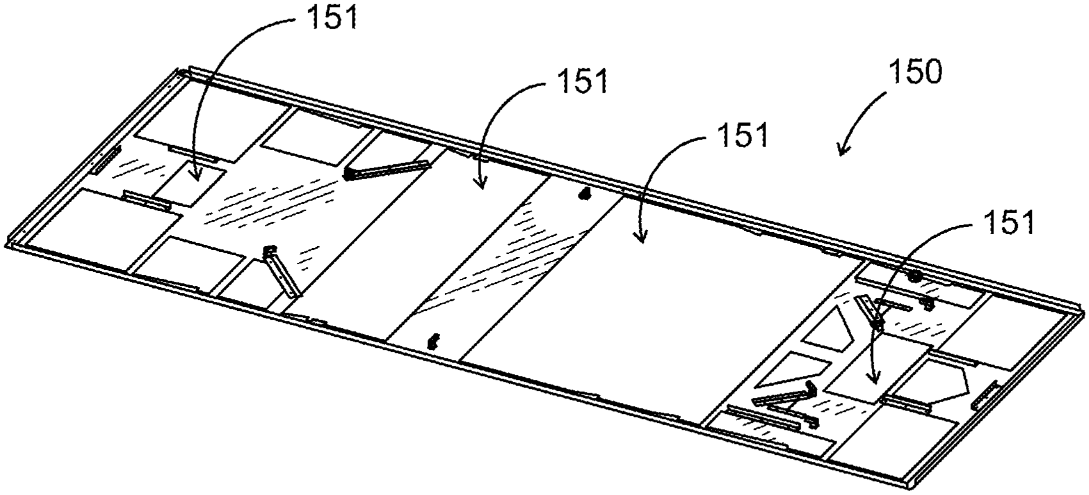
FIG. 44 is a perspective view of a carrier plate that can be used in a preferred embodiment of the method of the present invention.
Figure 45:
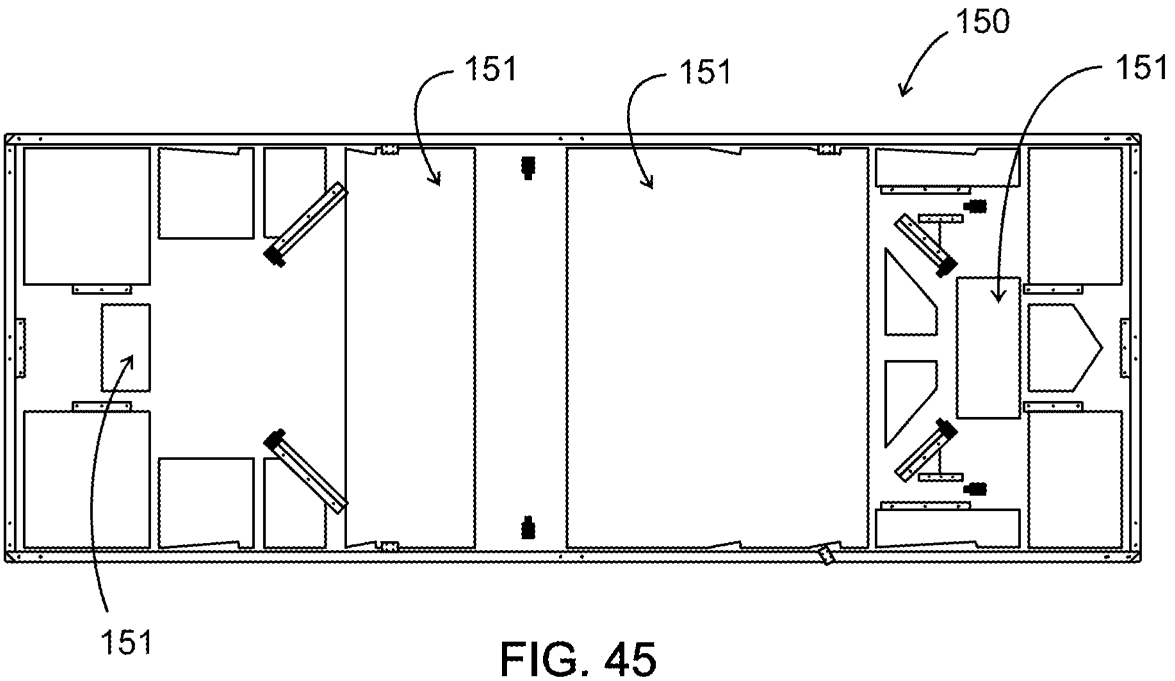
FIG. 45 is a top view of a carrier plate that can be used in a preferred embodiment of the method of the present invention.

A pre-heat sealed bulk bag 142 can be assembled on a carrier plate 150 as shown in FIGS. 44-45, with bag parts or pieces or portions held on carrier 143 prior to assembling and overlapping the bag portions together to form a pre-heat sealed bulk bag 142. A carrier 150 includes a plurality of openings 151, enabling upper and lower heat seal bars to contact bag portion fabric surfaces during a heat sealing process.

A pre-heated sealed bulk bag 142 can be put together, for example, by overlapping respective bag portions together to form desired joint locations for a bag 10, 50 on a carrier plate 150 (see FIGS. 45-47). Prior to entering a first heat seal machine, e.g., heat seal machine 141, a pre-heat sealed bulk bag 142 can have no heat sealed bag joints, except where baffle insert 4 or 40 is heat scaled to body 3 to form a baffle body 140.

A heat seal machine 141 can include a table 153, a fill spout/top heat seal bar assembly 147, a top/body heat seal bar assembly 154, a bottom/body heat seal bar assembly 160, a discharge tube/bottom heat seal bar assembly 149 and a document pouch/body heat seal bar assembly 155.

Carrier plate 150 with pre-heat sealed bag 142 can be passed through one or more heat sealing machines, e.g., heat seal machine 141, including machine heat seal bar assemblies that have heat seal bars with heating elements. The heat seal bar assemblies can be calibrated at control panels 220, if using a sensorless temperature sensing and control method as disclosed in described U.S. patent application Ser. No. 17/330,668, prior to passing a pre-heat sealed bulk bag 142 through a heat seal machine to undergo a heat sealing process to form a bag 10, 50 with heat sealed joints. Resistance and temperature readings during heat sealing of heat seal bar assemblies can also be gathered at control panels 220.

In a preferred embodiment as shown in FIGS. 46-47, two heat seal machines 141, 146 can be used to manufacture a bulk bag 50. After pre-heat sealed bag 142 passes through heat seal machine 141, a partially completed bag/partially heat sealed bag 171 (with heat sealed joints formed between a discharge tube 7 and bottom 6, bottom 6 and body 3, body 3 and top 2, and top 2 and fill spout 1, and also with a document pouch 156 sealed to body 3 is still on carrier plate 150 and is ready to move into heat seal machine 146. A heat seal machine 146 can include a table 152, a lift loop assembly/body heat seal bar assembly 159, and a bottom cover/body heat seal bar assembly 148. Heat seal machine 146 completes a bag 10, 50 by heat sealing lift loop assemblies 158 and a bottom/discharge tube cover 54 to body 3.

Figure 29:
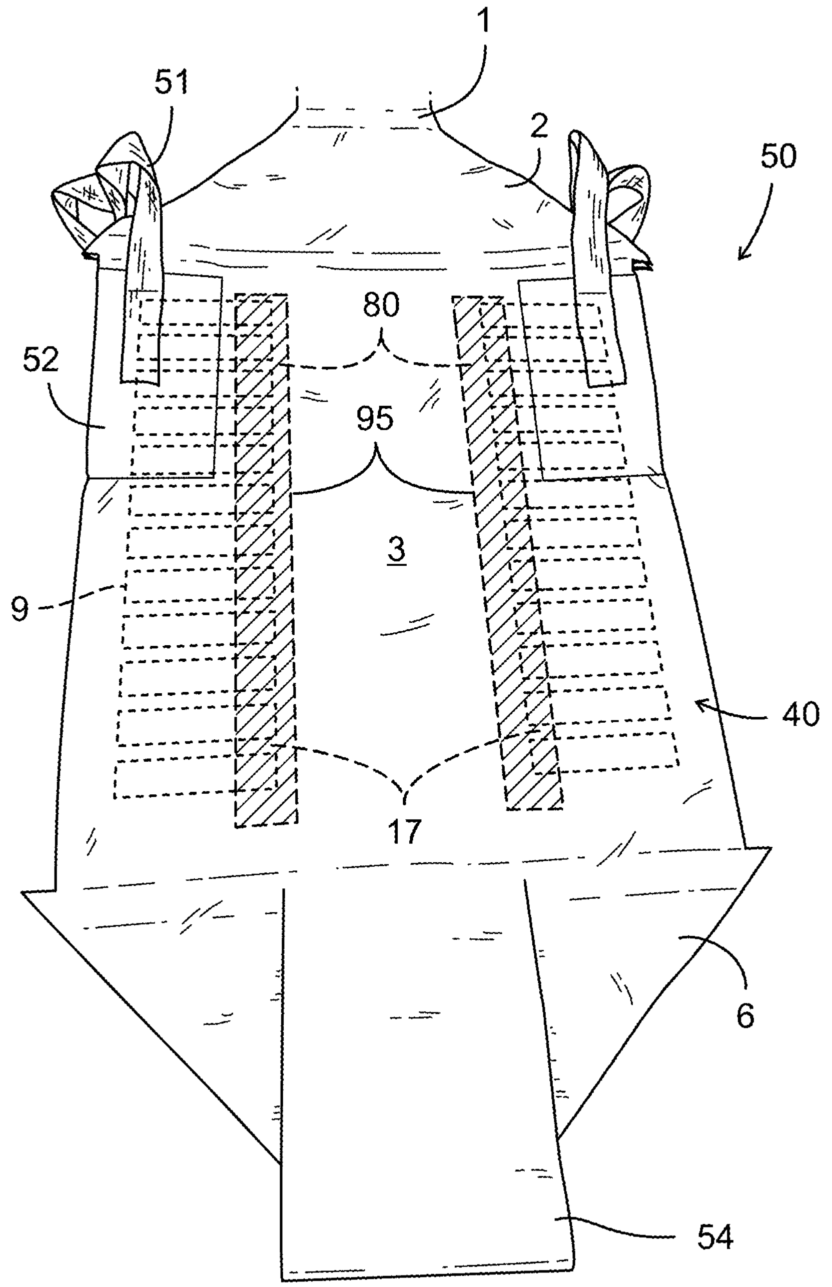
FIG. 29 is a top view of the second preferred embodiment of the apparatus of the apparatus of the present invention including the fourth preferred embodiment of a baffle insert.
Figure 30:
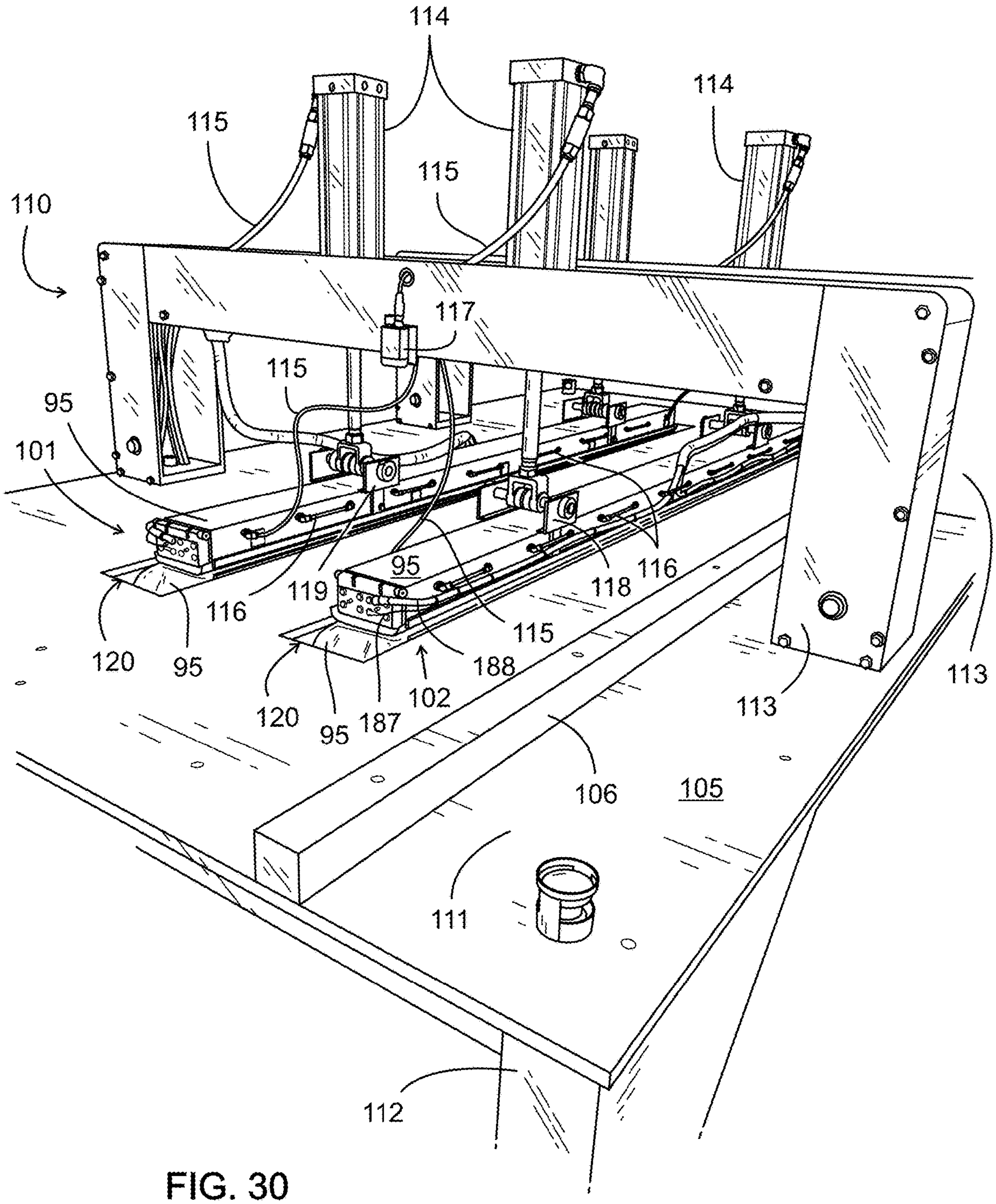
FIG. 30 is a partial perspective view of a heat sealing machine of the present invention for heat sealing a baffle insert to a bag body portion.

Following heat sealing in machine 146, a completed bag 50 is shown on table 144. A return table 145 for after a pre-heat sealed bulk bag 142 and partially heat sealed bag 171 is finished undergoing a heat sealing process to form a completed bag 10, 50 is also shown in the figures. FIG. 29 illustrates a completed baffle bulk bag 50.

In other embodiments, any desired number of joints for a bag can be formed in a desired heat seal machine. For example, some bags may have less than four lift loop assemblies 158, may not have a document pouch 156 and/or may not have a bottom/discharge tube cover 54. Other styles of bulk bags than what are shown in the figures can also be made with a desired number of heat sealed joints.

FIGS. 46-47 illustrate folded/gusseted bag parts or portions 1, 2, 3, 6, 7 and also a document pouch 156 on carriers 143. Fill spout 1, top 2, baffle body 140, bottom 6 and discharge tube 7 are folded and gusseted on carrier 143 ready to be overlapped with respective bag portions for assembly on carrier plate 150 near heat seal machine 141. Document pouch 156 is also on this carrier 143.

Lift loop assembles 158 are also folded on a carrier 143 that includes bottom/discharge tube cover 54 near heat seal machine 146 and are ready to be assembled on a partially completed bag 171 before entering heat seal machine 146. If a bottom insert 5 is to be included in a bulk bag 10, 50, a bottom insert 5, discharge tube 7 and bottom 6 are preferably overlapped together and bottom 6 can be heat sealed to both insert 5 and discharge tube 7 in a heat sealing machine 146.

Figure 52:
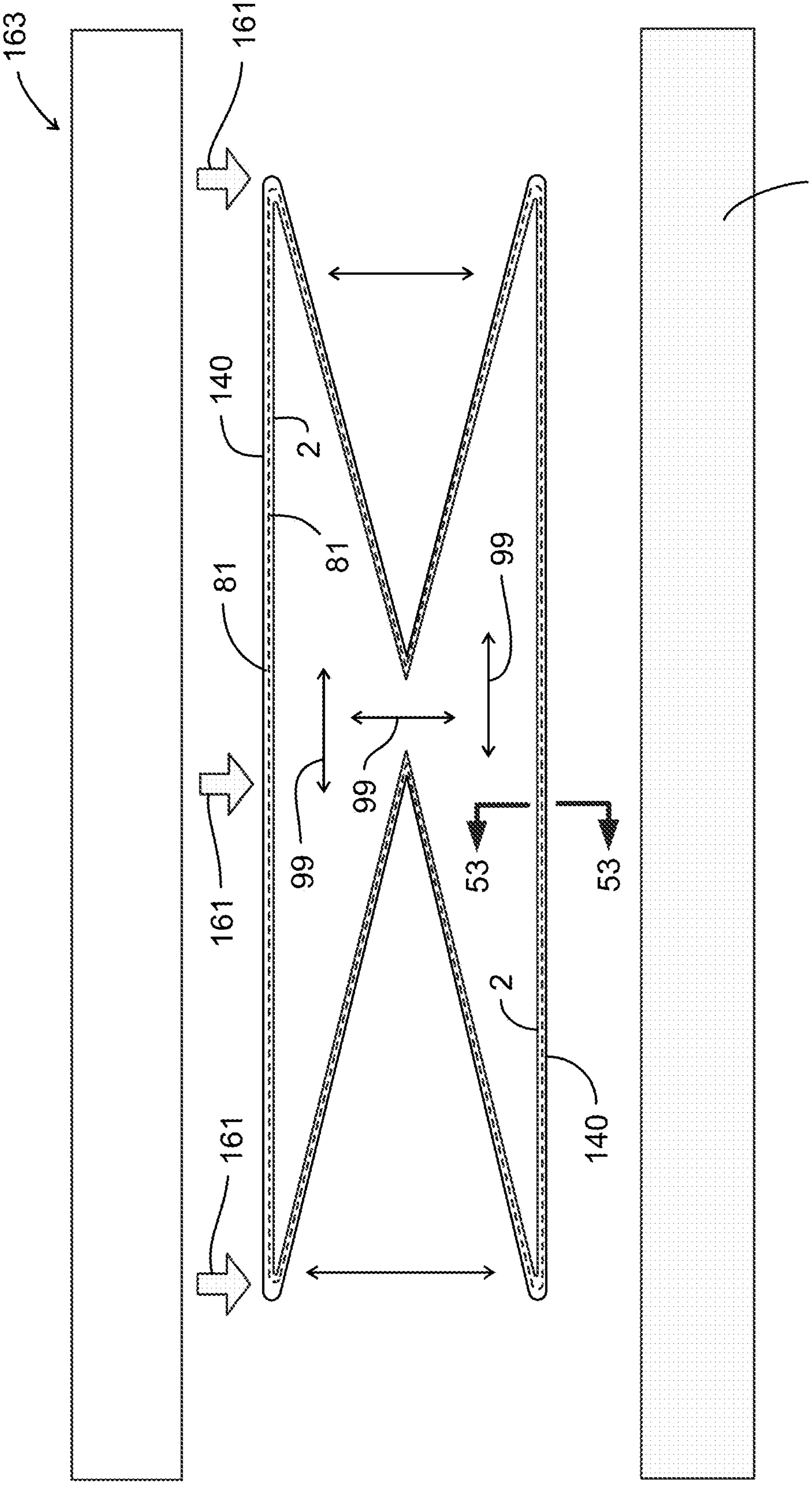
FIG. 52 illustrates a preferred embodiment of the method of the present invention of heating sealing bulk bag portions together between heat seal bars.
Figure 53:
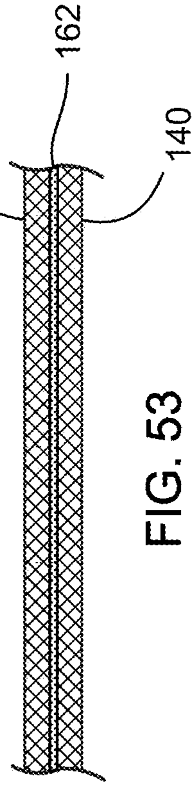
FIG. 53 is a illustrates a preferred embodiment of a heat sealed joint of a bulk bag of the present invention taken along lines 53-53 of FIG. 52.

Referring to FIGS. 52-53, preferred embodiments of the method of the present invention of heating sealing other bulk bag portions together using a heat seal bar assembly of the present invention is shown. FIG. 52 illustrates heat sealing a top 2 to a baffle body 140, e.g., using heat seal bar assemblies 163 when a baffle body 140 and top 2 are overlapped while folded/gusseted so that respective heat sealing coatings 81 on respective interior or exterior surfaces are in contact. An upper heat seal bar assembly 163 can be lowered in the direction of arrows 161 to make contact with the overlapped bag portions, melt a heat seal coating 81 in the overlapped area and form a joint between coatings 81 in the overlapped area. In FIG. 53, a heat sealed joint 162 between baffle body 140 and top portion 2 is depicted. Arrows 99 represent areas where joints are not formed even when bag surfaces around arrows 99 are pressed together during a heat-scaling process.

A coating 81 on a bag body 3 can be a heat sealing coating 81 that is either a propylene plastomer or elastomer coating or a standard polypropylene laminate type coating. A coating 81 on a bag top 2 can also be a heat sealing coating 81 that is either a propylene plastomer or elastomer coating or a standard polypropylene laminate type coating, depending on what type of coating is on body 3. A propylene plastomer or elastomer coating can be bonded to another propylene plastomer or elastomer coating or to a standard polypropylene laminate type coating. A body 3 to bottom 6, fill spout 1 to top 2, and/or discharge tube 7 to bottom 6 joint can be formed in the same manner when respective bag portions are overlapped together. Reference is made to U.S. Pat. Nos. 10,112,739; 10,618,225 and 11,338,527 for more details on this process.

Figure 54:
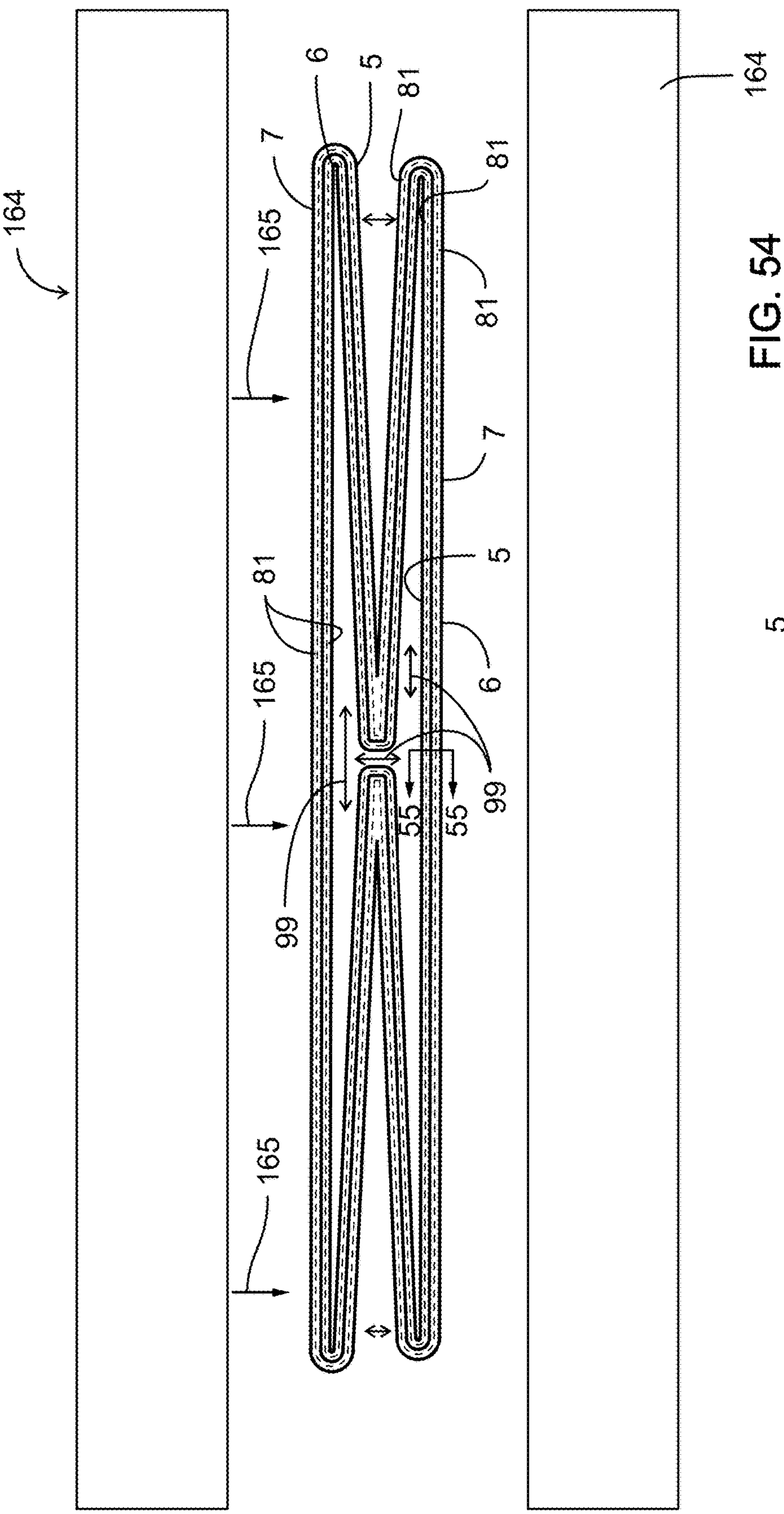
FIG. 54 illustrates a preferred embodiment of the method of the present invention of heating sealing bulk bag portions together between heat seal bars.
Figure 55:
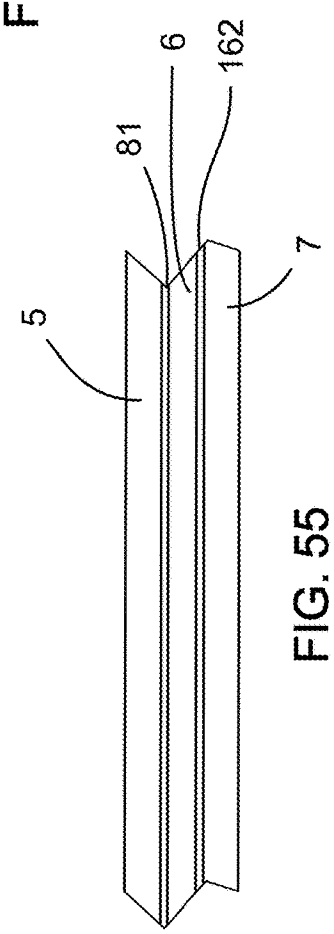
FIG. 55 illustrates a preferred embodiment of a heat sealed joint of a bulk bag of the present invention taken along lines 55-55 of FIG. 54.

FIGS. 54-55 illustrate heating sealing a bottom 6/insert 5/discharge tube 7 assembly together using, e.g., heat seal bar assemblies 164, when a discharge tube 7, insert 5 and bottom portion 6 are overlapped together while folded/gusseted so respective heat seal coatings 81 are in contact with one another, wherein an upper heat seal bar assembly 164 can be lowered in the direction of arrows 165 to make contact with the overlapped bag portions, melt a heat sealing coating 81 in the overlapped area and form a joint 162 between heat sealing coatings 81 in the overlapped area. FIG. 55 shows a heat sealed joint 162 formed between a discharge tube 7 and bottom 6 during the heat sealing process.

Other heat-sealed joints of a heat-sealed bag 10, 50 can be formed in a similar or same manner. Preferably bag portions are folded/gusseted so that inner folds or gussets do not touch. This helps prevent an unwanted joint being formed between inner folded portions. This is illustrated in FIGS. 18 to 20, for example, where a space is left about centrally, e.g., along a line 205, in a folded/gusseted body portion 3 between body edges 61.

Other adhesives besides a hot melt film potentially can also be used, such as cold adhesives which would require roller pressure or flat bar pressure to form the seal. Hot melt is currently preferred though because cold adhesives bond at ambient. Under pressure, over time, the bonds tend to gradually stretch and lose strength.

The hot melt beads originally experimented with potentially can be used in the method of the present invention to form a heat sealed joint between a baffle insert and bag body, for example, if the glue can be placed uniformly in the desired locations on the baffle insert.

Including a heat seal coating on a baffle insert and the body interior also potentially can be used to make a heat sealed connection between a baffle insert and body interior surface. For example, a heat seal method that is the same or similar to that disclosed in U.S. Pat. No. 10,112,739 can be used if a plastomer and elastomer coating is included on one piece of flexible plastic fabric, e.g., polypropylene fabric of the baffle insert portion, that would be joined to another plastomer or elastomer coating on another piece of flexible plastic fabric, e.g., polypropylene fabric of a body portion interior. Or, a stitchless baffle bulk bag can be made using a heat seal method that is the same or similar to that disclosed in U.S. Pat. No. 10,112,739 wherein a plastomer and elastomer coating on one piece of flexible plastic fabric, e.g., polypropylene fabric of a baffle portion or body portion, would be joined to a standard fabric coating, e.g., a standard polypropylene fabric coating, on polypropylene fabric of an interior body portion surface or baffle insert exterior surface. Currently, however, as discussed the interior of tubular flexible plastic fabrics are not coated in the industry and it is difficult to coat the interior of a tubular flexible plastic fabric, which is the preferred type of fabric for a body portion of a bulk bag made using the heat sealing process of U.S. Pat. No. 10,112,739, for example, so use of a hot melt film as described herein is currently preferred. A tubular body can also be formed from a flat piece of material. A desired heat seal coating can potentially be applied to both sides of the flat piece of material and then it can be formed into a tube with a single vertical seal. Such a body with a desired coating on an interior surface could be coupled to a baffle insert with a desired coating on an exterior surface when folded, and with heat and pressure applied to join the coatings and form a bond therebetween.

In another preferred embodiment, another to way to make a baffle bag of the present invention is to let the circular bag form an octagonal shape with the cut outs for the product flow on the four diagonals across the 'corner' of the bag. Then add four corner panels to attach on the circular bag just outside the cut outs.

In preferred embodiments as described herein, a baffle insert is heat sealed, and not sewn, to an interior of a bag body. A body having a baffle insert heat sealed therein preferably is used as a body portion in constructing a heat sealed bulk bag with no stitches or sewn seams in a containment area of bag. However, if desired, any of the embodiments of a baffle body portion formed as described herein using heat sealing can also be used as a body portion in other types of bags or bulk bags that have sewn seams.

PARTS LIST

The following is a list of parts and materials suitable for use in the present invention:

Parts Number Description

1 fill tube/fill spout
2 top/top portion
3 body/body portion
4 baffle insert/baffle insert portion/tubular baffle insert
5 bottom insert/bottom reinforcer
6 bottom/bottom portion
7 discharge tube/discharge spout
8 longitudinal panel/longitudinal member of baffle insert
9 strap/lateral panel/lateral member/lateral portion of baffle insert
10 apparatus of a preferred embodiment of the present invention/baffle bulk bag of the present invention
11 opening
12 opening
13 opening
14 opening
15 opening
16 opening
17 tab/tab portion
20 corner
21 hot melt/hot melt film/hot melt glue
22 arrow for width of longitudinal panel of baffle insert coupled to body portion
23 arrow for width of hot melt film 21 on tab portion of baffle insert
24 arrow for width of hot melt film 21 on longitudinal panel of baffle insert
25 exterior surface of longitudinal panel of baffle insert
26 interior surface of body portion
27 top of longitudinal panel 8
28 bottom of longitudinal panel 8
29 space in between two straps 9, or above or below a strap 9
30 space in between strap 9 and corner 20
31 exterior surface tab 17
32 joint/heat sealed joint
33 side wall of body 3
34 side wall of body 3
35 side wall of body 3
36 side wall of body 3
37 left edge longitudinal panel 8
38 right edge longitudinal panel 8
40 baffle insert portion/baffle insert
41 gusset
42 gusset
43 gusset edge
44 gusset edge
45 gusset edge
46 gusset edge
50 a preferred embodiment of the apparatus of the present invention/baffle bulk bag
51 lift loop
52 patch
53 junction of strap 9 and longitudinal panel 80
54 discharge tube cover
55 opening
61 body edge/body fabric edge
62 body open end
63 body open end
64 over edge coating
65 gusset edge
66 gusset edge
67 gusset edge
68 gusset edge
69 gusset
70 gusset
80 longitudinal panel/longitudinal member
81 heat seal coating
82 folded area of gusset 69

83 folded area of gusset 70
84 folded area of gusset 69
85 folded area of gusset 70
86 interior surface
87 interior surface
88 interior surface
89 interior surface
90 interior surface
91 interior surface
92 interior surface
93 interior surface
94 pivot point
95 heat seal bar apparatus
96 fold line
97 heat seal bar body/body portion
98 exterior surface of body 3
99 arrows
101 heat seal bar assembly
102 heat seal bar assembly
103 arrow-junction of tab 17 and longitudinal panel 80
105 table top/top
106 guide edge
107 end stop
110 baffle heat seal machine/heat sealing machine
111 table
112 leg
113 frame/bridge assemblies
114 pneumatic cylinder
115 air line/air tube
116 water line/water tube/cooling lines
117 bar code reader
118 bracket (with slotted opening for bolt or pin)/rear yoke assembly
119 bracket (with circular opening for bolt or pin)/front attachment bracket
120 opening
121 seal bar end
122 seal bar end
123 opening
124 opening
125 end cap/end plate
126 opening
127 fastener/pin
128 fastener/screw
129 swivel bracket/swivel leveling mount
130 ball
131 threaded section
132 body
133 hex head or nut
134 opening/threaded opening
135 end
136 end
137 frame
138 opening/threaded opening
139 protective sheet
140 bag body with baffle insert(s) 4 or 40/baffle body
141 heat seal machine
142 pre-heat sealed bag, including one or more overlapped bag portions prior to heat sealing the one or more bag portions together
143 bag parts or pieces carrier/carrier
144 table, completed/heat sealed bag table
145 table/return table
146 heat seal machine
147 heat seal bar assembly of a preferred embodiment of the present invention, fill spout/top heat seal bar assembly
148 heat seal bar assembly of a preferred embodiment of the present invention—bottom cover/body heat seal bar assembly
149 heat seal bar assembly of a preferred embodiment of the present invention—discharge tube/bottom heat seal bar assembly
150 carrier plate
151 opening
152 table
153 table
154 heat seal bar assembly of a preferred embodiment of the present invention—top/body heat seal bar assembly
155 heat seal bar assembly of a preferred embodiment of the present invention—document pouch/body heat seal bar assembly
156 document pouch
158 lift loop assembly
159 heat seal bar assembly of a preferred embodiment of the present invention—lift loop assembly/body heat seal bar assembly
160 heat seal bar assembly of a preferred embodiment of the present invention—bottom/body heat seal bar assembly
161 arrows
162 heat sealed joint
163 heat seal bar apparatus
164 heat seal bar apparatus
165 arrows
171 partially completed bulk bag
180 opening
181 fastener, e.g., pin or bolt
187 electrical line/voltage measuring wire from voltage transducer
188 electrical line/power wires from transformers
205 center line body in folded/gusseted configuration
220 control panel All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the claims.

The invention claimed is:

1. A bulk bag comprising:

a) a top portion;

b) a body portion having an interior surface, and having a first side, a second side, a third side and a fourth side, and having a first corner, a second corner, a third corner and a fourth corner, in an expanded configuration;

c) a bottom portion;

d) a baffle insert portion including:

(i) at least a pair of longitudinal members with a plurality of lateral members spaced apart in between the longitudinal members;

(ii) a plurality of tab portions, each tab portion extending laterally away from one said longitudinal member and into a space in between two said lateral members or into a space above or below a said lateral member;

e) a heat-sealed joint formed between the body interior surface and the longitudinal members and formed between the plurality of tab portions and the body interior surface;

f) wherein the baffle insert is positioned in the body portion so that it extends from the first side to the second side and across the first corner of the body portion with the lateral members positioned along a diagonal across the first corner when the body portion is in the expanded configuration.

2. The bulk bag of claim 1 wherein four baffle inserts are included in the bulk bag at the first corner, the second corner, the third corner and the fourth corner.

3. The bulk bag of claim 2 wherein a heat seal coating extends along an exterior surface of each of the longitudinal members of the four baffle inserts and along a surface of the plurality of tab portions and forms part of the heat-sealed joint.

4. The bulk bag of claim 3 wherein during heat sealing, the body is in a folded gusseted configuration including a pair of body gussets and the baffle insert is gusseted in a folded gusseted configuration including two baffle gussets and the baffle gussets are overlapped with the body gussets.

5. The bulk bag of claim 2 wherein during heat sealing, the body is in a folded gusseted configuration including a pair of body gussets and two of the baffle inserts are folded and overlapped with one of the body gussets and the other two of the baffle inserts are folded and overlapped with the other body gusset.

6. The bulk bag of claim 1 wherein the baffle insert comprises four longitudinal members and comprises an insert tubular shape and each of the four longitudinal members are coupled to the interior surface of the body so that respective lateral members extend across each of the first corner, the second corner, the third corner or the fourth corner along a diagonal.

7. The bulk bag of claim 6 wherein a heat seal coating is on at least a portion of an exterior surface of each of the longitudinal members of the baffle insert and on the plurality of tab portions, and forms part of the heat-sealed joint.

8. The bulk bag of claim 1 wherein during heat sealing to form the heat-sealed joint, the body is in a folded gusseted configuration including a pair of body gussets and the baffle insert is folded and overlapped with at least one of the body gussets, and heat and pressure is applied.

9. The bulk bag of claim 1 wherein the plurality of tabs counter peel forces exerted on the joint when the bulk bag is filled with bulk material and/or lifted.

10. The bulk bag of claim 9 wherein each tab extends at least 2 inches laterally away from the longitudinal member and into the space above or below a said lateral member.

11. The bulk bag of claim 1 wherein the baffle insert counters both peel and tensile forces exerted on the joint when the bulk bag is filled with bulk material and/or lifted.

12. The bulk bag of claim 1 wherein said tabs that are on both sides of one said lateral member extend beyond a pivot point of said lateral member at a junction of said lateral member and the longitudinal member and counter forces of peel encountered by said lateral member and the longitudinal member.

13. The bulk bag of claim 1 wherein said lateral members are free and are not connected to the body.

14. The bulk bag of claim 13 wherein the plurality of tabs protect the joint at a pivot point located where one said lateral member that is free extends away from one said longitudinal member that is coupled to the body at the joint.

15. The bulk bag of claim 1 wherein the body is connected to the top portion and to the bottom portion with heat sealed joints.

16. The bulk bag of claim 1 wherein the body is connected to the top portion and to the bottom portion with stitched seams.

17. A stitchless baffle body portion comprising:

a) a body that has a tubular shape and comprises flexible plastic fabric or polyester fabric, the body having an interior surface, a first side, a second side, a third side and a fourth side, a first corner, a second corner, a third corner and a fourth corner, and the body having an expanded configuration;

b) one or more baffle inserts made from a flexible plastic fabric or a polyester fabric that include:

(i) at least a pair of longitudinal members with a plurality of lateral members spaced in between the longitudinal members;

(ii) a plurality of tab portions, each tab portion extending laterally away from one said longitudinal member and into a space in between two said lateral members, or into a space above or below a said lateral member;

c) one or more heat sealed joints coupling the one or more baffle inserts to the interior surface of the body; and d) wherein at least a portion of the plurality of lateral members are free and not coupled to the body.

18. A heat sealing method of manufacturing a baffle bulk bag comprising the following steps:

a) overlapping an upper portion of the baffle body portion of claim 17 while in a baffle folded or gusseted configuration with a top portion while the top portion is in a top folded or gusseted configuration so that a baffle body heat seal coating on an exterior surface of the baffle body portion is in contact with a top heat seal coating on an interior surface of the top portion;

b) overlapping a lower portion of the baffle body portion of claim 17 while in the baffle folded or gusseted configuration with a bottom portion while the bottom portion is in a bottom folded or gusseted configuration so that the baffle body heat seal coating on the exterior surface of the baffle body portion is in contact with a bottom heat seal coating on an interior surface of the bottom portion; and (c) applying heat and pressure to overlapped layers formed in steps (a) and (b) to melt at least one of the baffle body heat seal coating or top heat seal coating in the overlapped layers of step (a) and to melt at least one of the baffle body heat seal coating or bottom heat seal coating in the overlapped layers of step (b) to form a top heat sealed joint between the baffle body portion and the top portion and a bottom heat sealed joint between the baffle body portion and the bottom portion.

19. The bulk bag of claim 18 wherein the top portion, the body portion, the baffle insert and the bottom portion are made from flexible plastic fabric or polyester fabric.

20. A bulk bag comprising:

a) a body portion having an interior surface, and having a first side, a second side, a third side and a fourth side, and a first corner, a second corner, a third corner and a fourth corner, in an expanded configuration;

b) a bottom portion;

c) a baffle insert portion including:

(i) a pair of longitudinal members with a plurality of lateral members spaced in between the longitudinal members;

(ii) a plurality of tab portions, each tab portion extending laterally away from one said longitudinal member and into a space in between two said lateral members or into a space above or below a said lateral member;

d) a heat sealed joint, formed between the body interior surface and the pair of longitudinal members and between the body interior surface and the tabs; and e) wherein the baffle insert is positioned in the body portion so that it extends from the first side to the second side and across the first corner of the body portion with the lateral members positioned along a diagonal across the first corner when the body portion is in the expanded configuration.

* * * * *